United States Patent
Hensley et al.

(10) Patent No.: US 12,367,213 B1
(45) Date of Patent: *Jul. 22, 2025

(54) GENERATING STRUCTURED DATA FROM UNSTRUCTURED DATA USING METADATA FROM A LARGE LANGUAGE MODEL

(71) Applicant: Aravo Solutions, Inc., San Francisco, CA (US)

(72) Inventors: Eric B. Hensley, San Francisco, CA (US); Mark C. Wolochuk, Portland, OR (US)

(73) Assignee: Aravo Solutions, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/893,699

(22) Filed: Sep. 23, 2024

(51) Int. Cl.
*G06F 16/25* (2019.01)
*G06F 16/22* (2019.01)

(52) U.S. Cl.
CPC ........ *G06F 16/258* (2019.01); *G06F 16/2237* (2019.01)

(58) Field of Classification Search
CPC .............. G06F 18/2111; G06F 18/2115; G06F 18/214; G06T 2207/20081; G06V 10/82; G06V 10/774
See application file for complete search history.

(56) References Cited

U.S. PATENT DOCUMENTS

| | | |
|---|---|---|
| 8,316,292 B1 | 11/2012 | Verstak et al. |
| 11,960,514 B1 | 4/2024 | Taylert et al. |
| 11,971,914 B1 | 4/2024 | Watson et al. |
| 12,056,003 B1 | 8/2024 | Ramos et al. |
| 12,105,729 B1 | 10/2024 | Haq et al. |
| 12,111,858 B1 | 10/2024 | Radhakrishnan et al. |
| 12,141,539 B1 | 11/2024 | Nichol et al. |
| 12,155,742 B1 | 11/2024 | Zafar |
| 2011/0282888 A1 | 11/2011 | Koperski et al. |

(Continued)

OTHER PUBLICATIONS

De Bellis, A., Structuring the unstructured: an LLM-guided transition, Doctoral Consortium at ISWC 2023 co-located with 22st International Semantic Web Conference (ISWC 2023), pp. 1-8. (Year: 2023).*

(Continued)

*Primary Examiner* — Cheyne D Ly
(74) *Attorney, Agent, or Firm* — Baker & McKenzie LLP

(57) ABSTRACT

Disclosed are methods and systems for generating structured data from unstructured data using metadata received from a large language model (LLM). An exemplary method includes: receiving computing prompts from a source; receiving a first vector embedding for a first computing prompt from an LLM; receiving a second vector embedding for a second computing prompt from the LLM; generating a computing prompt group comprising the first computing prompt and the second computing prompt; determining at least one first file from a vector database that corresponds with the first computing prompt; determining at least one second file from the vector database that corresponds with the second computing prompt; receiving processed data from the LLM based on the computing prompt group, the at least one first file, and the at least one second file; and generating structured data comprising the processed data and computing indicators.

20 Claims, 20 Drawing Sheets

(56) References Cited

U.S. PATENT DOCUMENTS

| | | |
|---|---|---|
| 2014/0075282 A1 | 3/2014 | Shah et al. |
| 2017/0032275 A1 | 2/2017 | Lytkin et al. |
| 2022/0068153 A1 | 3/2022 | Harlow et al. |
| 2022/0222289 A1 | 7/2022 | Srinivasan et al. |
| 2023/0259705 A1 | 8/2023 | Tunstall-Pedoe et al. |
| 2023/0274086 A1 | 8/2023 | Tunstall-Pedoe et al. |
| 2023/0274089 A1 | 8/2023 | Tunstall-Pedoe et al. |
| 2023/0274094 A1 | 8/2023 | Tunstall-Pedoe et al. |
| 2023/0315955 A1* | 10/2023 | Karadimitriou ......... G01C 7/06 703/6 |
| 2023/0316006 A1 | 10/2023 | Tunstall-Pedoe et al. |
| 2023/0403244 A1 | 12/2023 | Blandin et al. |
| 2024/0070731 A1 | 2/2024 | McCormick |
| 2024/0104305 A1 | 3/2024 | Glesinger et al. |
| 2024/0241897 A1 | 7/2024 | Wang et al. |
| 2024/0256678 A1 | 8/2024 | Thompson |
| 2024/0273227 A1 | 8/2024 | Thompson |
| 2024/0281472 A1 | 8/2024 | LaRhette et al. |
| 2024/0289365 A1 | 8/2024 | Beauchamp et al. |
| 2024/0289863 A1 | 8/2024 | Smith Lewis et al. |
| 2024/0311407 A1 | 9/2024 | Barron et al. |
| 2024/0330589 A1 | 10/2024 | Kotaru |
| 2024/0362286 A1 | 10/2024 | He et al. |
| 2024/0370479 A1 | 11/2024 | Hudetz et al. |
| 2024/0370517 A1 | 11/2024 | DeVos, II et al. |
| 2024/0370570 A1 | 11/2024 | Betthauser et al. |
| 2024/0378390 A1 | 11/2024 | Korganyan et al. |
| 2024/0394291 A1 | 11/2024 | Nelson et al. |
| 2024/0396920 A1 | 11/2024 | Bonney |

OTHER PUBLICATIONS

Aishwarya, V, A Prompt Engineering Approach for Structured Data Extraction from Unstructured Text Using Conversational LLMs, ACAI 2023: 2023 6th International Conference on Algorithms, Computing and Artificial Intelligence Sanya China Dec. 22-24, 2023. (Year: 2023).*

Peng et al., Embedding-based Retrieval with LLM for Effective Agriculture Information Extracting from Unstructured Data, R. Peng, K. Liu, P. Yang, Z. Yuan, and S. Li, "Embedding-based retrieval with LLM for effective agriculture information extracting from unstructured data," 2023, arXiv:2308.03107 (Year: 2023).*

Notice of Allowance dated Dec. 2, 2024 in connection with U.S. Appl. No. 18/893,710, 8 pages.

Final Office Action dated Feb. 6, 2025 in connection with U.S. Appl. No. 18/893,703, 41 pages.

Notice of Allowance dated Dec. 18, 2024 in connection with U.S. Appl. No. 18/893,706, 9 pages.

Daqqah, Bilal H. "Leveraging Large Language Models (LLMs) for Automated Extraction and Processing of Complex Ordering Forms." PhD diss., Massachusetts Institute of Technology, May 2024, 67 pages.

Liu, Xiaoxia, et al. "Prompting Frameworks for Large Language Models: A Survey." arXiv:2311.12785v1, Nov. 21, 2023, 34 pages.

Wedholm, William. "Exploring the Influence of Data Formats on the Consistency of Large Language Models Outputs" Jun. 10, 2024, 34 pages.

Schilling-Wilhelmi, Mara, et al. "From Text to Insight: Large Language Models for Materials Science Data Extraction" arXiv:2407.16867v1, Jul. 23, 2024, 51 pages.

Non-Final Office Action dated Dec. 5, 2024 in connection with U.S. Appl. No. 18/893,703, 32 pages.

* cited by examiner

GENERATING, USING THE ONE OR MORE COMPUTING DEVICE PROCESSORS, A FIRST COMPUTING PROMPT GROUP COMPRISING: THE FIRST COMPUTING PROMPT FROM THE SET OF COMPUTING PROMPTS, AND THE SECOND COMPUTING PROMPT, DIFFERENT FROM THE FIRST COMPUTING PROMPT FROM THE SET OF COMPUTING PROMPTS, WHEREIN THE GENERATING THE FIRST COMPUTING PROMPT GROUP COMPRISES CLUSTERING THE FIRST COMPUTING PROMPT FROM THE SET OF COMPUTING PROMPTS, WITH THE SECOND COMPUTING PROMPT, DIFFERENT FROM THE FIRST COMPUTING PROMPT FROM THE SET OF COMPUTING PROMPTS, BASED ON A SIMILARITY OF THE FIRST VECTOR EMBEDDING AND THE SECOND VECTOR EMBEDDING — 614

FIRST ACCESSING, USING THE ONE OR MORE COMPUTING DEVICE PROCESSORS, A VECTOR DATABASE — 616

DETERMINING, USING THE ONE OR MORE COMPUTING DEVICE PROCESSORS, FOR THE FIRST COMPUTING PROMPT FROM THE SET OF COMPUTING PROMPTS, USING THE FIRST VECTOR EMBEDDING, BASED ON THE FIRST ACCESSING THE VECTOR DATABASE, AT LEAST ONE FIRST FILE THAT AT LEAST PARTIALLY CORRESPONDS WITH THE FIRST COMPUTING PROMPT FROM THE SET OF COMPUTING PROMPTS, WHEREIN THE AT LEAST ONE FIRST FILE THAT AT LEAST PARTIALLY CORRESPONDS WITH THE FIRST COMPUTING PROMPT FROM THE SET OF COMPUTING PROMPTS, COMPRISES FIRST UNSTRUCTURED DATA, WHEREIN THE DETERMINING THE AT LEAST ONE FIRST FILE THAT PARTIALLY CORRESPONDS WITH THE FIRST COMPUTING PROMPT FROM THE SET OF COMPUTING PROMPTS, IS BASED ON A SIMILARITY OF THE FIRST VECTOR EMBEDDING AND AT LEAST ONE THIRD VECTOR EMBEDDING, WHEREIN THE AT LEAST ONE THIRD VECTOR EMBEDDING IS ASSOCIATED WITH THE AT LEAST ONE FIRST FILE THAT AT LEAST PARTIALLY CORRESPONDS WITH THE FIRST COMPUTING PROMPT FROM THE SET OF COMPUTING PROMPTS — 618

SECOND ACCESSING, USING THE ONE OR MORE COMPUTING DEVICE PROCESSORS, THE VECTOR DATABASE — 620

FIG. 6B

DETERMINING, USING THE ONE OR MORE COMPUTING DEVICE PROCESSORS, FOR THE SECOND COMPUTING PROMPT, DIFFERENT FROM THE FIRST COMPUTING PROMPT FROM THE SET OF COMPUTING PROMPTS, USING THE SECOND VECTOR EMBEDDING, BASED ON THE SECOND ACCESSING THE VECTOR DATABASE, AT LEAST ONE SECOND FILE THAT AT LEAST PARTIALLY CORRESPONDS WITH THE SECOND COMPUTING PROMPT, DIFFERENT FROM THE FIRST COMPUTING PROMPT FROM THE SET OF COMPUTING PROMPTS, WHEREIN THE AT LEAST ONE SECOND FILE THAT AT LEAST PARTIALLY CORRESPONDS WITH THE SECOND COMPUTING PROMPT, DIFFERENT FROM THE FIRST COMPUTING PROMPT FROM THE SET OF COMPUTING PROMPTS, COMPRISES SECOND UNSTRUCTURED DATA, WHEREIN THE DETERMINING THE AT LEAST ONE SECOND FILE THAT PARTIALLY CORRESPONDS WITH THE SECOND COMPUTING PROMPT, DIFFERENT FROM THE FIRST COMPUTING PROMPT FROM THE SET OF COMPUTING PROMPTS, IS BASED ON A SIMILARITY OF THE SECOND VECTOR EMBEDDING AND AT LEAST ONE FOURTH VECTOR EMBEDDING, WHEREIN THE AT LEAST ONE FOURTH VECTOR EMBEDDING IS ASSOCIATED WITH THE AT LEAST ONE SECOND FILE THAT AT LEAST PARTIALLY CORRESPONDS WITH THE SECOND COMPUTING PROMPT, DIFFERENT FROM THE FIRST COMPUTING PROMPT FROM THE SET OF COMPUTING PROMPTS — 622

TRANSMITTING, USING THE ONE OR MORE COMPUTING DEVICE PROCESSORS, THE FIRST COMPUTING PROMPT GROUP TO THE LLM — 624

TRANSMITTING, USING THE ONE OR MORE COMPUTING DEVICE PROCESSORS, THE AT LEAST ONE FIRST FILE THAT AT LEAST PARTIALLY CORRESPONDS WITH THE FIRST COMPUTING PROMPT FROM THE SET OF COMPUTING PROMPTS, TO THE LLM — 626

TRANSMITTING, USING THE ONE OR MORE COMPUTING DEVICE PROCESSORS, THE AT LEAST ONE SECOND FILE THAT AT LEAST PARTIALLY CORRESPONDS WITH THE SECOND COMPUTING PROMPT, DIFFERENT FROM THE FIRST COMPUTING PROMPT FROM THE SET OF COMPUTING PROMPTS, TO THE LLM — 628

FIG. 6C

630 — RECEIVING, USING THE ONE OR MORE COMPUTING DEVICE PROCESSORS, PROCESSED DATA FROM THE LLM, WHEREIN THE PROCESSED DATA COMPRISES OR IS BASED ON THE FIRST COMPUTING PROMPT FROM THE SET OF COMPUTING PROMPTS, A FIRST RESPONSE ASSOCIATED WITH THE FIRST COMPUTING PROMPT FROM THE SET OF COMPUTING PROMPTS, A FIRST CITATION ASSOCIATED WITH THE FIRST COMPUTING PROMPT FROM THE SET OF COMPUTING PROMPTS, A FIRST FILE QUALITY INDICATOR ASSOCIATED WITH THE FIRST COMPUTING PROMPT FROM THE SET OF COMPUTING PROMPTS, THE SECOND COMPUTING PROMPT, DIFFERENT FROM THE FIRST COMPUTING PROMPT FROM THE SET OF COMPUTING PROMPTS, A SECOND RESPONSE ASSOCIATED WITH THE SECOND COMPUTING PROMPT, DIFFERENT FROM THE FIRST COMPUTING PROMPT FROM THE SET OF COMPUTING PROMPTS, A SECOND CITATION ASSOCIATED WITH THE SECOND COMPUTING PROMPT, DIFFERENT FROM THE FIRST COMPUTING PROMPT FROM THE SET OF COMPUTING PROMPTS, AND A SECOND FILE QUALITY INDICATOR ASSOCIATED WITH THE SECOND COMPUTING PROMPT, DIFFERENT FROM THE FIRST COMPUTING PROMPT FROM THE SET OF COMPUTING PROMPTS

632 — DETERMINING, USING THE ONE OR MORE COMPUTING DEVICE PROCESSORS, A FIRST COMPUTING INDICATOR BASED ON THE FIRST COMPUTING PROMPT FROM THE SET OF COMPUTING PROMPTS, AND THE FIRST CITATION ASSOCIATED WITH THE FIRST COMPUTING PROMPT FROM THE SET OF COMPUTING PROMPTS

634 — DETERMINING, USING THE ONE OR MORE COMPUTING DEVICE PROCESSORS, A SECOND COMPUTING INDICATOR BASED ON THE SECOND COMPUTING PROMPT, DIFFERENT FROM THE FIRST COMPUTING PROMPT FROM THE SET OF COMPUTING PROMPTS, AND THE SECOND CITATION ASSOCIATED WITH THE SECOND COMPUTING PROMPT, DIFFERENT FROM THE FIRST COMPUTING PROMPT FROM THE SET OF COMPUTING PROMPTS

636 — GENERATING, USING THE ONE OR MORE COMPUTING DEVICE PROCESSORS, STRUCTURED DATA COMPRISING OR BASED ON THE PROCESSED DATA, THE FIRST COMPUTING INDICATOR, AND THE SECOND COMPUTING INDICATOR

638 — TRANSMITTING, USING THE ONE OR MORE COMPUTING DEVICE PROCESSORS, THE STRUCTURED DATA TO A FIRST SYSTEM

FIG. 6D

```
┌─────────────────────────────────────────────────────────────────────┐
│ GENERATING, USING THE ONE OR MORE COMPUTING DEVICE PROCESSORS, A    │
│ FIRST COMPUTING PROMPT GROUP COMPRISING: THE FIRST COMPUTING PROMPT │
│ FROM THE SET OF COMPUTING PROMPTS, AND THE SECOND COMPUTING PROMPT, │
│ DIFFERENT FROM THE FIRST COMPUTING PROMPT, FROM THE SET OF          │── 1014
│ COMPUTING PROMPTS, WHEREIN THE GENERATING THE FIRST COMPUTING       │
│ PROMPT GROUP COMPRISES CLUSTERING THE FIRST COMPUTING PROMPT FROM   │
│ THE SET OF COMPUTING PROMPTS, WITH THE SECOND COMPUTING PROMPT,     │
│ DIFFERENT FROM THE FIRST COMPUTING PROMPT, FROM THE SET OF          │
│ COMPUTING PROMPTS, BASED ON A FIRST SIMILARITY OF THE FIRST VECTOR  │
│ EMBEDDING AND THE SECOND VECTOR EMBEDDING                           │
└─────────────────────────────────────────────────────────────────────┘
                                     ▼
┌─────────────────────────────────────────────────────────────────────┐
│ FIRST ACCESSING, USING THE ONE OR MORE COMPUTING DEVICE PROCESSORS, │── 1016
│                       A FIRST DATABASE                              │
└─────────────────────────────────────────────────────────────────────┘
                                     ▼
┌─────────────────────────────────────────────────────────────────────┐
│ DETERMINING, USING THE ONE OR MORE COMPUTING DEVICE PROCESSORS, FOR │
│ THE FIRST COMPUTING PROMPT FROM THE SET OF COMPUTING PROMPTS, USING │
│ THE FIRST VECTOR EMBEDDING, BASED ON THE FIRST ACCESSING THE FIRST  │
│ DATABASE, AT LEAST ONE FIRST FILE THAT AT LEAST PARTIALLY           │
│ CORRESPONDS WITH THE FIRST COMPUTING PROMPT FROM THE SET OF         │
│ COMPUTING PROMPTS, WHEREIN THE AT LEAST ONE FIRST FILE THAT AT      │
│ LEAST PARTIALLY CORRESPONDS WITH THE FIRST COMPUTING PROMPT FROM    │
│ THE SET OF COMPUTING PROMPTS, COMPRISES FIRST UNSTRUCTURED DATA,    │── 1018
│ WHEREIN THE DETERMINING THE AT LEAST ONE FIRST FILE THAT PARTIALLY  │
│ CORRESPONDS WITH THE FIRST COMPUTING PROMPT FROM THE SET OF         │
│ COMPUTING PROMPTS, IS BASED ON A SECOND SIMILARITY OF THE FIRST     │
│ VECTOR EMBEDDING AND AT LEAST ONE THIRD VECTOR EMBEDDING, WHEREIN   │
│ THE AT LEAST ONE THIRD VECTOR EMBEDDING IS ASSOCIATED WITH THE AT   │
│ LEAST ONE FIRST FILE THAT AT LEAST PARTIALLY CORRESPONDS WITH THE   │
│ FIRST COMPUTING PROMPT FROM THE SET OF COMPUTING PROMPTS            │
└─────────────────────────────────────────────────────────────────────┘
                                     ▼
┌─────────────────────────────────────────────────────────────────────┐
│ SECOND ACCESSING, USING THE ONE OR MORE COMPUTING DEVICE            │── 1020
│ PROCESSORS, THE FIRST DATABASE                                      │
└─────────────────────────────────────────────────────────────────────┘
                                     ▼
```

FIG. 10B

1022 — DETERMINING, USING THE ONE OR MORE COMPUTING DEVICE PROCESSORS, FOR THE SECOND COMPUTING PROMPT, DIFFERENT FROM THE FIRST COMPUTING PROMPT, FROM THE SET OF COMPUTING PROMPTS, USING THE SECOND VECTOR EMBEDDING, BASED ON THE SECOND ACCESSING THE FIRST DATABASE, AT LEAST ONE SECOND FILE THAT AT LEAST PARTIALLY CORRESPONDS WITH THE SECOND COMPUTING PROMPT, DIFFERENT FROM THE FIRST COMPUTING PROMPT, FROM THE SET OF COMPUTING PROMPTS, WHEREIN THE AT LEAST ONE SECOND FILE THAT AT LEAST PARTIALLY CORRESPONDS WITH THE SECOND COMPUTING PROMPT, DIFFERENT FROM THE FIRST COMPUTING PROMPT, FROM THE SET OF COMPUTING PROMPTS, COMPRISES SECOND UNSTRUCTURED DATA, WHEREIN THE DETERMINING THE AT LEAST ONE SECOND FILE THAT PARTIALLY CORRESPONDS WITH THE SECOND COMPUTING PROMPT, DIFFERENT FROM THE FIRST COMPUTING PROMPT, FROM THE SET OF COMPUTING PROMPTS, IS BASED ON A THIRD SIMILARITY OF THE SECOND VECTOR EMBEDDING AND AT LEAST ONE FOURTH VECTOR EMBEDDING, WHEREIN THE AT LEAST ONE FOURTH VECTOR EMBEDDING IS ASSOCIATED WITH THE AT LEAST ONE SECOND FILE THAT AT LEAST PARTIALLY CORRESPONDS WITH THE SECOND COMPUTING PROMPT, DIFFERENT FROM THE FIRST COMPUTING PROMPT, FROM THE SET OF COMPUTING PROMPTS

1024 — TRANSMITTING, USING THE ONE OR MORE COMPUTING DEVICE PROCESSORS, THE FIRST COMPUTING PROMPT GROUP TO THE LLM

1026 — TRANSMITTING, USING THE ONE OR MORE COMPUTING DEVICE PROCESSORS, THE AT LEAST ONE FIRST FILE THAT AT LEAST PARTIALLY CORRESPONDS WITH THE FIRST COMPUTING PROMPT FROM THE SET OF COMPUTING PROMPTS, TO THE LLM

1028 — TRANSMITTING, USING THE ONE OR MORE COMPUTING DEVICE PROCESSORS, THE AT LEAST ONE SECOND FILE THAT AT LEAST PARTIALLY CORRESPONDS WITH THE SECOND COMPUTING PROMPT, DIFFERENT FROM THE FIRST COMPUTING PROMPT, FROM THE SET OF COMPUTING PROMPTS, TO THE LLM

FIG. 10C

RECEIVING, USING THE ONE OR MORE COMPUTING DEVICE PROCESSORS, FIRST STRUCTURED DATA FROM THE LLM, WHEREIN THE FIRST STRUCTURED DATA COMPRISES OR IS BASED ON THE FIRST COMPUTING PROMPT FROM THE SET OF COMPUTING PROMPTS, A FIRST RESPONSE ASSOCIATED WITH THE FIRST COMPUTING PROMPT FROM THE SET OF COMPUTING PROMPTS, A FIRST CITATION ASSOCIATED WITH THE FIRST COMPUTING PROMPT FROM THE SET OF COMPUTING PROMPTS, A FIRST FILE QUALITY INDICATOR ASSOCIATED WITH THE FIRST COMPUTING PROMPT FROM THE SET OF COMPUTING PROMPTS, THE SECOND COMPUTING PROMPT, DIFFERENT FROM THE FIRST COMPUTING PROMPT, FROM THE SET OF COMPUTING PROMPTS, A SECOND RESPONSE ASSOCIATED WITH THE SECOND COMPUTING PROMPT, DIFFERENT FROM THE FIRST COMPUTING PROMPT, FROM THE SET OF COMPUTING PROMPTS, A SECOND CITATION ASSOCIATED WITH THE SECOND COMPUTING PROMPT, DIFFERENT FROM THE FIRST COMPUTING PROMPT, FROM THE SET OF COMPUTING PROMPTS, AND A SECOND FILE QUALITY INDICATOR ASSOCIATED WITH THE SECOND COMPUTING PROMPT, DIFFERENT FROM THE FIRST COMPUTING PROMPT, FROM THE SET OF COMPUTING PROMPTS — 1030

DETERMINING, USING THE ONE OR MORE COMPUTING DEVICE PROCESSORS, BASED ON THE FIRST COMPUTING PROMPT FROM THE SET OF COMPUTING PROMPTS, AND THE FIRST CITATION ASSOCIATED WITH THE FIRST COMPUTING PROMPT FROM THE SET OF COMPUTING PROMPTS, A FIRST COMPUTING INDICATOR — 1032

DETERMINING, USING THE ONE OR MORE COMPUTING DEVICE PROCESSORS, BASED ON THE SECOND COMPUTING PROMPT, DIFFERENT FROM THE FIRST COMPUTING PROMPT, FROM THE SET OF COMPUTING PROMPTS, AND THE SECOND CITATION ASSOCIATED WITH THE SECOND COMPUTING PROMPT, DIFFERENT FROM THE FIRST COMPUTING PROMPT, FROM THE SET OF COMPUTING PROMPTS, A SECOND COMPUTING INDICATOR — 1034

GENERATING, USING THE ONE OR MORE COMPUTING DEVICE PROCESSORS, SECOND STRUCTURED DATA COMPRISING OR BASED ON THE FIRST STRUCTURED DATA, THE FIRST COMPUTING INDICATOR, AND THE SECOND COMPUTING INDICATOR — 1036

FIG. 10D

GENERATING, USING THE ONE OR MORE COMPUTING DEVICE PROCESSORS, BASED ON THE SECOND STRUCTURED DATA, AT LEAST ONE RECOMMENDATION ASSOCIATED WITH THE FIRST DATABASE, THE AT LEAST ONE FIRST FILE THAT AT LEAST PARTIALLY CORRESPONDS WITH THE FIRST COMPUTING PROMPT FROM THE SET OF COMPUTING PROMPTS, OR THE AT LEAST ONE SECOND FILE THAT AT LEAST PARTIALLY CORRESPONDS WITH THE SECOND COMPUTING PROMPT, DIFFERENT FROM THE FIRST COMPUTING PROMPT, FROM THE SET OF COMPUTING PROMPTS — 1038

TRANSMITTING, USING THE ONE OR MORE COMPUTING DEVICE PROCESSORS, THE AT LEAST ONE RECOMMENDATION TO A SECOND SYSTEM, WHEREIN THE SECOND SYSTEM MANAGES THE FIRST DATABASE — 1040

FIG. 10E

GENERATING STRUCTURED DATA FROM UNSTRUCTURED DATA USING METADATA FROM A LARGE LANGUAGE MODEL

TECHNICAL FIELD

The present disclosure relates to data transformation.

BACKGROUND

There is a need for a method for transforming unstructured data to structured data for various software applications.

SUMMARY

Disclosed are methods and systems for generating structured data from unstructured data using metadata received from a large language model (LLM). An exemplary method includes: receiving computing prompts from a source; receiving a first vector embedding for a first computing prompt from an LLM; receiving a second vector embedding for a second computing prompt from the LLM; generating a computing prompt group comprising the first computing prompt and the second computing prompt; determining at least one first file from a vector database that corresponds with the first computing prompt; determining at least one second file from the vector database that corresponds with the second computing prompt; receiving processed data from the LLM based on the computing prompt group, the at least one first file, and the at least one second file; and generating structured data comprising the processed data and computing indicators.

The present disclosure is directed to methods, systems, and computer program products that generate structured data from a file comprising unstructured data based on accessing a large language model (LLM), generate an indexed computing file based on inserting vector embeddings and metadata, received from an LLM, into a configured vector database, generate a computing structure based on both unstructured data and structured data using an LLM, and generate structured data from files comprising unstructured data, and transmit recommendations, based on the structured data, to a system storing the files, using an LLM. According to one embodiment, a method for generating structured data from a file comprising unstructured data, based on accessing an LLM comprises: receiving, using one or more computing device processors, data, associated with a first computing format, from a first data source; determining, using the one or more computing device processors, based on the first computing format, a set of computing prompts from the data; transmitting, using the one or more computing device processors, a first computing prompt from the set of computing prompts, to an LLM; receiving, using the one or more computing device processors, a first vector embedding for the first computing prompt from the set of computing prompts, from the LLM, wherein the first vector embedding comprises or is based on a first semantic structure of at least some first content comprised in or associated with the first computing prompt from the set of computing prompts; transmitting, using the one or more computing device processors, a second computing prompt, different from the first computing prompt, from the set of computing prompts, to the LLM; receiving, using the one or more computing device processors, a second vector embedding for the second computing prompt, different from the first computing prompt, from the set of computing prompts, from the LLM, wherein the second vector embedding comprises or is based on a second semantic structure or the first semantic structure of at least some second content comprised in or associated with the second computing prompt, different from the first computing prompt, from the set of computing prompts; generating, using the one or more computing device processors, a first computing prompt group comprising: the first computing prompt from the set of computing prompts, and the second computing prompt, different from the first computing prompt, from the set of computing prompts, wherein the generating the first computing prompt group comprises clustering the first computing prompt from the set of computing prompts, with the second computing prompt, different from the first computing prompt, from the set of computing prompts, based on a similarity of the first vector embedding and the second vector embedding; first accessing, using the one or more computing device processors, a vector database; determining, using the one or more computing device processors, for the first computing prompt from the set of computing prompts, using the first vector embedding, based on the first accessing the vector database, at least one first file that at least partially corresponds with the first computing prompt from the set of computing prompts, wherein the at least one first file that at least partially corresponds with the first computing prompt from the set of computing prompts, comprises first unstructured data, wherein the determining the at least one first file that partially corresponds with the first computing prompt from the set of computing prompts, is based on a similarity of the first vector embedding and at least one third vector embedding, wherein the at least one third vector embedding is associated with the at least one first file that at least partially corresponds with the first computing prompt from the set of computing prompts; second accessing, using the one or more computing device processors, the vector database; determining, using the one or more computing device processors, for the second computing prompt, different from the first computing prompt, from the set of computing prompts, using the second vector embedding, based on the second accessing the vector database, at least one second file that at least partially corresponds with the second computing prompt, different from the first computing prompt, from the set of computing prompts, wherein the at least one second file that at least partially corresponds with the second computing prompt, different from the first computing prompt, from the set of computing prompts, comprises second unstructured data, wherein the determining the at least one second file that partially corresponds with the second computing prompt, different from the first computing prompt, from the set of computing prompts, is based on a similarity of the second vector embedding and at least one fourth vector embedding, wherein the at least one fourth vector embedding is associated with the at least one second file that at least partially corresponds with the second computing prompt, different from the first computing prompt, from the set of computing prompts; transmitting, using the one or more computing device processors, the first computing prompt group to the LLM; transmitting, using the one or more computing device processors, the at least one first file that at least partially corresponds with the first computing prompt from the set of computing prompts, to the LLM; transmitting, using the one or more computing device processors, the at least one second file that at least partially corresponds with the second computing prompt, different from the first computing prompt, from the set of computing prompts, to the LLM; receiving, using the one or more computing device processors, processed data from the LLM, wherein the processed data comprises or is based on the first computing prompt from the set of computing prompts, a first response associated with the first computing prompt from the set of computing prompts, a first citation associated with the first computing prompt from the set of computing prompts, a first file quality indicator associated with the first computing prompt from the set of computing prompts, the second computing prompt, different from the first computing prompt, from the set of computing prompts, a second response associated with the second computing prompt, different from the first computing prompt, from the set of computing prompts, a second citation associated with the second computing prompt, different from the first computing prompt, from the set of computing prompts, and a second file quality indicator associated with the second computing prompt, different from the first computing prompt, from the set of computing prompts; determining, using the one or more computing device processors, a first computing indicator based on the first computing prompt from the set of computing prompts, and the first citation associated with the first computing prompt from the set of computing prompts; determining, using the one or more computing device processors, a second computing indicator based on the second computing prompt, different from the first computing prompt, from the set of computing prompts, and the second citation associated with the second computing prompt, different from the first computing prompt, from the set of computing prompts; generating, using the one or more computing device processors, structured data comprising or based on the processed data, the first computing indicator, and the second computing indicator; and transmitting, using the one or more computing device processors, the structured data to a first system.

In some embodiments, the method further comprises: receiving, using the one or more computing device processors, filter data from the first data source or a second data source, and executing, using the one or more computing device processors, based on the filter data, a filtering operation on the vector database, thereby limiting entries associated with the vector database.

Furthermore, the filter data can comprise one or more of: a nature of the file, a credibility of the file, a freshness of the file, a file quality indicator of the file, a name of the file, and a source of the file.

In some embodiments, the first computing format comprises JavaScript Object Notation (JSON) format.

According to some embodiments, the similarity of the first vector embedding and the second vector embedding, is based on a semantic similarity of the first vector embedding and the second vector embedding.

Furthermore, the semantic similarity is calculated based on one or more of: cosine similarity, Euclidean distance, Manhattan distance, Minkowski distance, Chebychev distance, and dot product similarity.

In some embodiments, the similarity of the first vector embedding and the at least one third vector embedding further comprises a semantic similarity of the first vector embedding and the at least one third vector embedding.

In other embodiments, a system and a computer program can include or execute the method described above. These and other implementations may each optionally include one or more of the following features.

According to some embodiments, the system comprises or is comprised in one or more computing systems associated with one or more locations.

The first computing prompt group, in some embodiments, further comprises at least three computing prompts.

In some cases, the processed data comprises the set of computing prompts, a set of responses associated with the set of computing prompts, a set of citations associated with the set of computing prompts, and a set of file quality indicators associated with the set of computing prompts.

In one embodiment, an entry in the vector database comprises at least one of: a vector embedding and metadata associated with an indexed file, or the vector embedding and metadata associated with a file comprising unstructured data.

In some embodiments, the unstructured data comprises raw information or information without a predetermined structure or format.

In other embodiments, the method comprises: receiving, using one or more computing device processors, data, associated with a first computing format, from a first data source; determining, using the one or more computing device processors, based on the first computing format, a set of computing prompts from the data; transmitting, using the one or more computing device processors, a first computing prompt from the set of computing prompts, to an LLM; receiving, using the one or more computing device processors, a first vector embedding for the first computing prompt from the set of computing prompts, from the LLM, wherein the first vector embedding comprises or is based on a first semantic structure of at least some first content comprised in or associated with the first computing prompt from the set of computing prompts; transmitting, using the one or more computing device processors, a second computing prompt, different from the first computing prompt, from the set of computing prompts, to the LLM; receiving, using the one or more computing device processors, a second vector embedding for the second computing prompt, different from the first computing prompt, from the set of computing prompts, from the LLM, wherein the second vector embedding comprises or is based on a second semantic structure or the first semantic structure of at least some second content comprised in or associated with the second computing prompt, different from the first computing prompt, from the set of computing prompts; generating, using the one or more computing device processors, a first computing prompt group comprising: the first computing prompt from the set of computing prompts, and the second computing prompt, different from the first computing prompt, from the set of computing prompts, wherein the generating the first computing prompt group comprises clustering the first computing prompt from the set of computing prompts, with the second computing prompt, different from the first computing prompt, from the set of computing prompts, based on a similarity of the first vector embedding and the second vector embedding; first accessing, using the one or more computing device processors, a vector database; determining, using the one or more computing device processors, for the first computing prompt from the set of computing prompts, using the first vector embedding, based on the first accessing the vector database, first file data, associated with at least one first file that at least partially corresponds with the first computing prompt from the set of computing prompts, wherein the at least one first file that at least partially corresponds with the first computing prompt from the set of computing prompts, comprises first unstructured data, wherein the determining the first file data, associated with the at least one first file that partially corresponds with the first computing prompt from the set of computing prompts, is based on a similarity of the first vector embedding and at least one third vector embedding, wherein the at least one third vector embedding is associated with or comprised in the first file data; second accessing, using the one or more computing device processors, the vector database; determining, using the one or more computing device processors, for the second computing prompt, different from the first computing prompt, from the set of computing prompts, using the second vector embedding, based on the second accessing the vector database, second file data, associated with at least one second file that at least partially corresponds with the second computing prompt, different from the first computing prompt, from the set of computing prompts, wherein the at least one second file that at least partially corresponds with the second computing prompt, different from the first computing prompt, from the set of computing prompts, comprises second unstructured data, wherein the determining the second file data, associated with the at least one second file that partially corresponds with the second computing prompt, different from the first computing prompt, from the set of computing prompts, is based on a similarity of the second vector embedding and at least one fourth vector embedding, wherein the at least one fourth vector embedding is associated with or comprised in the second file data; transmitting, using the one or more computing device processors, the first computing prompt group to the LLM; transmitting, using the one or more computing device processors, the first file data, associated with the at least one first file that at least partially corresponds with the first computing prompt from the set of computing prompts, to the LLM; transmitting, using the one or more computing device processors, the second file data, associated with the at least one second file that at least partially corresponds with the second computing prompt, different from the first computing prompt, from the set of computing prompts, to the LLM; receiving, using the one or more computing device processors, processed data from the LLM, wherein the processed data comprises the first computing prompt from the set of computing prompts, a first response associated with the first computing prompt from the set of computing prompts, a first citation associated with the first computing prompt from the set of computing prompts, a first file quality indicator associated with the first computing prompt from the set of computing prompts, the second computing prompt, different from the first computing prompt, from the set of computing prompts, a second response associated with the second computing prompt, different from the first computing prompt, from the set of computing prompts, a second citation associated with the second computing prompt, different from the first computing prompt, from the set of computing prompts, and a second file quality indicator associated with the second computing prompt, different from the first computing prompt, from the set of computing prompts; determining, using the one or more computing device processors, a first computing indicator based on the first computing prompt from the set of computing prompts, and the first citation associated with the first computing prompt from the set of computing prompts; determining, using the one or more computing device processors, a second computing indicator based on the second computing prompt, different from the first computing prompt, from the set of computing prompts, and the second citation associated with the second computing prompt, different from the first computing prompt, from the set of computing prompts; generating, using the one or more computing device processors, structured data comprising or based on the processed data, the first computing indicator and the second computing indicator; and transmitting, using the one or more computing device processors, the structured data to a first system.

In one embodiment, the structured data is associated with a second computing format, wherein the second computing format comprises JSON format.

According to some embodiments, the first citation, associated with the first computing prompt from the set of computing prompts, comprises at least one of: at least some first text from the first file data associated with the at least one first file that at least partially corresponds with the first computing prompt from the set of computing prompts, at least some second text from the second file data associated with the at least one second file that at least partially corresponds with the second computing prompt, different from the first computing prompt, from the set of computing prompts, a file name corresponding with the at least one first file that at least partially corresponds with the first computing prompt from the set of computing prompts or the at least one second file that at least partially corresponds with the second computing prompt, different from the first computing prompt, from the set of computing prompts, and a page number corresponding with the at least some first text from the first file data associated with the at least one first file that at least partially corresponds with the first computing prompt from the set of computing prompts, or the at least some second text from the second file data associated with the at least one second file that at least partially corresponds with the second computing prompt, different from the first computing prompt, from the set of computing prompts.

In other embodiments, the first file quality indicator is based on metadata associated with the first citation.

In some cases, the determining, using the one or more computing device processors, the first computing indicator based on the first computing prompt from the set of computing prompts, and the first citation, associated with the first computing prompt from the set of computing prompts, is based on a semantic similarity of the first vector embedding and a fifth vector embedding, wherein the fifth vector embedding is associated with the first citation.

In one embodiment, the fifth vector embedding comprises or is comprised in the at least one third vector embedding or the at least one fourth vector embedding.

In some embodiments, the one or more computing device processors are comprised in one or more computing systems, wherein the one or more computing systems are located in one or more locations.

According to another embodiment, a method for generating an indexed computing file based on inserting vector embeddings and metadata, received from a large language model (LLM), into a configured vector database, comprises: receiving, using one or more computing device processors, a file from a first file source, wherein the file comprises unstructured data; extracting, using the one or more computing device processors, text from the file; transmitting, using the one or more computing device processors, the text from the file to an LLM; receiving, using the one or more computing device processors, at a first time, metadata associated with the file from the LLM, wherein the metadata associated with the file comprises or is based on file quality data, wherein the file quality data comprises or is based on at least one of: a nature of the file, a credibility of the file, a freshness of the file, and a file quality indicator of the file; executing, using the one or more computing device processors, at a second time or at the first time, a chunking computing operation using the file, thereby resulting in a chunked file; transmitting, using the one or more computing device processors, text associated with the chunked file to the LLM; receiving, using the one or more computing device processors, at least one vector embedding for the text associated with the chunked file from the LLM, wherein the at least one vector embedding comprises or is based on a semantic structure of at least some of the text associated with the chunked file; configuring, using the one or more computing device processors, a vector database to store vector embeddings and metadata, thereby resulting in a configured vector database; first inserting, using the one or more computing device processors, at a third time following the first time and the second time, the at least one vector embedding for the text associated with the chunked file, into the configured vector database; second inserting, using the one or more computing device processors, at the third time following the first time and the second time, the metadata associated with the file into the configured vector database; and generating, based on the first inserting the at least one vector embedding for the text associated with the chunked file into the configured vector database, and the second inserting the metadata associated with the file into the configured vector database, an indexed computing file.

In some embodiments, the file quality data comprising or being based on the at least one of: the nature of the file, the credibility of the file, the freshness of the file, and the file quality indicator of the file, further comprises or is based on at least two of: the nature of the file, the credibility of the file, the freshness of the file, and the file quality indicator of the file.

In other embodiments, the file quality data comprising or being based on the at least one of: the nature of the file, the credibility of the file, the freshness of the file, and the file quality indicator of the file, further comprises or is based on at least three of: the nature of the file, the credibility of the file, the freshness of the file, and the file quality indicator of the file.

In yet other embodiments, the file quality data comprising or being based on the at least one of: the nature of the file, the credibility of the file, the freshness of the file, and the file quality indicator of the file, further comprises or is based on: the nature of the file, the credibility of the file, the freshness of the file, and the file quality indicator of the file.

In one embodiment, the nature of the file comprises an indicator associated with a classification of the file.

According to some embodiments, the credibility of the file comprises an indicator associated with a source of the file.

In some cases, the freshness of the file comprises an indicator associated with a creation time of the file.

In other embodiments, a system and a computer program can include or execute the method described above. These and other implementations may each optionally include one or more of the following features.

In some embodiments, the system comprises or is comprised in one or more computing systems associated with one or more locations.

The metadata associated with the file, according to one embodiment, further comprises a citation, wherein the citation comprises: at least some text from the file, a file name corresponding with the file, and a page number associated with the at least some text from the file.

In one embodiment, the metadata associated with the file further comprises third-party source data.

In some embodiments, the LLM is hosted on a third-party server.

In other embodiments, the LLM is hosted on a local server.

According to some embodiments, the semantic structure of the at least some of the text associated with the chunked file comprises a conceptual meaning of the at least some of the text associated with the chunked file.

In some cases, the method comprises: receiving, using one or more computing device processors, a file from a first file source, wherein the file comprises unstructured data; extracting, using the one or more computing device processors, data from the file; transmitting, using the one or more computing device processors, the data from the file to an LLM; receiving, using the one or more computing device processors, at a first time, metadata associated with the file from the LLM, wherein the metadata associated with the file comprises or is based on file quality data, wherein the file quality data comprises or is based on at least one of: a nature of the file, a credibility of the file, a freshness of the file, and a file quality indicator of the file; executing, using the one or more computing device processors, at a second time or at the first time, a chunking computing operation using the file, thereby resulting in a chunked file; transmitting, using the one or more computing device processors, data associated with the chunked file to the LLM; receiving, using the one or more computing device processors, at least one vector embedding for the data associated with the chunked file from the LLM, wherein the at least one vector embedding comprises or is based on a semantic structure of at least some of the data associated with the chunked file; configuring, using the one or more computing device processors, a vector database to store vector embeddings and metadata, thereby resulting in a configured vector database; first inserting, using the one or more computing device processors, at a third time following the first time and the second time, the at least one vector embedding for the data associated with the chunked file, into the configured vector database; second inserting, using the one or more computing device processors, at the third time following the first time and the second time, the metadata associated with the file into the configured vector database, wherein the first inserting the at least one vector embedding for the data associated with the chunked file into the configured vector database, and the second inserting the metadata associated with the file into the configured vector database, result in an indexed computing file; and storing, using the one or more computing device processors, the indexed computing file in a file repository.

In some embodiments, the at least some of the data associated with the chunked file comprises or is based on at least one of: a word from the chunked file, a phrase from the chunked file, a sentence from the chunked file, a paragraph from the chunked file, or the chunked file.

According to one embodiment, the file quality indicator of the file is based on the nature of the file, the credibility of the file, and the freshness of the file.

In other embodiments, the one or more computing device processors are comprised in one or more computing systems, wherein the one or more computing systems are located in one or more locations.

In some cases, the data from the file comprises at least one of: text, an image, a figure, a table, and a diagram.

The file from the first file source, according to some embodiments, comprises at least one of: an audit document, a Service Organization Control (SOC) 2 report, a policy document, a 10K financial report, a technical description document, a SOC 1 report, a data security document, a corporate charter, an information technology procedure document, a financial report, a questionnaire, a 10 Q report, a human resources document, a compliance report, or a screenshot of an internal system.

In yet another embodiment, a method for generating a computing structure based on both unstructured data and structured data using a large language model (LLM) comprises: receiving, using one or more computing device processors, first unstructured data from a first data source; receiving, using the one or more computing device processors, first structured data from a second data source; determining, using the one or more computing device processors, a first computing library associated with the first structured data; receiving, using the one or more computing device processors, second unstructured data from a third data source; determining, using the one or more computing device processors, a first set of computing prompts associated with the second unstructured data; receiving, using the one or more computing device processors, second structured data, associated with a first computing format, from a fourth data source; determining, using the one or more computing device processors, based on the first computing format, a set of computing structures associated with the second structured data; transmitting, using the one or more computing device processors, at a first time, the first unstructured data to an LLM; transmitting, using the one or more computing device processors, at a second time or the first time, the first computing library associated with the first structured data to the LLM; transmitting, using the one or more computing device processors, at a third time, the second time, or the first time, the first set of computing prompts associated with the second unstructured data to the LLM; transmitting, using the one or more computing device processors, at a fourth time, the third time, the second time, or the first time, the set of computing structures associated with the second structured data to the LLM; receiving, using the one or more computing device processors, third structured data, associated with a second computing format, from the LLM, wherein the third structured data comprises or is based on the first set of computing prompts associated with the second unstructured data, a set of responses associated with the first set of computing prompts associated with the second unstructured data, and a computing structure, wherein the computing structure is not comprised in the set of computing structures associated with the second structured data, and wherein the computing structure comprises or is based on the first unstructured data, the first computing library associated with the first structured data, the first set of computing prompts associated with the second unstructured data, and the set of computing structures associated with the second structured data; and transmitting, using the one or more computing device processors, the third structured data to a first system.

In some embodiments, the first computing format comprises JavaScript Object Notation (JSON) format.

In other embodiments, the second computing format comprises JSON format.

According to one embodiment, the first computing library associated with the first structured data comprises at least one of: a second set of computing prompts, a set of attributes, a set of entities, a set of workflow task types, or a set of configured objects.

In another embodiment, the method further comprises generating, using the one or more computing device processors, a second computing library using the LLM.

According to some embodiments, the computing structure further comprises or is based on the second computing library.

In some embodiments, the one or more computing device processors are comprised in one or more computing systems, wherein the one or more computing systems are located in one or more locations.

In other embodiments, a system and a computer program can include or execute the method described above. These and other implementations may each optionally include one or more of the following features.

According to some embodiments, the system comprises or is comprised in one or more computing systems associated with one or more locations.

In some embodiments, at least one of the first unstructured data or the second unstructured data comprises raw information or information without a predetermined structure or format.

In one embodiment, the LLM is hosted on a third-party server.

In another embodiment, the LLM is hosted on a local server.

According to one embodiment, one or more of the instructions execute in a first stage and a second stage, such that fifth structured data associated with the second stage comprises or is based on fourth structured data associated with the first stage.

In some cases, the method for generating a computing structure based on both unstructured data and structured data using a large language model (LLM) comprises: receiving, using one or more computing device processors, first unstructured data from a first data source; receiving, using the one or more computing device processors, first structured data from a second data source; determining, using the one or more computing device processors, a computing library associated with the first structured data; receiving, using the one or more computing device processors, second unstructured data from a third data source;

determining, using the one or more computing device processors, a set of computing prompts associated with the second unstructured data; receiving, using the one or more computing device processors, second structured data, associated with a first computing format, from a fourth data source; determining, using the one or more computing device processors, based on the first computing format, a set of computing structures associated with the second structured data; transmitting, using the one or more computing device processors, at a first time, the first unstructured data to an LLM; transmitting, using the one or more computing device processors, at a second time or the first time, the computing library associated with the first structured data to the LLM; transmitting, using the one or more computing device processors, at a third time, the second time, or the first time, the set of computing prompts associated with the second unstructured data to the LLM; transmitting, using the one or more computing device processors, at a fourth time, the third time, the second time, or the first time, the set of computing structures associated with the second structured data to the LLM; receiving, using the one or more computing device processors, third structured data, associated with a second computing format, from the LLM, wherein the third structured data comprises or is based on the set of computing prompts associated with the second unstructured data, a set of responses associated with the set of computing prompts associated with the second unstructured data, and a computing structure, wherein the computing structure is based on at least one of: the first unstructured data, the computing library associated with the first structured data, the set of computing prompts associated with the second unstructured data, or the set of computing structures associated with the second structured data; and transmitting, using the one or more computing device processors, the third structured data to a first system.

In one embodiment, at least one of the first unstructured data or the second unstructured data comprises at least one of: text, an image, a figure, a table, audio, a video, a graph, or a diagram.

According to some embodiments, the first unstructured data comprises at least one of: documentation of at least one system, or documentation of at least one process.

According to one embodiment, the computing structure comprises a system configuration.

In some embodiments, the set of computing structures associated with the second structured data comprises at least one example system configuration.

In other embodiments, the set of computing prompts associated with the second unstructured data comprises at least one of: at least one requirement associated with a system configuration, or at least one capability associated with the system configuration.

According to another embodiment, a method for generating structured data from files comprising unstructured data, and transmitting recommendations, based on the structured data, to a system storing the files, using a large language model (LLM) comprises: receiving, using one or more computing device processors, data, associated with a first computing format, from a first system; determining, using the one or more computing device processors, based on the first computing format, a set of computing prompts from the data; transmitting, using the one or more computing device processors, a first computing prompt from the set of computing prompts, to an LLM; receiving, using the one or more computing device processors, a first vector embedding for the first computing prompt from the set of computing prompts, from the LLM, wherein the first vector embedding comprises or is based on a first semantic structure of at least some first content comprised in or associated with the first computing prompt from the set of computing prompts; transmitting, using the one or more computing device processors, a second computing prompt, different from the first computing prompt, from the set of computing prompts, to the LLM; receiving, using the one or more computing device processors, a second vector embedding for the second computing prompt, different from the first computing prompt, from the set of computing prompts, from the LLM, wherein the second vector embedding comprises or is based on a second semantic structure or the first semantic structure of at least some second content comprised in or associated with the second computing prompt, different from the first computing prompt, from the set of computing prompts; generating, using the one or more computing device processors, a first computing prompt group comprising: the first computing prompt from the set of computing prompts, and the second computing prompt, different from the first computing prompt, from the set of computing prompts, wherein the generating the first computing prompt group comprises clustering the first computing prompt from the set of computing prompts, with the second computing prompt, different from the first computing prompt, from the set of computing prompts, based on a first similarity of the first vector embedding and the second vector embedding; first accessing, using the one or more computing device processors, a first database; determining, using the one or more computing device processors, for the first computing prompt from the set of computing prompts, using the first vector embedding, based on the first accessing the first database, at least one first file that at least partially corresponds with the first computing prompt from the set of computing prompts, wherein the at least one first file that at least partially corresponds with the first computing prompt from the set of computing prompts, comprises first unstructured data, wherein the determining the at least one first file that partially corresponds with the first computing prompt from the set of computing prompts, is based on a second similarity of the first vector embedding and at least one third vector embedding, wherein the at least one third vector embedding is associated with the at least one first file that at least partially corresponds with the first computing prompt from the set of computing prompts; second accessing, using the one or more computing device processors, the first database; determining, using the one or more computing device processors, for the second computing prompt, different from the first computing prompt, from the set of computing prompts, using the second vector embedding, based on the second accessing the first database, at least one second file that at least partially corresponds with the second computing prompt, different from the first computing prompt, from the set of computing prompts, wherein the at least one second file that at least partially corresponds with the second computing prompt, different from the first computing prompt, from the set of computing prompts, comprises second unstructured data, wherein the determining the at least one second file that partially corresponds with the second computing prompt, different from the first computing prompt, from the set of computing prompts, is based on a third similarity of the second vector embedding and at least one fourth vector embedding, wherein the at least one fourth vector embedding is associated with the at least one second file that at least partially corresponds with the second computing prompt, different from the first computing prompt, from the set of computing prompts; transmitting, using the one or more computing device processors, the first computing prompt group to the LLM; transmitting, using the one or more computing device processors, the at least one first file that at least partially corresponds with the first computing prompt from the set of computing prompts, to the LLM; transmitting, using the one or more computing device processors, the at least one second file that at least partially corresponds with the second computing prompt, different from the first computing prompt, from the set of computing prompts, to the LLM; receiving, using the one or more computing device processors, first structured data from the LLM, wherein the first structured data comprises or is based on the first computing prompt from the set of computing prompts, a first response associated with the first computing prompt from the set of computing prompts, a first citation associated with the first computing prompt from the set of computing prompts, a first file quality indicator associated with the first computing prompt from the set of computing prompts, the second computing prompt, different from the first computing prompt, from the set of computing prompts, a second response associated with the second computing prompt, different from the first computing prompt, from the set of computing prompts, a second citation associated with the second computing prompt, different from the first computing prompt, from the set of computing prompts, and a second file quality indicator associated with the second computing prompt, different from the first computing prompt, from the set of computing prompts; determining, using the one or more computing device processors, based on the first computing prompt from the set of computing prompts, and the first citation associated with the first computing prompt from the set of computing prompts, a first computing indicator; determining, using the one or more computing device processors, based on the second computing prompt, different from the first computing prompt, from the set of computing prompts, and the second citation associated with the second computing prompt, different from the first computing prompt, from the set of computing prompts, a second computing indicator; generating, using the one or more computing device processors, second structured data comprising or based on the first structured data, the first computing indicator, and the second computing indicator; generating, using the one or more computing device processors, based on the second structured data, at least one recommendation associated with at least one of: the first database, the at least one first file that at least partially corresponds with the first computing prompt from the set of computing prompts, or the at least one second file that at least partially corresponds with the second computing prompt, different from the first computing prompt, from the set of computing prompts; and transmitting, using the one or more computing device processors, the at least one recommendation to a second system or a user associated with the second system, wherein the second system manages the first database.

In some embodiments, the method further comprises transmitting, using the one or more computing device processors, the set of computing prompts and a set of responses associated with the set of computing prompts, to the first system.

In other embodiments, the method further comprises: accessing, using the one or more computing device processors, a second database; and transmitting, using the one or more computing device processors, the second structured data to the second database.

In one embodiment, the first similarity of the first vector embedding and the second embedding, is based on a semantic similarity of the first vector embedding and the second vector embedding.

Furthermore, in some embodiments, the semantic similarity of the first vector embedding and the second vector embedding is calculated based on one or more of: cosine similarity, Euclidean distance, Manhattan distance, Minkowski distance, Chebychev distance, and dot product similarity.

In another embodiment, the second similarity of the first vector embedding and the at least one third vector embedding further comprises a semantic similarity of the first vector embedding and the at least one third vector embedding.

According to some embodiments, an entry in the first database comprises a vector embedding associated with a file and metadata associated with the file.

In other embodiments, a system and a computer program can include or execute the method described above. These and other implementations may each optionally include one or more of the following features.

In some embodiments, the system comprises or is comprised in one or more computing systems associated with one or more locations According to one embodiment, the first computing prompt group comprises at least three computing prompts from the set of computing prompts.

In some cases, the first structured data comprises the set of computing prompts, a set of responses associated with the set of computing prompts, a set of citations associated with the set of computing prompts, and a set of file quality indicators associated with the set of computing prompts.

In one embodiment, the LLM is hosted on a third-party server.

In another embodiment, the LLM is hosted on a local server.

In some embodiments, the method comprises: receiving, using one or more computing device processors, data, associated with a first computing format, from a first system; determining, using the one or more computing device processors, based on the first computing format, a set of computing prompts from the data; transmitting, using the one or more computing device processors, a first computing prompt from the set of computing prompts, to an LLM; receiving, using the one or more computing device processors, a first vector embedding for the first computing prompt from the set of computing prompts, from the LLM, wherein the first vector embedding comprises or is based on a first semantic structure of at least some first content comprised in or associated with the first computing prompt from the set of computing prompts; transmitting, using the one or more computing device processors, a second computing prompt, different from the first computing prompt, from the set of computing prompts, to the LLM; receiving, using the one or more computing device processors, a second vector embedding for the second computing prompt, different from the first computing prompt, from the set of computing prompts, from the LLM, wherein the second vector embedding comprises or is based on a second semantic structure or the first semantic structure of at least some second content comprised in or associated with the second computing prompt, different from the first computing prompt, from the set of computing prompts; generating, using the one or more computing device processors, a first computing prompt group comprising: the first computing prompt from the set of computing prompts, and the second computing prompt, different from the first computing prompt, from the set of computing prompts, wherein the generating the first computing prompt group comprises clustering the first computing prompt from the set of computing prompts, with the second computing prompt, different from the first computing prompt, from the set of computing prompts, based on a first similarity of the first vector embedding and the second vector embedding; first accessing, using the one or more computing device processors, a first database; determining, using the one or more computing device processors, for the first computing prompt from the set of computing prompts, using the first vector embedding, based on the first accessing the first database, first file data, associated with at least one first file that at least partially corresponds with the first computing prompt from the set of computing prompts, wherein the at least one first file that at least partially corresponds with the first computing prompt from the set of computing prompts, comprises first unstructured data, wherein the determining the first file data, associated with the at least one first file that partially corresponds with the first computing prompt from the set of computing prompts, is based on a second similarity of the first vector embedding and at least one third vector embedding, wherein the at least one third vector embedding is associated with or comprised in the first file data; second accessing, using the one or more computing device processors, the first database; determining, using the one or more computing device processors, for the second computing prompt, different from the first computing prompt, from the set of computing prompts, using the second vector embedding, based on the second accessing the first database, second file data, associated with at least one second file that at least partially corresponds with the second computing prompt, different from the first computing prompt, from the set of computing prompts, wherein the at least one second file that at least partially corresponds with the second computing prompt, different from the first computing prompt, from the set of computing prompts, comprises second unstructured data, wherein the determining the second file data, associated with the at least one second file that partially corresponds with the second computing prompt, different from the first computing prompt, from the set of computing prompts, is based on a third similarity of the second vector embedding and at least one fourth vector embedding, wherein the at least one fourth vector embedding is associated with or comprised in the second file data; transmitting, using the one or more computing device processors, the first computing prompt group to the LLM; transmitting, using the one or more computing device processors, the first file data, associated with the at least one first file that at least partially corresponds with the first computing prompt from the set of computing prompts, to the LLM; transmitting, using the one or more computing device processors, the second file data, associated with the at least one second file that at least partially corresponds with the second computing prompt, different from the first computing prompt, from the set of computing prompts, to the LLM; receiving, using the one or more computing device processors, first structured data from the LLM, wherein the first structured data comprises the first computing prompt from the set of computing prompts, a first response associated with the first computing prompt from the set of computing prompts, a first citation associated with the first computing prompt from the set of computing prompts, a first file quality indicator associated with the first computing prompt from the set of computing prompts, the second computing prompt, different from the first computing prompt, from the set of computing prompts, a second response associated with the second computing prompt, different from the first computing prompt, from the set of computing prompts, a second citation associated with the second computing prompt, different from the first computing prompt, from the set of computing prompts, and a second file quality indicator associated with the second computing prompt, different from the first computing prompt, from the set of computing prompts; determining, using the one or more computing device processors, based on the first computing prompt from the set of computing prompts, and the first citation associated with the first computing prompt from the set of computing prompts, a first computing indicator; determining, using the one or more computing device processors, based on the second computing prompt, different from the first computing prompt, from the set of computing prompts, and the second citation associated with the second computing prompt, different from the first computing prompt, from the set of computing prompts, a second computing indicator; generating, using the one or more computing device processors, second structured data comprising or based on the first structured data, the first computing indicator and the second computing indicator; accessing, using the one or more computing device processors, a second database; transmitting, using the one or more computing device processors, the second structured data to the second database; generating, using the one or more computing device processors, based on the second structured data, at least one recommendation associated with the first database; and transmitting, using the one or more computing device processors, the at least one recommendation to a second system, wherein the second system manages the first database.

According to one embodiment, the unstructured data comprises raw information or information without a predetermined structure or format.

In some cases, the first citation, associated with the first computing prompt from the set of computing prompts, comprises at least one of: at least some first text from the first file data associated with the at least one first file that at least partially corresponds with the first computing prompt from the set of computing prompts, at least some second text from the second file data associated with the at least one second file that at least partially corresponds with the second computing prompt, different from the first computing prompt, from the set of computing prompts, a file name corresponding with the at least one first file that at least partially corresponds with the first computing prompt from the set of computing prompts or the at least one second file that at least partially corresponds with the second computing prompt, different from the first computing prompt, from the set of computing prompts, and a page number corresponding with the at least some first text from the first file data associated with the at least one first file that at least partially corresponds with the first computing prompt from the set of computing prompts, or the at least some second text from the second file data associated with the at least one second file that at least partially corresponds with the second computing prompt, different from the first computing prompt, from the set of computing prompts.

The first file quality indicator, in some embodiments, is based on metadata associated with the first citation.

In one embodiment, the determining, using the one or more computing device processors, based on the first computing prompt from the set of computing prompts, and the first citation, associated with the first computing prompt from the set of computing prompts, the first computing indicator, is based on a semantic similarity of the first vector embedding and a fifth vector embedding, wherein the fifth vector embedding is associated with the first citation.

According to some embodiments, the fifth vector embedding comprises or is comprised in the at least one third vector embedding or the at least one fourth vector embedding.

In one embodiment, the one or more computing device processors are comprised in one or more computing systems, wherein the one or more computing systems are located in one or more locations.

According to some embodiments, the at least one recommendation associated with the first database comprises at least one of: at least one recommendation associated with the at least one first file that at least partially corresponds with the first computing prompt from the set of computing prompts, at least one recommendation associated with the at least one second file that at least partially corresponds with the second computing prompt, different from the first computing prompt, from the set of computing prompts, or at least one recommendation associated with at least one third file that at least partially corresponds with a third computing prompt, different from the first computing prompt and the second computing prompt, from the set of computing prompts.

In other embodiments, the method further comprises updating or modifying, based on the at least one recommendation, the first database, wherein the updating or modifying the first database comprises or is based on at least one of: at least one request for an additional file to be inserted into the first database, wherein the additional file comprises or is associated with an improved file quality indicator or the additional file comprises or is associated with second data not comprised in the first database, or at least one request for an existing file in the first database to be updated.

BRIEF DESCRIPTION OF THE DRAWINGS

The disclosure is illustrated by way of example, and not by way of limitation in the figures of the accompanying drawings in which like reference numerals are used to refer to similar elements. It is emphasized that various features may not be drawn to scale and the dimensions of various features may be arbitrarily increased or reduced for clarity of discussion. Further, some components may be omitted in certain figures for clarity of discussion.

FIGS. 6A-6D show exemplary flowcharts for methods, systems/apparatuses, and computer program products that extract structured data from a source comprising unstructured data in a complex computing network such as the network of FIG. 1, in accordance with some embodiments of this disclosure.

FIGS. 10A-10E show exemplary flowcharts for methods, systems/apparatuses, and computer program products that generate structured data from files comprising unstructured data, and transmit recommendations, based on the structured data, to a system storing the files, using a large language model (LLM), in a complex computing network such as the network of FIG. 1, according to some embodiments of this disclosure.

Figure 1:
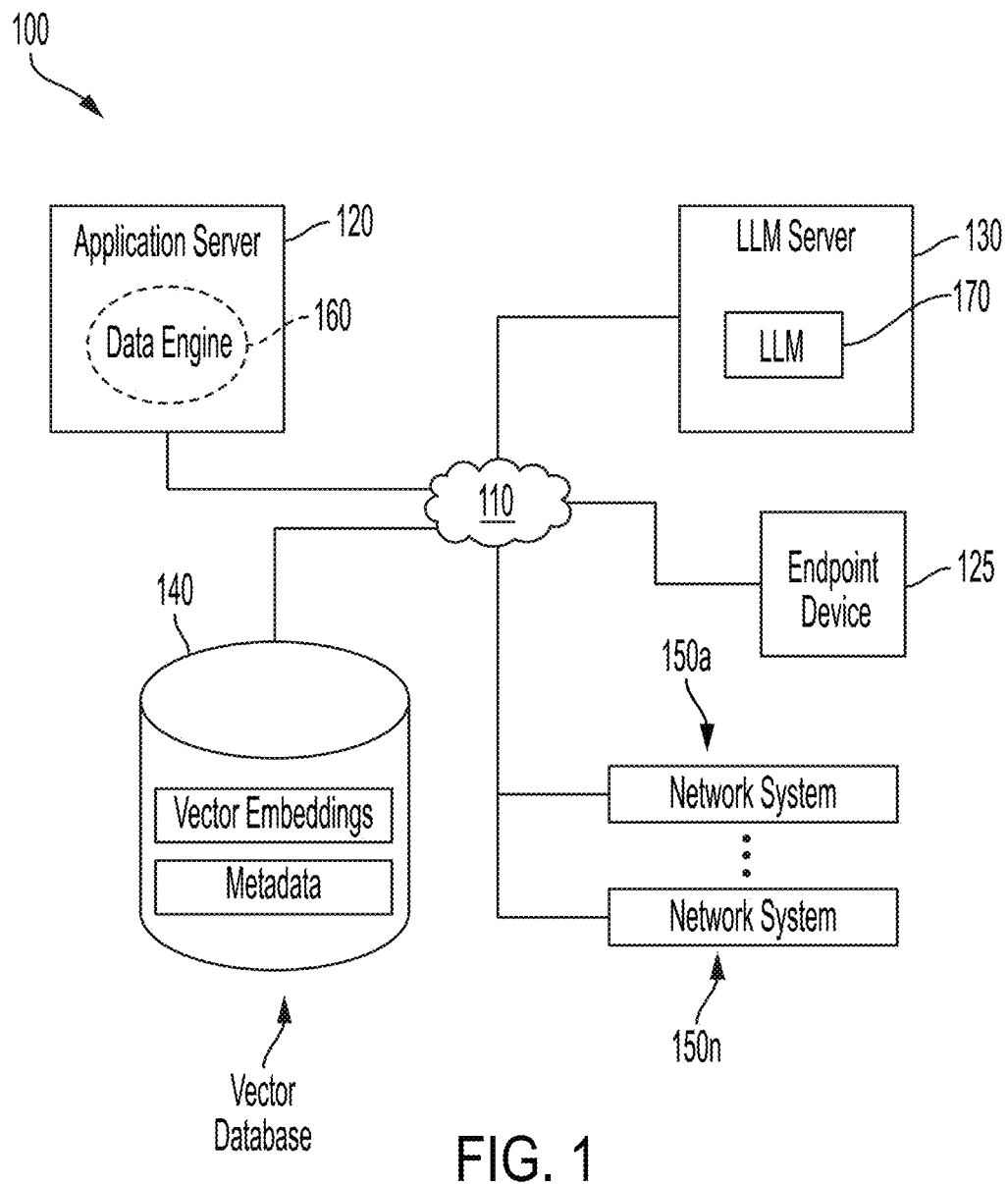
FIG. 1 is a high-level block diagram of a complex computing network for executing the principles disclosed.

All of these drawings are illustrations of certain embodiments. The scope of the claims is not limited to the specific embodiments illustrated in the drawings and described below.

DETAILED DESCRIPTION

System Environment

Illustrated in FIG. 1 is a high-level diagram of an exemplary system 100 for executing the principles disclosed. In the illustrated implementation, the system 100 may include an application server 120 communicatively coupled to a plurality of network systems 150a . . . 150n via a network 110. The system 100 may also include a large language model (LLM) server 130, a vector database 140, and an endpoint device 125 communicatively coupled via the network 110. While a single LLM server 130, a single vector database 140, and a single endpoint device 125 are illustrated, the disclosed principles and techniques could be expanded to include multiple LLM servers, multiple vector databases, and multiple endpoints.

In some embodiments, the application server 120 may include a computing device such as a mainframe server, a content server, a communication server, a laptop computer, a desktop computer, a handheld computing device, a smart phone, a wearable computing device, a tablet computing device, a virtual machine, a mobile computing device, a cloud-based computing solution and/or a cloud-based service, and/or the like. The application server 120 may include a plurality of computing devices configured to communicate with one another and/or implement the techniques described herein.

Figure 2:
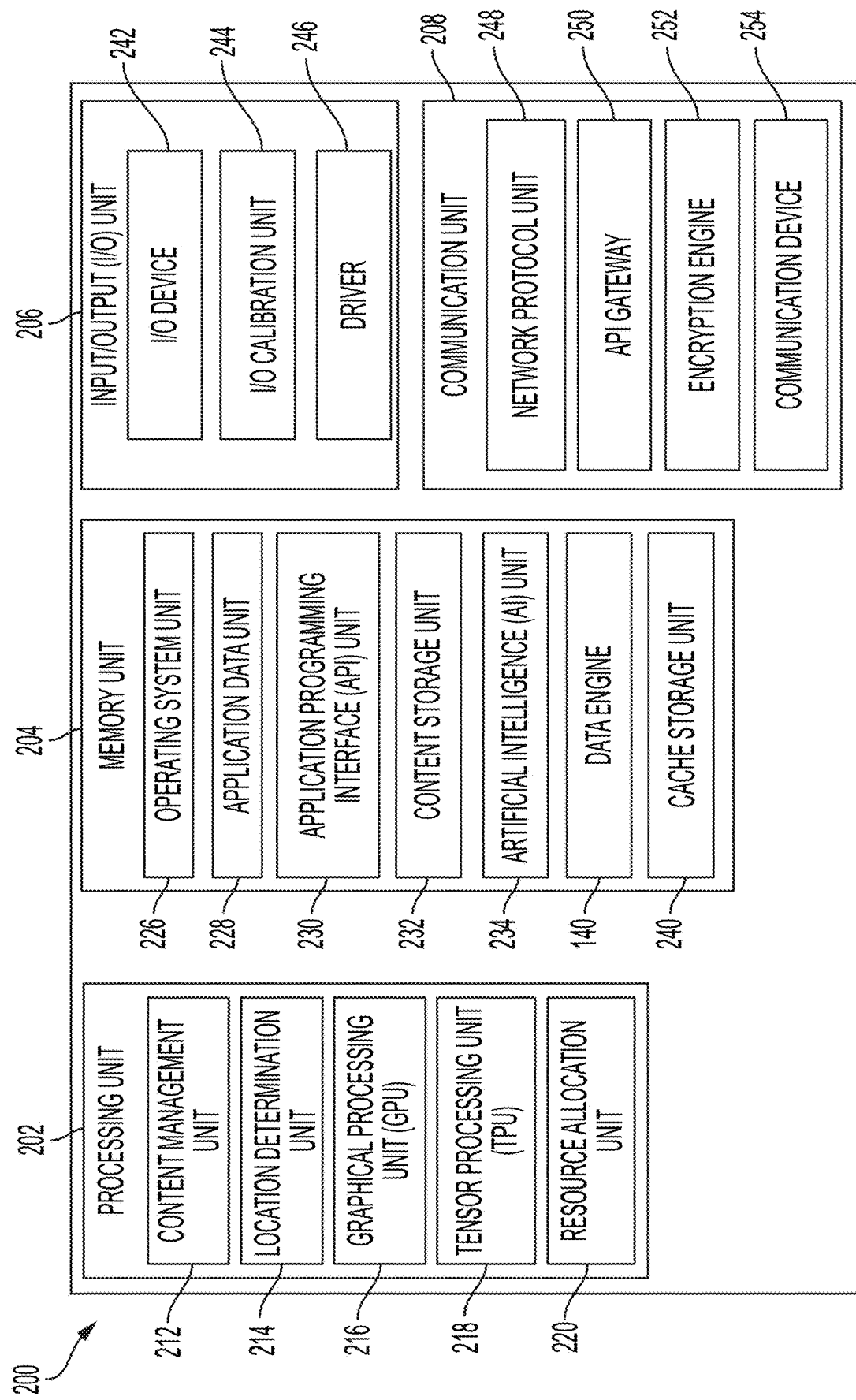
FIG. 2 is a functional block diagram of a complex computing environment associated with the disclosed techniques.
Figure 3:
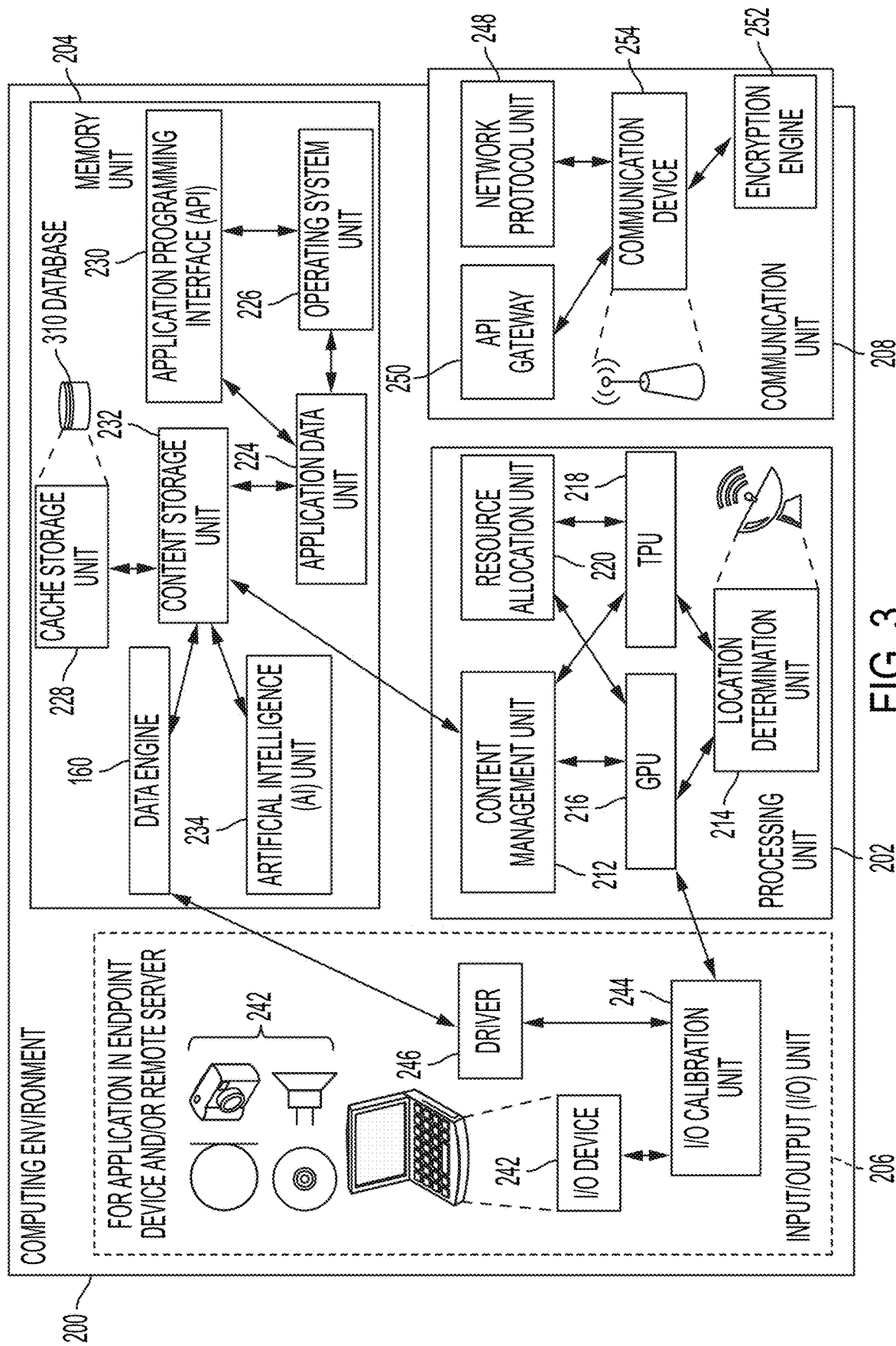
FIG. 3 is a detailed system diagram of the complex computing environment of FIG. 2.

The application server 120 may include various elements of a computing environment as described in association with the computing environment 200 of FIGS. 2 and 3. For example, the application server 120 may include processing unit 202, a memory unit 204, an input/output (I/O) unit 206, and/or a communication unit 208 which are discussed in association with FIGS. 2 and 3. The application server 120 may further include subunits and/or other modules for performing operations associated with generating structured data from a file comprising unstructured data based on accessing a large language model (LLM), and generating an indexed computing file based on inserting vector embeddings and metadata, received from an LLM, into a configured vector database. The application server 120 may be locally or remotely operated as the case may require.

Turning back to FIG. 1, the application server 120 may include a data engine 160. The data engine 160 may either be implemented on the application server 120 and/or on the endpoint device 125. The data engine 160 may include one or more instructions or computer logic that are executed by the one or more processors such as the processors discussed in association with FIGS. 2 and 3. In particular, the data engine 160 facilitates executing the processing procedures, methods, techniques, and workflows provided in this disclosure. Some embodiments include an iterative refinement of one or more data models (e.g., learning model, large language model) associated with the network environment 100 disclosed via feedback loops executed by one or more computing device processors and/or through other control devices or mechanisms that make determinations regarding optimization of a given action, template, or model.

In some embodiments, the one or more data engines may access an operating system of a computing device comprised in the network environment 100 in order to execute the disclosed techniques. For instance, the one or more data engines may gain access into an operating system associated with the network environment 100 to initiate the various processes disclosed.

Turning back to FIG. 1, the endpoint device 125 may be a handheld computing device, a smart phone, a tablet, a laptop computer, a desktop computer, a personal digital assistant (PDA), a smart device, a wearable device, a biometric device, a computer server, a virtual server, a virtual machine, a mobile device, and/or a communication server. In some embodiments, the endpoint device 125 may include a plurality of computing devices configured to communicate with one another and/or implement the techniques described in this disclosure.

The other elements of the endpoint device 125 are discussed in association with the computing environment 200 of FIGS. 2 and 3. For example, elements such as a processing unit 202, a memory unit 204, an input/output (I/O) unit 206, and/or a communication unit 208 may execute one or more of the modules of endpoint device 125 shown in FIG. 1. The endpoint device 125 may also include subunits and/or other computing instances as provided in this disclosure for performing operations associated with generating structured data from a file comprising unstructured data based on accessing an LLM, generating an indexed computing file based on inserting vector embeddings and metadata, received from an LLM, into a configured vector database, etc.

The network 110 may include a plurality of networks. For instance, the network 110 may include any wired and/or wireless communication network that facilitates communication between the application server 120, the endpoint device 125, the LLM server 130, the vector database 140, and the network systems 150a . . . 150n. The network 110, in some instances, may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, a 5G network, and/or the like.

The network systems 150a . . . 150n may include one or more computing devices or servers, services, or applications that can be accessed by application server 120 and/or the vector database 140 and/or the LLM server 130 and/or the endpoint device 125 via the network 110. In one embodiment, the network systems 150a . . . 150n comprises third-party applications or services that are native or non-native to either the application server 120 and/or the LLM server 130 and/or the endpoint device 125. The third-party applications or services, for example, may facilitate receiving one or more files comprising unstructured data. According to some implementations, the applications or services associated with the network systems 150a . . . 150n and/or associated with the application server 120, and/or the LLM server 130, and/or the vector database 140 and/or the endpoint device 125 must be registered to activate or otherwise enable their usage in the network environment 100.

Returning to FIG. 1, the vector database 140 may comprise one or more storage devices that store data, information and instructions used by the application server 120 and/or the LLM server 130 and/or the endpoint device 125. The stored information may include information about metadata, information about vector embeddings, information associated with a file comprising unstructured data, etc. In one embodiment, the one or more storage devices mentioned above in association with the vector database 140 can be non-volatile memory or similar permanent storage device and media. For example, the one or more storage devices may include a hard disk drive, a CD-ROM device, a DVD-ROM device, a DVD-RAM device, a DVD-RW device, a flash memory device, solid state media, or some other mass storage device known in the art for storing information on a more permanent basis.

While the vector database 140 is shown as being coupled to the application server 120, the endpoint device 125, and the LLM server 130 via the network 110, the data in the vector database 140 may be replicated, in some embodiments, on the application server 120 and/or the LLM server 130 and/or the endpoint device 125. That is to say that a local copy of the data in the vector database 140 may be stored on the application server 120 and/or the LLM server 130 and/or the endpoint device 125. This local copy may be synced with the vector database 140 so that when there are any changes to the information in the vector database 140, the local copy on either the application server 120 and/or the LLM server 130 and/or the endpoint device 125 is also similarly updated or synced in real-time or in near-real-time to be consistent with the information in the vector database 140 and vice versa.

Turning back to FIG. 1, in some embodiments, the LLM server 130 may include a computing device such as a mainframe server, a content server, a communication server, a laptop computer, a desktop computer, a handheld computing device, a smart phone, a wearable computing device, a tablet computing device, a virtual machine, a mobile computing device, a cloud-based computing solution and/or a cloud-based service, and/or the like. The LLM server 130 may include a plurality of computing devices configured to communicate with one another and/or implement the techniques described herein.

The LLM server 130 may include various elements of a computing environment as described in association with the computing environment 200 of FIGS. 2 and 3. For example, the LLM server 130 may include processing unit 202, a memory unit 204, an input/output (I/O) unit 206, and/or a communication unit 208 which are discussed in association with FIGS. 2 and 3. The LLM server 130 may further include subunits and/or other modules for performing operations associated with generating structured data from a file comprising unstructured data based on accessing an LLM, generating an indexed computing file based on inserting vector embeddings and metadata, received from an LLM, into a configured vector database, etc. The LLM server 130 may be locally hosted. Additionally or alternatively, the LLM server may be hosted by a third-party.

In some embodiments, the LLM server 130 may include an LLM 170 for comprehending and generating text. The LLM 170 may be trained with at least one of: zero-shot learning, few-shot learning, and fine-tuning. The LLM 170 may comprise at least one of: GPT-4, LLaMA-3, BLOOM, PaLM, GPT-3.5, BERT, Gemini, LaMDA, and Falcon. The LLM 170 may also include multiple LLMs and therefore may be configured to perform and/or execute multiple processes in parallel. In some embodiments, the LLM server 130 may include a special chipset for processing large numbers of complex operations in a reduced amount of time.

FIGS. 2 and 3 illustrate exemplary functional and system diagrams of a computing environment 200, according to some embodiments of this disclosure. Specifically, FIG. 2 provides a functional block diagram of the computing environment 200, whereas FIG. 3 provides a detailed system diagram of the computing environment 200.

As seen in FIGS. 2 and 3, the computing environment 200 may include a processing unit 202, a memory unit 204, an I/O unit 206, and a communication unit 208. The processing unit 202, the memory unit 204, the I/O unit 206, and the communication unit 208 may include one or more subunits for performing operations described in this disclosure. Additionally, each unit and/or subunit may be operatively and/or otherwise communicatively coupled with each other and to the network 110. The computing environment 200 may be implemented on general-purpose hardware and/or specifically-purposed hardware as the case may be. In particular, the computing environment 200 and any units and/or subunits of FIGS. 2 and 3 may be included in one or more elements of system 100 as described above.

The processing unit 202 may control one or more of the memory unit 204, the I/O unit 206, and the communication unit 208 of the computing environment 200, as well as any included subunits, elements, components, devices, and/or functions performed by the memory unit 204, I/O unit 206, and the communication unit 208. The described sub-elements of the computing environment 200 may also be included in similar fashion in any of the other units and/or devices included in the system 100 of FIG. 1. Additionally, any actions described herein as being performed by a processor may be taken by the processing unit 202 of FIGS. 2 and 3 alone and/or by the processing unit 202 in conjunction with one or more additional processors, units, subunits, elements, components, devices, and/or the like. Further, while one processing unit 202 may be shown in FIGS. 2 and 3, multiple processing units may be present and/or otherwise included in the computing environment 200 or elsewhere in the overall system (e.g., system 100 of FIG. 1). Thus, while instructions may be described as being executed by the processing unit 202 (and/or various subunits of the processing unit 202), the instructions may be executed simultaneously, serially, and/or otherwise by one or multiple processing units 202 on one or more devices.

In some embodiments, the processing unit 202 may be implemented as one or more computer processing unit (CPU) chips and/or graphical processing unit (GPU) chips and may include a hardware device capable of executing computer instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits, and/or elements of the aforementioned units, other devices, and/or computing environments, and/or the like.

In some embodiments, the processing unit 202 may include, among other elements, subunits such as a content management unit 212, a location determination unit 214, a graphical processing unit (GPU) 216, a tensor processing unit (TPU) 218, and a resource allocation unit 220. Each of the aforementioned subunits of the processing unit 202 may be communicatively and/or otherwise operably coupled with each other.

The content management unit 212 may facilitate generation, modification, analysis, transmission, and/or presentation of content. Content may be file content, exception event content, media content, security event content, tracking content, or any combination thereof. In some instances, content on which the content management unit 212 may operate includes device information, user interface data, image data, text data, themes, audio data or audio files, video data or video files, documents, and/or the like. Additionally, the content management unit 212 may control the audiovisual environment and/or appearance of application data during execution of various processes. In some embodiments, the content management unit 212 may interface with a third-party content server (e.g., third-party content server associated with the LLM server 130), and/or specific memory locations for execution of its operations.

The location determination unit 214 may facilitate detection, generation, modification, analysis, transmission, and/or presentation of location information. Location information may include global positioning system (GPS) coordinates, an internet protocol (IP) address, a media access control (MAC) address, geolocation information, a port number, a server number, a proxy name and/or number, device information (e.g., a serial number), an address, a zip code, and/or the like. In some embodiments, the location determination unit 214 may include various sensors, radar, and/or other specifically-purposed hardware elements for the location determination unit 214 to acquire, measure, and/or otherwise transform location information.

The GPU 216 may facilitate generation, modification, analysis, processing, transmission, and/or presentation of content described above, as well as any data (e.g., file quality data, metadata, structured data, unstructured data, filter data, etc.) described herein. In some embodiments, the GPU 216 may be utilized to render content for presentation on a computing device. In some embodiments, the GPU 216 may be utilized to perform computations on vector embeddings. The GPU 216 may also include multiple GPUs and therefore may be configured to perform and/or execute multiple processes in parallel. In some implementations, the GPU 216 may be used in conjunction with the data engine 160, and/or the TPU 218 and/or other subunits associated with the memory unit 204, the I/O unit 206, the communication unit 208, and/or a combination thereof.

The TPU 218 may facilitate generation, modification, analysis, processing, transmission, and/or presentation of any vector embeddings described herein. In some embodiments, the TPU 218 may be utilized to perform computations comprising or based on vector embeddings. For example, the TPU may execute similarity operations (e.g., semantic similarity operations) on vector embeddings. In some instances, the similarity operations are calculated based on at least one of cosine similarity, Euclidean distance, Manhattan distance, Minkowski distance, Chebychev distance, and dot product similarity. In some embodiments, the similarity operations comprise or are based on two vector embeddings. In other embodiments, the similarity operations comprise or are based on at least three vector embeddings.

The TPU 218 may also include multiple TPUs and therefore may be configured to perform and/or execute multiple processes in parallel. In some implementations, the TPU 218 may be used in conjunction with the data engine 160, and/or the GPU 216, and/or other subunits associated with the memory unit 204, the I/O unit 206, the communication unit 208, and/or a combination thereof. In some embodiments, the TPU 218 may interface with a third-party content server (e.g., third-party content server associated with the LLM server 130) for execution of its operations.

The resource allocation unit 220 may facilitate the determination, monitoring, analysis, and/or allocation of computing resources throughout the computing environment 200 and/or other computing environments. For example, the computing environment may facilitate a high volume of data (e.g., file quality data, metadata, structured data, unstructured data, filter data, etc.), to be processed and analyzed. As such, computing resources of the computing environment 200 used by the processing unit 202, the memory unit 204, the I/O unit 206, and/or the communication unit 208 (and/or any subunit of the aforementioned units) such as processing power, data storage space, network bandwidth, and/or the like may be in high demand at various times during operation of the computing environment 200. Accordingly, the resource allocation unit 220 may include sensors and/or other specially-purposed hardware for monitoring performance of each unit and/or subunit of the computing environment 200, as well as hardware for responding to the computing resource needs of each unit and/or subunit. In some embodiments, the resource allocation unit 220 may use computing resources of a second computing environment separate and distinct from the computing environment 200 to facilitate a desired operation. For example, the resource allocation unit 220 may determine a number of simultaneous computing processes and/or requests. The resource allocation unit 220 may also determine that the number of simultaneous computing processes and/or requests meet and/or exceed a predetermined threshold value. Based on this determination, the resource allocation unit 220 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for safe and efficient operation of the computing environment while supporting the number of simultaneous computing processes and/or requests. The resource allocation unit 220 may then retrieve, transmit, control, allocate, and/or otherwise distribute determined amount(s) of computing resources to each element (e.g., unit and/or subunit) of the computing environment 200 and/or another computing environment.

The memory unit 204 may be used for storing, recalling, receiving, transmitting, and/or accessing various files and/or data (e.g., file quality data, metadata, structured data, unstructured data, filter data, etc.) during operation of computing environment 200. For example, memory unit 204 may be used for storing, recalling, and/or updating file quality data, metadata, structured data, unstructured data, and/or filter data as well as other data associated with, resulting from, and/or generated by any unit, or combination of units and/or subunits of the computing environment 200. In some embodiments, the memory unit 204 may store instructions, code, and/or data that may be executed by the processing unit 202. For instance, the memory unit 204 may store code that execute operations associated with one or more units and/or one or more subunits of the computing environment 200. For example, the memory unit may store code for the processing unit 202, the I/O unit 206, the communication unit 208, and for itself.

Memory unit 204 may include various types of data storage media such as solid state storage media, hard disk storage media, virtual storage media, and/or the like. Memory unit 204 may include dedicated hardware elements such as hard drives and/or servers, as well as software elements such as cloud-based storage drives. In some implementations, memory unit 204 may be a random access memory (RAM) device, a dynamic random access memory (DRAM) device, a static random access memory (SRAM) device, flash memory, read only memory (ROM) device, and/or various forms of secondary storage. The RAM device may be used to store volatile data and/or to store instructions that may be executed by the processing unit 202. For example, the instructions stored by the RAM device may be a command, a current operating state of computing environment 200, an intended operating state of computing environment 200, and/or the like. As a further example, data stored in the RAM device of memory unit 204 may include instructions related to various methods and/or functionalities described herein. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage.

Secondary storage may comprise one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory unit 204 may include one or more databases 310 (shown in FIG. 3) for storing any data described herein. For example, depending on the implementation, the one or more databases may be used as a local database of the network systems 150a . . . 150n discussed with reference to FIG. 1. Additionally or alternatively, one or more secondary databases (e.g., the vector database 140 discussed with reference to FIG. 1) located remotely from computing environment 200 may be used and/or accessed by memory unit 204. In some embodiments, memory unit 204 and/or its subunits may be local to the application server 120 and/or the endpoint device 125 and/or the network systems 150a . . . 150n and/or remotely located in relation to the application server 120 and/or the endpoint device 125 and/or the network systems 150a . . . 150n.

Turning back to FIG. 2, the memory unit 204 may include subunits such as an operating system unit 226, an application data unit 228, an application programming interface (API) unit 230, a content storage unit 232, an artificial intelligence (AI) unit 234, a data engine 160, and a cache storage unit 240. Each of the aforementioned subunits of the memory unit 204 may be communicatively and/or otherwise operably coupled with each other and other units and/or subunits of the computing environment 200. It is also noted that the memory unit 204 may include other modules, instructions, or code that facilitate the execution of the techniques described.

The operating system unit 226 may facilitate deployment, storage, access, execution, and/or utilization of an operating system utilized by computing environment 200 and/or any other computing environment described herein. In some embodiments, operating system unit 226 may include various hardware and/or software elements that serve as a structural framework for processing unit 202 to execute various operations described herein. Operating system unit 226 may further store various pieces of information and/or data associated with the operation of the operating system and/or computing environment 200 as a whole, such as a status of computing resources (e.g., processing power, memory availability, resource utilization, and/or the like), runtime information, modules to direct execution of operations described herein, user permissions, security credentials, and/or the like.

The application data unit 228 may facilitate deployment, storage, access, execution, and/or utilization of an application used by computing environment 200 and/or any other computing environment described herein. For example, the endpoint device 125 may be required to download, install, access, and/or otherwise use a software application (e.g., web application) to facilitate performance of the disclosed techniques. As such, the application data unit 228 may store any information and/or data associated with an application.

The application data unit 228 may further store various pieces of information and/or data associated with the operation of an application and/or computing environment 200 as a whole, such as status of computing resources (e.g., processing power, memory availability, resource utilization, and/or the like), runtime information, user interfaces, modules to direct execution of operations described herein, user permissions, security credentials, and/or the like.

The API unit 230 may facilitate deployment, storage, access, execution, and/or utilization of information associated with APIs of computing environment 200 and/or any other computing environment described herein. For example, computing environment 200 may include one or more APIs for various devices, applications, units, subunits, elements, and/or other computing environments to communicate with each other and/or utilize the same data. Accordingly, API unit 230 may include API databases containing information that may be accessed and/or utilized by applications, units, subunits, elements, and/or operating systems of other devices and/or computing environments. In some embodiments, each API database may be associated with a customized physical circuit included in memory unit 204 and/or API unit 230. Additionally, each API database may be public and/or private, and so authentication credentials may be required to access information in an API database. In some embodiments, the API unit 230 may enable the application server 120, the endpoint device 125, and the network systems 150*a* . . . 150*n* to communicate with each other. It is appreciated that the API unit 230 may facilitate accessing, using the data engine 160, one or more applications or services on the application server 120 and/or the network systems 150*a* . . . 150*n*.

The content storage unit 232 may facilitate deployment, storage, access, and/or utilization of information associated with performance of implementing operations associated with the network environment 100 by computing environment 200 and/or any other computing environment described herein. In some embodiments, content storage unit 232 may communicate with content management unit 212 to receive and/or transmit content files (e.g., media content, file quality data content, metadata content, structured data content, unstructured data content, filter data content, etc.).

The AI unit 234 may facilitate deployment, storage, access, execution, and/or utilization of information associated with the use of AI within the computing environment 200 and/or any other computing environment described herein. For example, the network environment 100 may utilize the AI unit 234 for configuration management, and/or troubleshooting, and/or network performance. In some embodiments, the LLM server 130 may utilize the AI unit 234 for comprehending and/or generating text with the LLM 170.

As previously discussed, the data engine 160 facilitates executing the processing procedures, methods, techniques, and workflows provided in this disclosure. In particular, the data engine 160 may be configured to execute computing operations associated with the disclosed methods, systems/ apparatuses, and computer program products.

The cache storage unit 240 may facilitate short-term deployment, storage, access, analysis, and/or utilization of data. In some embodiments, cache storage unit 240 may serve as a short-term storage location for data so that the data stored in cache storage unit 240 may be accessed quickly. In some instances, cache storage unit 240 may include RAM devices and/or other storage media types for quick recall of stored data. Cache storage unit 240 may include a partitioned portion of storage media included in memory unit 204.

The I/O unit 206 may include hardware and/or software elements for the computing environment 200 to receive, transmit, and/or present information useful for performing the disclosed processes. For example, elements of the I/O unit 206 may be used to receive input from a user of the endpoint device 125. As described herein, I/O unit 206 may include subunits such as an I/O device 242, an I/O calibration unit 244, and/or driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, I/O device 242 may include a variety of elements that enable a user to interface with computing environment 200. For example, I/O device 242 may include a keyboard, a touchscreen, a button, a sensor, a biometric scanner, a laser, a microphone, a camera, and/or another element for receiving and/or collecting input from a user. Additionally and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing unit 202 and/or memory unit 204 to execute operations associated with the disclosed techniques and systems.

The I/O calibration unit 244 may facilitate the calibration of the I/O device 242. For example, I/O calibration unit 244 may detect and/or determine one or more settings of I/O device 242, and then adjust and/or modify settings so that the I/O device 242 may operate more efficiently. In some embodiments, I/O calibration unit 244 may use a driver 246 (or multiple drivers) to calibrate I/O device 242. For example, the driver 246 may include software that is to be installed by I/O calibration unit 244 so that an element of computing environment 200 (or an element of another computing environment) may recognize and/or integrate with I/O device 242 for the processes described herein.

The communication unit 208 may facilitate establishment, maintenance, monitoring, and/or termination of communications between computing environment 200 and other computing environments, third-party server systems, and/or the like (e.g., between the application server 120 and the LLM server 130 and/or the endpoint device 125 and/or the network systems 150*a* . . . 150*n*). Communication unit 208 may also facilitate internal communications between various elements (e.g., units and/or subunits) of computing environment 200. In some embodiments, communication unit 208 may include a network protocol unit 248, an API gateway 250, an encryption engine 252, and/or a communication device 254. Communication unit 208 may include hardware and/or other software elements.

The network protocol unit 248 may facilitate establishment, maintenance, and/or termination of a communication connection for computing environment 200 by way of a network. For example, the network protocol unit 248 may detect and/or define a communication protocol required by a particular network and/or network type. Communication protocols used by the network protocol unit 248 may include Wi-Fi protocols, Li-Fi protocols, cellular data network protocols, Bluetooth® protocols, WiMAX protocols, Ethernet protocols, powerline communication (PLC) protocols, mesh network protocols, 5G network protocols, and/or the like. In some embodiments, facilitation of communication for computing environment 200 may include transforming and/or translating data from being compatible with a first communication protocol to being compatible with a second communication protocol. In some embodiments, the network protocol unit 248 may determine and/or monitor an amount of data traffic to consequently determine which particular network protocol is to be used for establishing a secure communication connection, transmitting data, and/or performing malware scanning operations and/or other processes described herein.

The API gateway 250 may allow other devices and/or computing environments to access the API unit 230 of the memory unit 204 associated with the computing environment 200. For example, an endpoint device 125 may access the API unit 230 of the computing environment 200 via the API gateway 250. In some embodiments, the API gateway 250 may be required to validate user credentials associated with a user of the endpoint device 125 prior to providing access to the API unit 230 to a user. The API gateway 250 may include instructions for the computing environment 200 to communicate with another computing device and/or between elements of the computing environment 200.

The encryption engine 252 may facilitate translation, encryption, encoding, decryption, and/or decoding of information received, transmitted, and/or stored by the computing environment 200. Using encryption engine 252, each transmission of data may be encrypted, encoded, and/or translated for security reasons, and any received data may be encrypted, encoded, and/or translated prior to its processing and/or storage. In some embodiments, encryption engine 252 may generate an encryption key, an encoding key, a translation key, and/or the like, which may be transmitted along with any data content.

The communication device 254 may include a variety of hardware and/or software specifically purposed to facilitate communication for computing environment 200 and or between two or more computing environments 200. In one embodiment, communication device 254 may include one or more radio transceivers, chips, analog front end (AFE) units, antennas, processing units, memory, other logic, and/or other components to implement communication protocols (wired or wireless) and related functionality for facilitating communication for computing environment 200. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or other transceiver devices used for communication purposes.

EXEMPLARY EMBODIMENTS

Figure 4A:
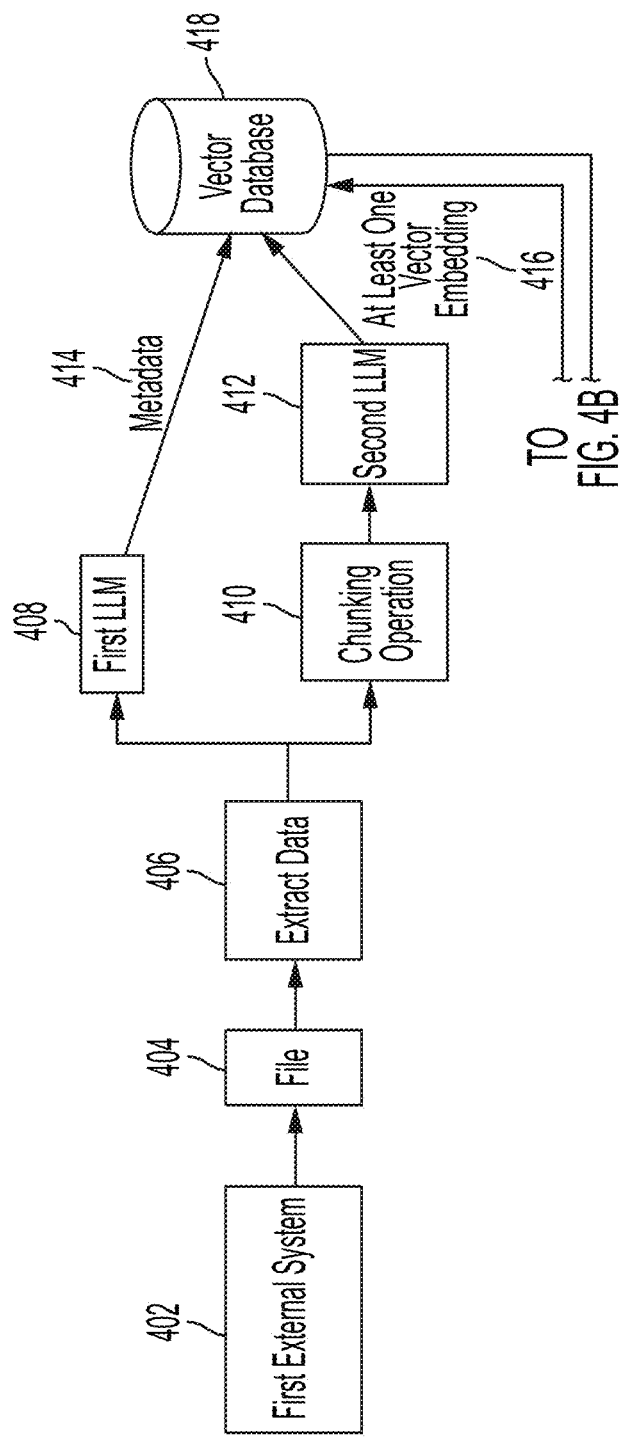
FIGS. 4A-4B show exemplary workflows for generating an indexed computing file based on inserting vector embeddings and metadata, received from a large language model (LLM), into a configured vector database and extracting structured data from a source comprising unstructured data, respectively, in a complex computing network according to some embodiments of this disclosure.

FIG. 4A shows an exemplary workflow for generating an indexed computing file based on inserting vector embeddings and metadata, received from a large language model (LLM), into a configured vector database in a system (e.g., application server 120 in FIG. 1) within a complex computing network such as the network of FIG. 1 according to some embodiments. The various blocks of FIG. 4A may be executed in a different order from that shown in FIG. 4A. Some blocks may be optional. As shown in the figure, the system receives a file 404 from a first external system (e.g., at least one of a computing system, a database, etc.). In one embodiment, the first external system 402 is referred to as a first file source. In another embodiment, the first external system 402 may be one of the network systems 150-150n. In some embodiments, the file 404 may comprise: an audit document, a Service Organization Control (SOC) 2 report, a policy document, a 10K financial report, a technical description document, a SOC 1 report, a data security document, a corporate charter, an information technology procedure document, a financial report, a questionnaire, a 10 Q report, a human resources document, or a screenshot of an internal system. Following receipt of the file 404, the system extracts data 406 from the file 404. In some embodiments, the data from the file 404 may comprise at least one of text, an image, a figure, a diagram, a graph, and/or a table.

The system transmits data from the file 404 to a first LLM 408 at a first time. In some embodiments, the first LLM 408 comprises at least one of: GPT-4, LLaMA-3, BLOOM, PaLM, GPT-3.5, BERT, Gemini, LaMDA, and Falcon. Any list of LLMs, vector databases, similarity operations, and file types in this disclosure is provided for exemplary purposes only. Other LLMs, vector databases, similarity operations, and file types may additionally or alternatively be used. In one embodiment, the first LLM 408 is hosted on a first third-party server. According to another embodiment, the first LLM 408 is hosted on a local server. The system receives metadata 414 associated with the file 404 from the first LLM 408. In some embodiments, the metadata 414 associated with the file 404 comprises file quality data. Furthermore, the file quality data comprises or is based on at least one of: a nature of the file 404, a credibility of the file 404, a freshness of the file 404, and a file quality indicator of the file 404. In some embodiments, the system (e.g., the application server 120, an apparatus, etc.) may comprise one or more computing systems.

In some embodiments, the file quality data comprising or being based on the at least one of: the nature of the file 404, the credibility of the file 404, the freshness of the file 404, and the file quality indicator of the file 404, further comprises or is based on at least two of: the nature of the file 404, the credibility of the file 404, the freshness of the file 404, and the file quality indicator of the file 404. In other embodiments, the file quality data comprising or being based on the at least one of: the nature of the file 404, the credibility of the file 404, the freshness of the file 404, and the file quality indicator of the file 404, further comprises or is based on at least three of: the nature of the file 404, the credibility of the file 404, the freshness of the file 404, and the file quality indicator of the file 404. In yet other embodiments, the file quality data comprising or being based on the at least one of: the nature of the file 404, the credibility of the file 404, the freshness of the file 404, and the file quality indicator of the file 404, further comprises or is based on: the nature of the file 404, the credibility of the file 404, the freshness of the file 404, and the file quality indicator of the file 404.

In one embodiment, the nature of the file 404 further comprises an indicator associated with a classification of the file 404. Furthermore, the classification of the file 404 may be at least one of: audit from a reliable source, audit from an unreliable source, policy or procedure document, and unofficial document. In some embodiments, the indicator associated with the classification of the file 404 is numerical. In another embodiment, the credibility of the file 404 comprises an indicator associated with a source of the file 404. In some embodiments, the indicator associated with the source of the file 404 is numerical. In yet other embodiments, the freshness of the file 404 comprises an indicator associated with a creation time of the file 404. In some embodiments, the file quality indicator of the file 404 comprises or is based on the nature of the file 404, the credibility of the file 404, and the freshness of the file 404 (e.g. an average of the nature of the file 404, the credibility of the file 404, and the freshness of the file 404, a median of the nature of the file 404, the credibility of the file 404, and the freshness of the file 404, etc.). In one embodiment, the file quality indicator comprises an overall quality score.

In some embodiments, the metadata 414 associated with the file 404 further comprises a citation. Furthermore, the citation may comprise at least some text from the file 404, a file name corresponding with the file 404, and a page number associated with the at least some text from the file 404. In some embodiments, the at least some text from the file 404 is a quote from the file 404. The quote may comprise one of: a main idea of the file 404, a brief summary of the file 404, or a direct quote from the file 404. In another embodiment, the metadata 414 associated with the file 404 further comprises third-party source data. Furthermore, the third-party source data may comprise at least one of: a source of the file 404, a client associated with the file 404, a tenant associated with the file 404.

At the first time or a second time, the system executes a chunking operation 410 using the file 404, thereby resulting in a chunked file. In one embodiment, the second time is prior to the first time. In another embodiment, the second time is after the first time. The system transmits the data associated with the chunked file to a second LLM 412. In some embodiments, the second LLM 412 comprises at least one of: GPT-4, LLaMA-3, BLOOM, PaLM, GPT-3.5, BERT, Gemini, LaMDA, and Falcon. According to one embodiment, the second LLM 412 is hosted on a second third-party server. In some embodiments, the second third-party server comprises or is comprised in the first third-party server. In another embodiment, the second LLM 412 is hosted on the local server. In one embodiment, the second LLM 412 comprises or is comprised of the first LLM 408. The system receives at least one vector embedding 416 for the data associated with the chunked file from the second LLM 412.

In some embodiments, the at least one vector embedding 416 comprises or is based on a semantic structure of at least some of the data associated with the chunked file. Furthermore, the semantic structure of the at least some of the data associated with the chunked file comprises a conceptual meaning of the at least some of the data associated with the chunked file. In some embodiments, the data from the chunked file may comprise text, an image, a figure, a diagram, a graph, and/or a table. In other embodiments, the at least some of the data associated with the chunked file comprises or is based on: a word from the chunked file, a phrase from the chunked file, a sentence from the chunked file, a paragraph from the chunked file, an image from the chunked file, a figure from the chunked file, a diagram from the chunked file, a graph from the chunked file, a table from the chunked file, or the chunked file.

The system configures the vector database 418 to store vector embeddings and metadata, thereby resulting in a configured vector database. In some embodiments, the vector database 418 comprises at least one of: Chroma, Vespa, Marqo, Drant, LanceDB, Milvus, Pinecone, Weaviate, and PostgreSQL. At a third time following the first time and the second time, the system inserts the metadata 414 associated with the file 404 into the configured database. At a fourth time or the third time, the system inserts the at least one vector embedding 416 for the data associated with the chunked file into the configured vector database. In one embodiment, the fourth time is before the third time. In another embodiment, the fourth time is after the third time.

Upon insertion of the metadata 414 associated with the file 404 and the at least one vector embedding 416 for the data associated with the chunked file into the configured vector database, the system generates an indexed computing file. In some embodiments, the indexed computing file may be referred to as an entry in the vector database, and/or an entry in the configured vector database, and/or a record in the vector database, and/or a record in the configured vector database. In some embodiments, the system may store the indexed computing file in a fourth external system. In one embodiment, the fourth external system comprises a file repository. In another embodiment, the fourth external system may be one of the network systems 150-150*n*.

Figure 4B:
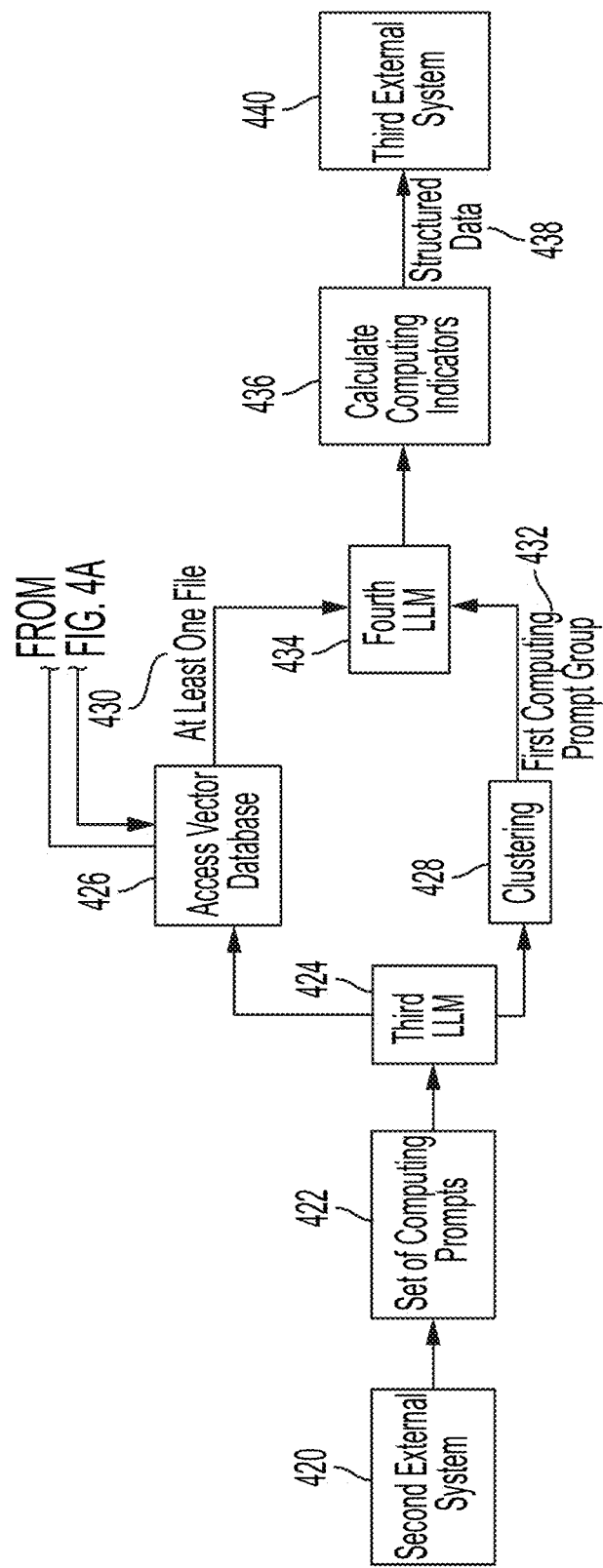

FIG. 4B shows an exemplary workflow for extracting structured data from a source comprising unstructured data using an LLM in a system (e.g., application server 120 in FIG. 1) within a complex computing network such as the network of FIG. 1 according to some embodiments. The various blocks of FIG. 4B may be executed in a different order from that shown in FIG. 4B. Some blocks may be optional. As shown in the figure, the system receives data associated with a first computing format from a second external system 420 (e.g., a computing system, a database, etc.). In some embodiments, the second external system 420 is referred to as a first data source. In other embodiments, the second external system 420 may be one of the network systems 150-150*n*. In one embodiment, the first computing format is JavaScript Object Notation (JSON) format. Based on the first computing format, the system determines a set of computing prompts 422 from the data. In some embodiments, the system (e.g., the application server 120, an apparatus, etc.) may be located in one or more locations. In other embodiments, the set of computing prompts comprises a set of questions.

The system transmits a first computing prompt from the set of computing prompts 422 to a third LLM 424. In one embodiment, the first computing prompt from the set of computing prompts is a question (e.g., a questionnaire question, a survey question, etc.). In some embodiments, the third LLM 424 comprises at least one of: GPT-4, LLaMA-3, BLOOM, PaLM, GPT-3.5, BERT, Gemini, LaMDA, and Falcon. According to one embodiment, the third LLM 424 is hosted on a third third-party server. In some embodiments, the third third-party server comprises or is comprised in the first third-party server. In other embodiments, the third third-party server comprises or is comprised in the second third-party server. In another embodiment, the third LLM 424 is hosted on the local server. In one embodiment, the third LLM 424 comprises or is comprised of the first LLM 408. In another embodiment, the third LLM 424 comprises or is comprised of the second LLM 412.

The system receives a first vector embedding for the first computing prompt from the set of computing prompts 422 from the third LLM 424. In some embodiments, the first vector embedding comprises or is based on a first semantic structure of at least some first content comprised in or associated with the first computing prompt from the set of computing prompts 422. Furthermore, the first semantic structure of the at least some first content comprised in or associated with the first computing prompt from the set of computing prompts comprises a conceptual meaning of the at least some first content comprised in or associated with the first computing prompt from the set of computing prompts 422. In some embodiments, the at least some first content comprised in or associated with the first computing prompt from the set of computing prompts 422 may comprise text, an image, a figure, a diagram, a graph, and/or a table.

The system transmits a second computing prompt, different from the first computing prompt, from the set of computing prompts 422 to the third LLM 424. In one embodiment, the second computing prompt, different from the first computing prompt, from the set of computing prompts is a question (e.g., a questionnaire question, a survey question, etc.). In some embodiments, the second computing prompt, different from the first computing prompt, from the set of computing prompts 422 is transmitted to the third LLM 424 at the same time as the first computing prompt from the set of computing prompts is transmitted to the third LLM 424. In other embodiments, the second computing prompt, different from the first computing prompt, from the set of computing prompts 422 is transmitted to the third LLM 424 before the first computing prompt from the set of computing prompts is transmitted to the third LLM 424. In yet other embodiments, the second computing prompt, different from the first computing prompt, from the set of computing prompts 422 is transmitted to the third LLM 424 after the first computing prompt from the set of computing prompts is transmitted to the third LLM 424.

The system receives a second vector embedding for the second computing prompt, different from the first computing prompt, from the set of computing prompts 422 from the third LLM 424. In some embodiments, the second vector embedding comprises or is based on a second semantic structure of at least some second content comprised in or associated with the second computing prompt, different from the first computing prompt, from the set of computing prompts 422. In one embodiment, the second semantic structure comprises or is comprised in the first semantic structure. Furthermore, the second semantic structure of the at least some second content comprised in or associated with the second computing prompt, different from the first computing prompt, from the set of computing prompts comprises a conceptual meaning of the at least some second content comprised in or associated with the second computing prompt, different from the first computing prompt, from the set of computing prompts 422. In some embodiments, the at least some second content comprised in or associated with the second computing prompt, different from the first computing prompt, from the set of computing prompts 422 may comprise text, an image, a figure, a diagram, a graph, and/or a table.

The system generates a first computing prompt group 432 comprising the first computing prompt from the set of computing prompts 422 and the second computing prompt, different from the first computing prompt, from the set of computing prompts 422. In some embodiments, generating the first computing prompt group comprises clustering 428 the first computing prompt from the set of computing prompts 422, with the second computing prompt, different from the first computing prompt, from the set of computing prompts 422, based on a similarity of the first vector embedding and the second vector embedding. According to some embodiments, the similarity of the first vector embedding and the second vector embedding comprises or is based on a semantic similarity of the first vector embedding and the second vector embedding. Furthermore, the semantic similarity of the first vector embedding and the second vector embedding may be calculated based on one or more of: cosine similarity, Euclidean distance, Manhattan distance, Minkowski distance, Chebychev distance, and dot product similarity. In one embodiment, the first computing prompt group 432 comprises at least three computing prompts from the set of computing prompts 422.

The system first accesses the vector database 426 from FIG. 4A at a fifth time. Based on first accessing the vector database 426, the system determines first file data associated with at least one first file 430 that at least partially corresponds with the first computing prompt from the set of computing prompts 422. In one embodiment, the at least one first file 430 that at least partially corresponds with the first computing prompt from the set of computing prompts 422, comprises first unstructured data. In some embodiments, the first unstructured data may comprise raw information or information without a predetermined structure or format.

In one embodiment, the at least one first file 430 that at least partially corresponds with the first computing prompt from the set of computing prompts 422 may at least partially match the first computing prompt from the set of computing prompts 422. In another embodiment, the at least one first file 430 that at least partially corresponds with the first computing prompt from the set of computing prompts 422 may at least partially associate with the first computing prompt from the set of computing prompts 422. According to one embodiment, determining the first file data associated with the at least one first file 430 that at least partially corresponds with the first computing prompt from the set of computing prompts may comprise or be based on a comparison between a first structure of language in the first computing prompt from the set of computing prompts and a second structure of language in the at least one first file 430 that at least partially corresponds with the first computing prompt from the set of computing prompts.

In some embodiments, the system receives filter data from a second data source or the first data source. Furthermore, the second data source may be comprised in a fifth external system. The fifth external system may be one of the network systems 150-150n. In one embodiment, the filter data comprises document source specification data. According to some embodiments, the system may execute, based on the filter data, a filtering operation on the vector database 418, thereby limiting entries in the vector database 418. In some embodiments, the filter data may comprise at least one of: a nature of the file, a credibility of the file, a freshness of the file, a file quality indicator of the file, a name of the file, a third-party associated with the file, and a source of the file. In one embodiment, the filtering operation on the vector database 418 may occur at the fifth time. In another embodiment, the filtering operation on the vector database 418 may occur after the fifth time. In yet another embodiment, the filtering operation on the vector database 418 may occur prior to the fifth time.

Furthermore, in one embodiment, the nature of the file comprises an indicator associated with a classification of the file. The classification of the file may be one of: audit from a reliable source, audit from an unreliable source, a policy or procedure document, and an unofficial document. In some embodiments, the indicator associated with the classification of the file is numerical. In another embodiment, the credibility of the file comprises an indicator associated with a source of the file. In some embodiments, the indicator associated with the source of the file is numerical. In yet other embodiments, the freshness of the file comprises an indicator associated with a creation time of the file. In some embodiments, the file quality indicator of the file comprises or is based on the nature of the file, the credibility of the file, and the freshness of the file.

In some embodiments, the determining the first file data associated with the at least one first file that partially corresponds with the first computing prompt from the set of computing prompts 422, is based on a similarity (e.g., semantic similarity) of the first vector embedding and at least one third vector embedding, wherein the at least third vector embedding is associated with or comprised in the first file data. Furthermore, the similarity of the first vector embedding and the at least one third vector embedding may be calculated based on one or more of: cosine similarity, Euclidean distance, Manhattan distance, Minkowski distance, Chebychev distance, and dot product similarity. In some embodiments, the at least one first file may comprise: an audit document, a SOC 2 report, a policy document, a 10K financial report, a technical description document, a SOC 1 report, a data security document, a corporate charter, an information technology procedure document, a financial report, a questionnaire, a 10 Q report, a human resources document, or a screenshot of an internal system.

The system second accesses the vector database 426 from FIG. 4A at a sixth time or the fifth time. In one embodiment, the sixth time is prior to the fifth time. According to another embodiment, the sixth time is after the fifth time. According to some embodiments, an entry in the vector database 418 comprises a vector embedding and metadata associated with an indexed file. In other embodiments, an entry in the vector database 418 comprises a vector embedding and metadata associated with a file comprising unstructured data. In yet other embodiments, an entry in the vector database 418 comprises at least two vector embeddings and metadata associated with an indexed file. In still other embodiments, an entry in the vector database 418 comprises at least two vector embeddings and metadata associated with a file comprising unstructured data. In one embodiment, the filtering operation on the vector database 418 may occur at the sixth time. In another embodiment, the filtering operation on the vector database may occur after the sixth time. In yet another embodiment, the filtering operation on the vector database 418 may occur prior to the sixth time.

Based on second accessing the vector database 426, the system determines second file data, associated with at least one second file 430 that at least partially corresponds with the second computing prompt, different from the first computing prompt, from the set of computing prompts 422. In one embodiment, the at least one second file 430 that at least partially corresponds with the second computing prompt, different from the first computing prompt, from the set of computing prompts 422, comprises second unstructured data. In some embodiments, the second unstructured data may comprise raw information or information without a predetermined structure or format.

In one embodiment, the at least one second file 430 that at least partially corresponds with the second computing prompt, different from the first computing prompt, from the set of computing prompts 422 may at least partially match the second computing prompt, different from the first computing prompt, from the set of computing prompts 422. In another embodiment, the at least one second file 430 that at least partially corresponds with the second computing prompt, different from the first computing prompt, from the set of computing prompts 422 may at least partially associate with the second computing prompt, different from the first computing prompt, from the set of computing prompts 422.

In some embodiments, determining the second file data, associated with the at least one second file 430 that partially corresponds with the second computing prompt, different from the first computing prompt, from the set of computing prompts 422, is based on a similarity of the second vector embedding and at least one fourth vector embedding, wherein the at least one fourth vector embedding is associated with or comprised in the second file data. According to one embodiment, the similarity of the second vector embedding and the at least one fourth vector embedding comprises or is based on a semantic similarity of the second vector embedding and the at least one fourth vector embedding. Furthermore, the semantic similarity of the first vector embedding and the at least one third vector embedding may be calculated based on one or more of: cosine similarity, Euclidean distance, Manhattan distance, Minkowski distance, Chebychev distance, and dot product similarity. In some embodiments, the at least one second file 430 that partially corresponds with the second computing prompt, different from the first computing prompt, from the set of computing prompts 422 may comprise: an audit document, a SOC 2 report, a policy document, a 10K financial report, a technical description document, a SOC 1 report, a data security document, a corporate charter, an information technology procedure document, a financial report, a questionnaire, a 10 Q report, a human resources document, a screenshot of an internal system, etc.

At a seventh time following the fifth time and the sixth time, the system transmits the first computing prompt group 432 to a fourth LLM 434. In some embodiments, the fourth LLM 434 comprises at least one of: GPT-4, LLaMA-3, BLOOM, PaLM, GPT-3.5, BERT, Gemini, LaMDA, and Falcon. According to one embodiment, the fourth LLM 434 is hosted on a fourth third-party server. In some embodiments, the fourth third-party server comprises or is comprised in the first third-party server. In other embodiments, the fourth third-party server comprises or is comprised in the second third-party server. In yet other embodiments, the fourth third-party server comprises or is comprised in the third third-party server. In another embodiment, the fourth LLM 434 is hosted on the local server. In one embodiment, the fourth LLM 434 comprises or is comprised of the first LLM 408. In another embodiment, the fourth LLM 434 comprises or is comprised of the second LLM 412. In yet another embodiment, the fourth LLM 434 comprises or is comprised of the third LLM 424.

The system transmits, at the seventh time or an eighth time, the first file data associated with the at least one first file 430 that at least partially corresponds with the first computing prompt from the set of computing prompts 422 to the fourth LLM 434. In one embodiment, the eighth time is before the seventh time, but still after the fifth time and the sixth time. In another embodiment, the eighth time is after the seventh time. At the seventh time, the eighth time, or a ninth time, the system transmits the second file data associated with the at least one second file 430 that at least partially corresponds with the second computing prompt, different from the first computing prompt, from the set of computing prompts 422 to the fourth LLM 434. In one embodiment, the ninth time is before the seventh time and the eighth time, but still after the fifth time and the sixth time. In another embodiment, the ninth time is after the seventh time, but before the eighth time. In yet another embodiment, the ninth time is after the seventh time and the eighth time. In still another embodiment, the ninth time is after the eighth time, but before the seventh time.

The system receives processed data from the fourth LLM 434. In some embodiments, the processed data comprises: the first computing prompt from the set of computing prompts 422, a first response associated with the first computing prompt from the set of computing prompts 422, a first citation associated with the first computing prompt from the set of computing prompts 422, a first file quality indicator associated with the first computing prompt from the set of computing prompts 422, the second computing prompt, different from the first computing prompt, from the set of computing prompts 422, a second response associated with the second computing prompt, different from the first computing prompt, from the set of computing prompts 422, a second citation associated with the second computing prompt, different from the first computing prompt, from the set of computing prompts 422, and a second file quality indicator associated with the second computing prompt, different from the first computing prompt, from the set of computing prompts 422.

In some embodiments, the first file quality indicator comprises or is based on metadata associated with the first citation. In one embodiment, the metadata associated with the first citation comprises a first file quality score. In other embodiments, the second file quality indicator comprises or is based on metadata associated with the second citation. In another embodiment, the metadata associated with the second citation comprises a second file quality score. According to one embodiment, the first response associated with the first computing prompt from the set of computing prompts may comprise an indication that the LLM could not determine a response (e.g. a response of "I don't know.", a response of "Insufficient information to respond.", a response in which no file from the vector database is used in the response, etc.).

In other embodiments the processed data may comprise: the set of computing prompts 422, a set of responses associated with the set of computing prompts 422, a set of citations associated with the set of computing prompts 422, and a set of file quality indicators associated with the set of computing prompts 422. In one embodiment, the processed data is associated with a second computing format. Furthermore, the second computing format, in some embodiments, comprises JSON format.

According to some embodiments, the first citation may comprise: at least some first text from the first file data associated with the at least one first file that at least partially corresponds with the first computing prompt from the set of computing prompts 422, a file name corresponding with the at least one first file that at least partially corresponds with the first computing prompt from the set of computing prompts 422, and a page number corresponding with the at least some first text from the first file data associated with the at least one first file that at least partially corresponds with the first computing prompt from the set of computing prompts 422. In one embodiment, the first citation may further comprise metadata associated with the at least one first file that at least partially corresponds with the first computing prompt from the set of computing prompts 422.

In other embodiments, the first citation may comprise at least one of: at least some second text from the second file data associated with the at least one second file that at least partially corresponds with the second computing prompt, different from the first computing prompt, from the set of computing prompts 422, a file name corresponding with the at least one second file that at least partially corresponds with the second computing prompt, different from the first computing prompt, from the set of computing prompts 422, and a page number corresponding with the at least some second text from the second file data associated with the at least one second file that at least partially corresponds with the second computing prompt, different from the first computing prompt, from the set of computing prompts 422. In one embodiment, the first citation may further comprise metadata associated with the at least one second file that at least partially corresponds with the second computing prompt, different from the first computing prompt, from the set of computing prompts 422.

In some embodiments, the second citation may comprise: the at least some first text from the first file data associated with the at least one first file that at least partially corresponds with the first computing prompt from the set of computing prompts 422, the file name corresponding with the at least one first file that at least partially corresponds with the first computing prompt from the set of computing prompts 422, and the page number corresponding with the at least some first text from the first file data associated with the at least one first file that at least partially corresponds with the first computing prompt from the set of computing prompts 422. In one embodiment, the second citation may further comprise the metadata associated with the at least one first file that at least partially corresponds with the first computing prompt from the set of computing prompts 422.

According to other embodiments, the second citation may comprise at least one of: the at least some second text from the second file data associated with the at least one second file that at least partially corresponds with the second computing prompt, different from the first computing prompt, from the set of computing prompts 422, the file name corresponding with the at least one second file that at least partially corresponds with the second computing prompt, different from the first computing prompt, from the set of computing prompts 422, and the page number corresponding with the at least some second text from the second file data associated with the at least one second file that at least partially corresponds with the second computing prompt, different from the first computing prompt, from the set of computing prompts 422. In one embodiment, the second citation may further comprise the metadata associated with the at least one second file that at least partially corresponds with the second computing prompt, different from the first computing prompt, from the set of computing prompts 422.

Furthermore, in one embodiment, the at least some first text from the first file data associated with the at least one first file that at least partially corresponds with the first computing prompt from the set of computing prompts 422 may comprise a first quote (e.g., indirect quote, direct quote, etc.) from the at least one first file that at least partially corresponds with the first computing prompt from the set of computing prompts. The first quote may comprise one of: a first main idea of the at least one first file that at least partially corresponds with the first computing prompt from the set of computing prompts 422, a first brief summary of the at least one first file that at least partially corresponds with the first computing prompt from the set of computing prompts 422, or a first direct quote from the at least one first file that at least partially corresponds with the first computing prompt from the set of computing prompts 422. In some embodiments, the term "text" anywhere in this disclosure may additionally or alternatively include other types of data, including any data described or not described in this disclosure. In some embodiments, the term "file" anywhere in this disclosure may additionally or alternatively be referred to as or include other types of documents, including any documents described or not described in this disclosure.

According to another embodiment, the at least some second text from the second file data associated with the at least one second file that at least partially corresponds with the second computing prompt, different from the first computing prompt, from the set of computing prompts 422 may comprise a second quote (e.g., an indirect quote (e.g., a non-verbatim summary), a direct quote (e.g., a verbatim quote), etc.) from the at least one second file that at least partially corresponds with the second computing prompt, different from the first computing prompt, from the set of computing prompts 422. The second quote may comprise one of: a second main idea of the at least one second file that at least partially corresponds with the second computing prompt, different from the first computing prompt, from the set of computing prompts 422, a second brief summary of the at least one second file that at least partially corresponds with the second computing prompt, different from the first computing prompt, from the set of computing prompts 422, or a second direct quote from the at least one second file that at least partially corresponds with the second computing prompt, different from the first computing prompt, from the set of computing prompts 422.

The system determines a first computing indicator 436 associated with the first computing prompt from the set of computing prompts 422. In some embodiments, determining the first computing indicator 436 is based on the first computing prompt from the set of computing prompts 422, and the first citation associated with the first computing prompt from the set of computing prompts 422. In one embodiment, the first computing indicator comprises a first confidence score.

In some embodiments, determining the first computing indicator 436 may be based on a similarity (e.g., semantic similarity) of the first vector embedding and a fifth vector embedding, wherein the fifth vector embedding is associated with the first citation. In one embodiment, the fifth vector embedding comprises or is comprised in the at least one third vector embedding. In another embodiment, the fifth vector embedding comprises or is comprised in the at least one fourth vector embedding. Furthermore, the similarity of the first vector embedding and the fifth vector embedding may be calculated based on one or more of: cosine similarity, Euclidean distance, Manhattan distance, Minkowski distance, Chebychev distance, and dot product similarity.

The system determines a second computing indicator 436 associated with the second computing prompt, different from the first computing prompt, from the set of computing prompts 422. In some embodiments, determining the second computing indicator 436 is based on the second computing prompt, different from first computing prompt, from the set of computing prompts 422, and the second citation associated with the second computing prompt, different from the first computing prompt, from the set of computing prompts 422. In one embodiment, the second computing indicator comprises a second confidence score.

In other embodiments, determining the second computing indicator 436 may be based on a similarity (e.g., semantic similarity) of the second vector embedding and a sixth vector embedding, wherein the sixth vector embedding is associated with the second citation. In one embodiment, the sixth vector embedding comprises or is comprised in the at least one third vector embedding. In another embodiment, the sixth vector embedding comprises or is comprised in the at least one fourth vector embedding. Furthermore, the similarity of the second vector embedding and the sixth vector embedding may be calculated based on one or more of: cosine similarity, Euclidean distance, Manhattan distance, Minkowski distance, Chebychev distance, and dot product similarity.

The system generates structured data 438. In some embodiments, the structured data 438 comprises or is based on the processed data, the first computing indicator and the second computing indicator. In other embodiments, the structured data 438 may comprise or be based on the processed data and a set of computing indicators associated with the set of computing prompts 422. In one embodiment, the structured data 438 is associated with a third computing format. Furthermore, the third computing format, in some embodiments, comprises JSON format. The system transmits the structured data 438 to a third external system (e.g., a computing system, a database, etc.) 440. In another embodiment, the third external system 440 may be one of the network systems 150-150*n*.

For any of the embodiments described herein, the large language model may refer to any language or learning computational model (e.g., an artificial neural network) of any size and is not limited to any minimum size or any minimum number of nodes.

Figure 7:
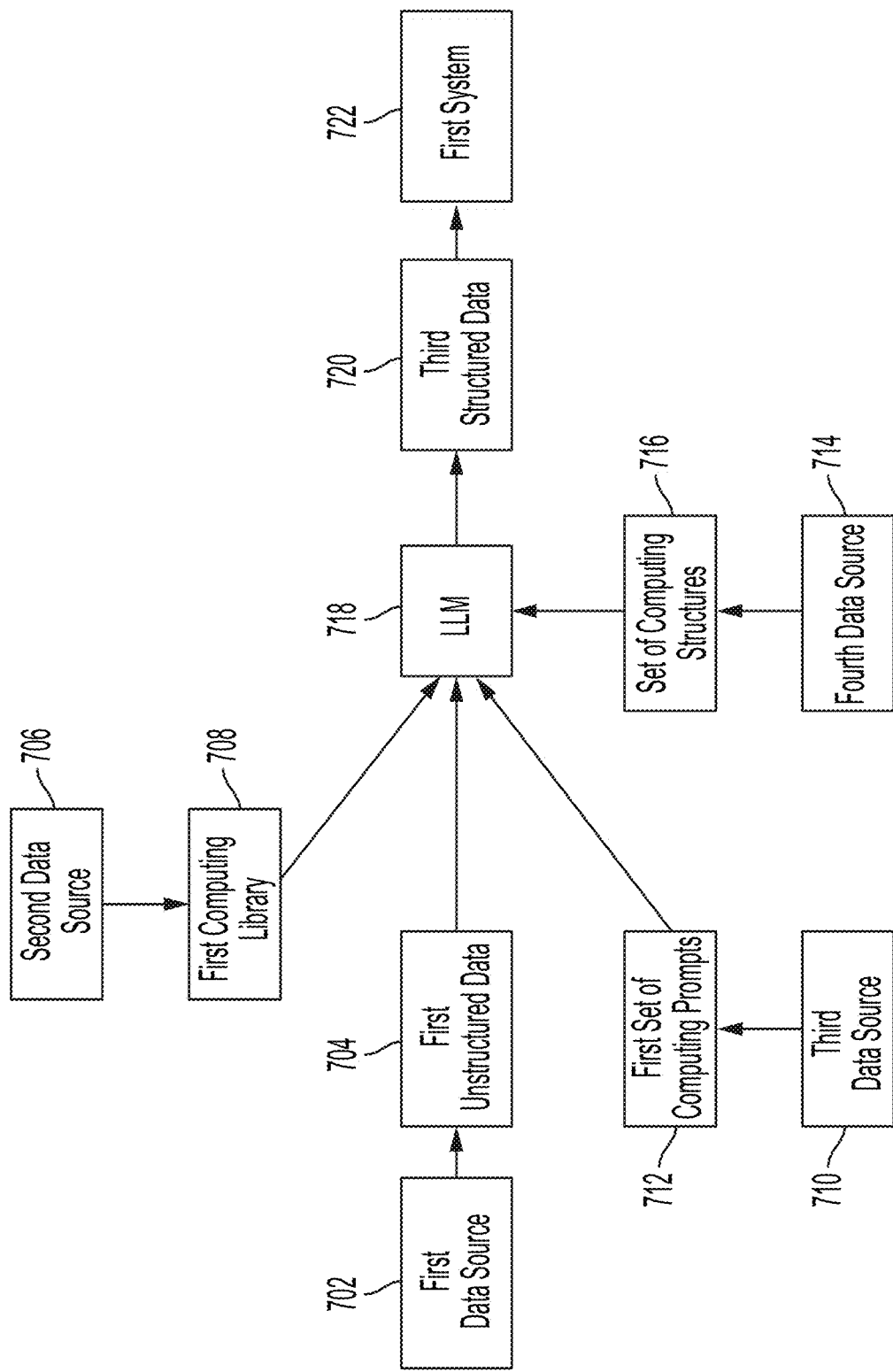
FIG. 7 shows an exemplary workflow for generating a computing structure based on both unstructured data and structured data using a large language model (LLM), in a complex computing network according to some embodiments of this disclosure.

FIG. 7 shows an exemplary workflow for generating a computing structure based on both unstructured data and structured data using a large language model (LLM) in a system (e.g., application server 120 in FIG. 1) within a complex computing network such as the network of FIG. 1 according to some embodiments. The various blocks of FIG. 7 may be executed in a different order from that shown in FIG. 7. Some blocks may be optional. As shown in the figure, the system receives first unstructured data 704 from a first data source 702 (e.g., a computing system, a database, etc.). In some embodiments, the first unstructured data 704 comprises raw information or information without a predetermined structure or format. In other embodiments, the first unstructured data 704 comprises at least one of: text, images, figures, tables, audio, videos, graphs, diagrams, etc. In yet other embodiments, the first unstructured data 704 comprises at least one of: documentation of at least one system, documentation of at least one process, documentation of at least one application, documentation of at least one apparatus, documentation of at least one procedure, etc. The system receives first structured data from a second data source 706. In some embodiments, the second data source 706 comprises or is comprised in the first data source 702.

The system determines a first computing library 708 associated with the first structured data. According to some embodiments, the first computing library 708 associated with the first structured data may comprise at least one of: a second set of computing prompts, a set of attributes, a set of entities, a set of workflow task types, a set of configured objects, a set of resources, a set of functions, a set of scripts (e.g., code), etc. The system receives second unstructured data from a third data source 710. In some embodiments, the second unstructured data comprises raw information or information without a predetermined structure or format. In other embodiments, the second unstructured data 704 comprises at least one of: text, images, figures, tables, audio, videos, graphs, diagrams, etc. In one embodiment, the third data source 710 comprises or is comprised in the first data source 702. In another embodiment, the third data source 710 comprises or is comprised in the second data source 706.

The system determines a first set of computing prompts 712 associated with the second unstructured data. In some embodiments, the first set of computing prompts 712 associated with the second unstructured data may comprise at least one of: at least one question associated with a requirement of a system configuration, at least one question associated with a capability of the system configuration, at least one question associated with a setting of the system configuration, at least one question associated with a client associated with the system configuration, etc. The system receives second structured data, associated with a first computing format (e.g., JavaScript Object Notation (JSON) format), from a fourth data source 714. According to one embodiment, the fourth data source 714 comprises or is comprised in the first data source 702. In another embodiment, the fourth data source 714 comprises or is comprised in the second data source 706. According to yet another embodiment, the fourth data source 714 comprises or is comprised in the third data source 710.

The system determines, based on the first computing format, a set of computing structures 716 associated with the second structured data. In some embodiments, the set of computing structures 716 comprises at least one example system configuration. The system transmits, at a first time, the first unstructured data 704 to an LLM 718. In one embodiment, the LLM 718 comprises at least one of: GPT-4, LLaMA-3, BLOOM, PaLM, GPT-3.5, BERT, Gemini, LaMDA, Falcon, etc. In some embodiments the LLM 718 is hosted on a third-party server. In other embodiments, the LLM 718 is hosted on a local server. The system transmits, at a second time or at the first time, the first computing library 708 associated with the first structured data to the LLM 718. According to some embodiments, the second time is prior to the first time. According to other embodiments, the second time is after the first time.

The system transmits, at a third time, at the second time, or at the first time, the first set of computing prompts 712 associated with the second unstructured data to the LLM 718. In one embodiment, the third time is before the second time. In another embodiment, the third time is after the second time. The system transmits, at a fourth time, at the third time, at the second time, or at the first time, the set of computing structures 716 associated with the second structured data to the LLM 718. In one embodiment, the fourth time is prior to the third time. In another embodiment, the fourth time is after the third time.

The system receives third structured data 720, associated with a second computing format, from the LLM 718. In one embodiment, the second computing format comprises JavaScript Object Notation (JSON) format. In one embodiment, LLM processing may comprise classification (e.g., the LLM classifies a system type, the LLM classifies a specific system type within the system type, etc.), and/or inference, and/or question answering, and/or traditional computer processing techniques, etc. In another embodiment, the LLM may choose certain computing prompts from the second set of computing prompts for a questionnaire based on the system type and/or the specific system type. In some cases, the first set of computing prompts 712 associated with the second unstructured data adds context to the documentation during the LLM processing. In some embodiments, the third structured data 720 comprises or is based on the first set of computing prompts 712 associated with the second unstructured data, a set of responses associated with the first set of computing prompts 712 associated with the second unstructured data, and a computing structure (i.e., a system configuration). Furthermore, the computing structure, according to some embodiments, is not comprised in the set of computing structures 716 associated with the second structured data.

In some cases, the computing structure comprises or is based on the first unstructured data 704, the first computing library 708 associated with the first structured data, the first set of computing prompts 712 associated with the second unstructured data, and the set of computing structures 716 associated with the second structured data. In other cases, the computing structure comprises or is based on at least one of: the first unstructured data 704, the first computing library 708 associated with the first structured data, the first set of computing prompts 712 associated with the second unstructured data, or the set of computing structures 716 associated with the second structured data. In some embodiments, the computing structure further comprises or is based on a second computing library. Furthermore, in some embodiments, the second computing library is generated by the LLM 718. In one embodiment, the computing structure comprises a system configuration in a configurable platform.

The system transmits the third structured data 720 to a first system (e.g., a computing system, a database, etc.) 722. In one embodiment, the first system 722 may be one of the network systems 150-150n. In some embodiments, the system may execute one or more of these instructions in a first stage and a second stage, such that fifth structured data associated with the second stage comprises or is based on fourth structured data associated with the first stage (i.e., firstly, the system configures a data dictionary, secondly, the system configures, based on the data dictionary, at least one configured form, and thirdly, the system configures, based on the data dictionary and the at least one configured form, at least one workflow).

Any of the embodiments, methods, systems, etc. described in this disclosure may be used in a third-party risk management system. The embodiments, methods, systems, etc. described in this disclosure may identify, assess, and minimize risk associated with third-parties (i.e., clients, vendors, service providers, suppliers, contractors, etc.). Furthermore, any files and/or documents referred to in this disclosure may comprise third-party risk management files and/or documents (i.e., audit documents, Service Organization Control (SOC) 2 reports, SOC 1 reports, 10 Q reports, risk reports, etc.).

Figure 9:
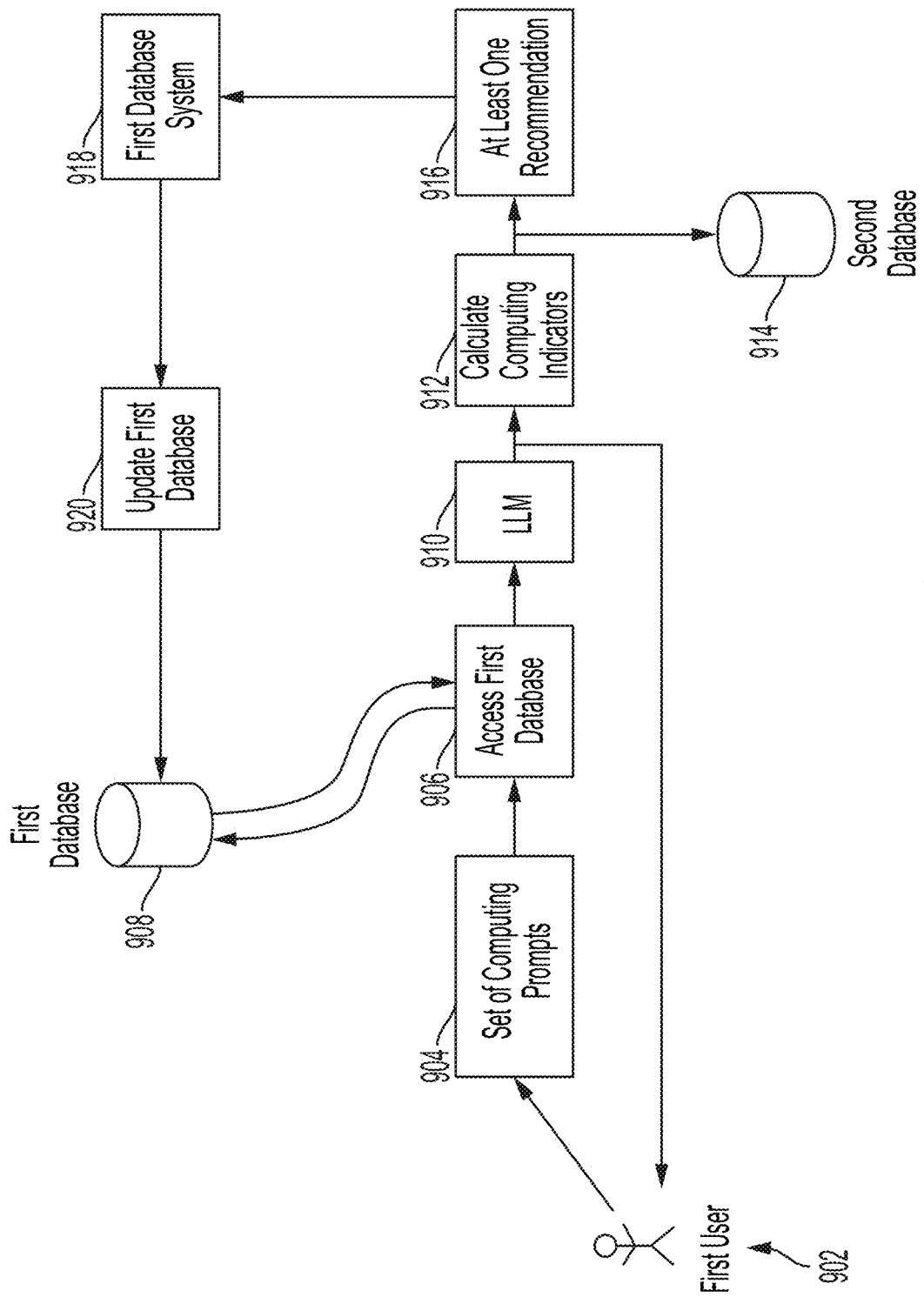
FIG. 9 shows an exemplary workflow for generating structured data from files comprising unstructured data, and transmitting recommendations, based on the structured data, to a system storing the files, using a large language model (LLM), in a complex computing network according to some embodiments of this disclosure.

FIG. 9 shows an exemplary workflow for generating structured data from files comprising unstructured data, and transmitting recommendations, based on the structured data, to a system storing the files, using a large language model (LLM) in a system (e.g., application server 120 in FIG. 1) within a complex computing network such as the network of FIG. 1 according to some embodiments. The various blocks of FIG. 9 may be executed in a different order from that shown in FIG. 9. Some blocks may be optional. As shown in the figure, the system receives data, associated with a first computing format, from a first user (e.g., a computing system, a database, a user within the computing system, etc.) 902. In some embodiments, the user comprises or is comprised in a first system. Furthermore, in one embodiment, the first system comprises or is comprised in one of the network systems 150-150n. In one embodiment, the first computing format comprises JavaScript Object Notation (JSON) format. The system determines, based on the first computing format, a set of computing prompts 904 from the data. In some embodiments, the system (e.g., the application server 120, an apparatus, etc.) may be located in one or more locations. In several embodiments, the set of computing prompts comprises a set of questions.

The system transmits a first computing prompt from the set of computing prompts 904 to a first LLM. In one embodiment, the first computing prompt from the set of computing prompts is a question (e.g., a questionnaire question, a survey question, etc.). In some embodiments, the first LLM comprises at least one of: GPT-4, LLaMA-3, BLOOM, PaLM, GPT-3.5, BERT, Gemini, LaMDA, and Falcon. According to one embodiment, the first LLM is hosted on a first third-party server. In another embodiment, the first LLM is hosted on the local server.

The system receives a first vector embedding for the first computing prompt from the set of computing prompts 904 from the first LLM. In some embodiments, the first vector embedding comprises or is based on a first semantic structure of at least some first content comprised in or associated with the first computing prompt from the set of computing prompts 904. Furthermore, the first semantic structure of the at least some first content comprised in or associated with the first computing prompt from the set of computing prompts comprises a first conceptual meaning of the at least some first content comprised in or associated with the first computing prompt from the set of computing prompts 904. In some embodiments, the at least some first content comprised in or associated with the first computing prompt from the set of computing prompts 904 may comprise text, an image, a figure, a diagram, a graph, and/or a table.

The system transmits a second computing prompt, different from the first computing prompt, from the set of computing prompts 904 to the first LLM. In one embodiment, the second computing prompt, different from the first computing prompt, from the set of computing prompts is a question (e.g., a questionnaire question, a survey question, etc.). In some embodiments, the second computing prompt, different from the first computing prompt, from the set of computing prompts 904 is transmitted to the first LLM at the same time as the first computing prompt from the set of computing prompts is transmitted to the first LLM. In other embodiments, the second computing prompt, different from the first computing prompt, from the set of computing prompts 904 is transmitted to the first LLM before the first computing prompt from the set of computing prompts 904 is transmitted to the first LLM. In yet other embodiments, the second computing prompt, different from the first computing prompt, from the set of computing prompts 904 is transmitted to the first LLM after the first computing prompt from the set of computing prompts 904 is transmitted to the first LLM.

The system receives a second vector embedding for the second computing prompt, different from the first computing prompt, from the set of computing prompts 904 from the first LLM. In some embodiments, the second vector embedding comprises or is based on a second semantic structure of at least some second content comprised in or associated with the second computing prompt, different from the first computing prompt, from the set of computing prompts 904. In one embodiment, the second semantic structure comprises or is comprised in the first semantic structure. Furthermore, the second semantic structure of the at least some second content comprised in or associated with the second computing prompt, different from the first computing prompt, from the set of computing prompts comprises a second conceptual meaning of the at least some second content comprised in or associated with the second computing prompt, different from the first computing prompt, from the set of computing prompts 904. In some embodiments, the at least some second content comprised in or associated with the second computing prompt, different from the first computing prompt, from the set of computing prompts 904 may comprise text, an image, a figure, a diagram, a graph, and/or a table.

The system generates a first computing prompt group comprising the first computing prompt from the set of computing prompts 904 and the second computing prompt, different from the first computing prompt, from the set of computing prompts 904. In some embodiments, generating the first computing prompt group comprises clustering the first computing prompt from the set of computing prompts 904, with the second computing prompt, different from the first computing prompt, from the set of computing prompts 904, based on a first similarity of the first vector embedding and the second vector embedding. According to some embodiments, the first similarity of the first vector embedding and the second vector embedding comprises or is based on a first semantic similarity of the first vector embedding and the second vector embedding. Furthermore, the first semantic similarity of the first vector embedding and the second vector embedding may be calculated based on one or more of: cosine similarity, Euclidean distance, Manhattan distance, Minkowski distance, Chebychev distance, and dot product similarity. In one embodiment, the first computing prompt group comprises at least three computing prompts from the set of computing prompts 904.

The system first accesses the first database 906 at a first time. Based on first accessing the first database 906, the system determines first file data associated with at least one first file that at least partially corresponds with the first computing prompt from the set of computing prompts 904. In one embodiment, the at least one first file that at least partially corresponds with the first computing prompt from the set of computing prompts 904, comprises first unstructured data. In some embodiments, the first unstructured data may comprise raw information or information without a predetermined structure or format.

In one embodiment, the at least one first file that at least partially corresponds with the first computing prompt from the set of computing prompts 904 may at least partially match the first computing prompt from the set of computing prompts 904. In another embodiment, the at least one first file that at least partially corresponds with the first computing prompt from the set of computing prompts 904 may at least partially associate with the first computing prompt from the set of computing prompts 904. According to one embodiment, determining the first file data associated with the at least one first file that at least partially corresponds with the first computing prompt from the set of computing prompts 904 may comprise or be based on a comparison between a first structure of language in the first computing prompt from the set of computing prompts and a second structure of language in the at least one first file that at least partially corresponds with the first computing prompt from the set of computing prompts 904.

In some embodiments, the system receives filter data from a data source. Furthermore, the data source may be comprised in an external system. The external system may be one of the network systems 150-150n. In one embodiment, the filter data comprises document source specification data. According to some embodiments, the system may execute, based on the filter data, a filtering operation on the first database 908, thereby limiting entries in the first database 908. In some embodiments, the filter data may comprise at least one of: a nature of the file, a credibility of the file, a freshness of the file, a file quality indicator of the file, a name of the file, a third-party associated with the file, and a source of the file. In one embodiment, the filtering operation on the first database 908 may occur at the first time. In another embodiment, the filtering operation on the first database 908 may occur after the first time. In yet another embodiment, the filtering operation on the first database 908 may occur prior to the first time.

Furthermore, in one embodiment, the nature of the file comprises an indicator associated with a classification of the file. The classification of the file may be one of: audit from a reliable source, audit from an unreliable source, a policy or procedure document, and an unofficial document. In some embodiments, the indicator associated with the classification of the file is numerical. In another embodiment, the credibility of the file comprises an indicator associated with a source of the file. In some embodiments, the indicator associated with the source of the file is numerical. In yet other embodiments, the freshness of the file comprises an indicator associated with a creation time of the file. In some embodiments, the file quality indicator of the file comprises or is based on the nature of the file, the credibility of the file, and the freshness of the file.

In some embodiments, the determining the first file data associated with the at least one first file that partially corresponds with the first computing prompt from the set of computing prompts 904, is based on a second similarity (e.g., semantic similarity) of the first vector embedding and at least one third vector embedding, wherein the at least third vector embedding is associated with or comprised in the first file data. Furthermore, the second similarity of the first vector embedding and the at least one third vector embedding may be calculated based on one or more of: cosine similarity, Euclidean distance, Manhattan distance, Minkowski distance, Chebychev distance, and dot product similarity. In some embodiments, the at least one first file may comprise: an audit document, a SOC 2 report, a policy document, a 10K financial report, a technical description document, a SOC 1 report, a data security document, a corporate charter, an information technology procedure document, a financial report, a questionnaire, a 10 Q report, a human resources document, or a screenshot of an internal system.

The system second accesses the first database 906 at a second time or the first time. In one embodiment, the second time is prior to the first time. According to another embodiment, the second time is after the first time. According to some embodiments, an entry in the first database 908 comprises a vector embedding and metadata associated with an indexed file. In other embodiments, an entry in the first database 908 comprises a vector embedding and metadata associated with a file comprising unstructured data. In yet other embodiments, an entry in the first database 908 comprises at least two vector embeddings and metadata associated with an indexed file. In still other embodiments, an entry in the first database 908 comprises at least two vector embeddings and metadata associated with a file comprising unstructured data. In one embodiment, the filtering operation on the first database 908 may occur at the second time. In another embodiment, the filtering operation on the first database 908 may occur after the second time. In yet another embodiment, the filtering operation on the first database 908 may occur prior to the second time.

Based on the second accessing the first database 906, the system determines second file data, associated with at least one second file that at least partially corresponds with the second computing prompt, different from the first computing prompt, from the set of computing prompts 904. In one embodiment, the at least one second file that at least partially corresponds with the second computing prompt, different from the first computing prompt, from the set of computing prompts 904, comprises second unstructured data. In some embodiments, the second unstructured data may comprise raw information or information without a predetermined structure or format.

In one embodiment, the at least one second file that at least partially corresponds with the second computing prompt, different from the first computing prompt, from the set of computing prompts 904 may at least partially match the second computing prompt, different from the first computing prompt, from the set of computing prompts 904. In another embodiment, the at least one second file that at least partially corresponds with the second computing prompt, different from the first computing prompt, from the set of computing prompts 904 may at least partially associate with the second computing prompt, different from the first computing prompt, from the set of computing prompts 904.

In some embodiments, determining the second file data, associated with the at least one second file that partially corresponds with the second computing prompt, different from the first computing prompt, from the set of computing prompts 904, is based on a third similarity of the second vector embedding and at least one fourth vector embedding, wherein the at least one fourth vector embedding is associated with or comprised in the second file data. According to one embodiment, the third similarity of the second vector embedding and the at least one fourth vector embedding comprises or is based on a third semantic similarity of the second vector embedding and the at least one fourth vector embedding. Furthermore, the third semantic similarity of the first vector embedding and the at least one third vector embedding may be calculated based on one or more of: cosine similarity, Euclidean distance, Manhattan distance, Minkowski distance, Chebychev distance, and dot product similarity. In some embodiments, the at least one second file that partially corresponds with the second computing prompt, different from the first computing prompt, from the set of computing prompts 904 may comprise: an audit document, a SOC 2 report, a policy document, a 10K financial report, a technical description document, a SOC 1 report, a data security document, a corporate charter, an information technology procedure document, a financial report, a questionnaire, a 10 Q report, a human resources document, a screenshot of an internal system, etc.

At a third time following the first time and the second time, the system transmits the first computing prompt group to a second LLM 910. In some embodiments, the second LLM 910 comprises at least one of: GPT-4, LLaMA-3, BLOOM, PaLM, GPT-3.5, BERT, Gemini, LaMDA, and Falcon. According to one embodiment, the second LLM 910 is hosted on a second third-party server. In some embodiments, the second third-party server comprises or is comprised in the first third-party server. In another embodiment, the second LLM 910 is hosted on the local server. In one embodiment, the second LLM 910 comprises or is comprised of the first LLM.

The system transmits, at the third time or a fourth time, the first file data associated with the at least one first file that at least partially corresponds with the first computing prompt from the set of computing prompts 904 to the second LLM 910. In one embodiment, the fourth time is before the third time, but still after the first time and the second time. In another embodiment, the fourth time is after the third time. At the third time, the fourth time, or a fifth time, the system transmits the second file data associated with the at least one second file that at least partially corresponds with the second computing prompt, different from the first computing prompt, from the set of computing prompts 904 to the second LLM 910. In one embodiment, the fifth time is before the third time and the fourth time, but still after the first time and the second time. In another embodiment, the fifth time is after the third time, but before the fourth time. In yet another embodiment, the fifth time is after the third time and the fourth time. In still another embodiment, the fifth time is after the fourth time, but before the third time.

The system receives first structured data from the second LLM 910. In some embodiments, the first structured data comprises: the first computing prompt from the set of computing prompts 904, a first response associated with the first computing prompt from the set of computing prompts 904, a first citation associated with the first computing prompt from the set of computing prompts 904, a first file quality indicator associated with the first computing prompt from the set of computing prompts 904, the second computing prompt, different from the first computing prompt, from the set of computing prompts 904, a second response associated with the second computing prompt, different from the first computing prompt, from the set of computing prompts 904, a second citation associated with the second computing prompt, different from the first computing prompt, from the set of computing prompts 904, and a second file quality indicator associated with the second computing prompt, different from the first computing prompt, from the set of computing prompts 904.

In some embodiments, the first file quality indicator comprises or is based on metadata associated with the first citation. In one embodiment, the metadata associated with the first citation comprises a first file quality score. In other embodiments, the second file quality indicator comprises or is based on metadata associated with the second citation. In another embodiment, the metadata associated with the second citation comprises a second file quality score. According to one embodiment, the first response associated with the first computing prompt from the set of computing prompts 904 may comprise an indication that the second LLM could not determine a response (e.g. a response of "I don't know.", a response of "Insufficient information to respond.", a response in which no file from the first database is used in the response, etc.).

In other embodiments the first structured data may comprise: the set of computing prompts 904, a set of responses associated with the set of computing prompts 904, a set of citations associated with the set of computing prompts 904, and a set of file quality indicators associated with the set of computing prompts 904. According to one embodiment, the system may transmit the first structured data to the first user 902 and/or the first system. According to another embodiment, the system may transmit the set of computing prompts 904 and the set of responses associated with the set of computing prompts 904, to the first user 902 and/or the first system. In one embodiment, the first structured data is associated with a second computing format. Furthermore, the second computing format, in some embodiments, comprises JSON format.

According to some embodiments, the first citation may comprise: at least some first text from the first file data associated with the at least one first file that at least partially corresponds with the first computing prompt from the set of computing prompts 904, a file name corresponding with the at least one first file that at least partially corresponds with the first computing prompt from the set of computing prompts 904, and a page number corresponding with the at least some first text from the first file data associated with the at least one first file that at least partially corresponds with the first computing prompt from the set of computing prompts 904. In one embodiment, the first citation may further comprise metadata associated with the at least one first file that at least partially corresponds with the first computing prompt from the set of computing prompts 904.

In other embodiments, the first citation may comprise at least one of: at least some second text from the second file data associated with the at least one second file that at least partially corresponds with the second computing prompt, different from the first computing prompt, from the set of computing prompts 904, a file name corresponding with the at least one second file that at least partially corresponds with the second computing prompt, different from the first computing prompt, from the set of computing prompts 904, and a page number corresponding with the at least some second text from the second file data associated with the at least one second file that at least partially corresponds with the second computing prompt, different from the first computing prompt, from the set of computing prompts 904. In one embodiment, the first citation may further comprise metadata associated with the at least one second file that at least partially corresponds with the second computing prompt, different from the first computing prompt, from the set of computing prompts 904.

Furthermore, in one embodiment, the at least some first text from the first file data associated with the at least one first file that at least partially corresponds with the first computing prompt from the set of computing prompts 904 may comprise a first quote (e.g., indirect quote, direct quote, etc.) from the at least one first file that at least partially corresponds with the first computing prompt from the set of computing prompts 904. The first quote may comprise one of: a first main idea of the at least one first file that at least partially corresponds with the first computing prompt from the set of computing prompts 904, a first brief summary of the at least one first file that at least partially corresponds with the first computing prompt from the set of computing prompts 904, or a first direct quote from the at least one first file that at least partially corresponds with the first computing prompt from the set of computing prompts 904. In some embodiments, the term "text" anywhere in this disclosure may additionally or alternatively include other types of data, including any data described or not described in this disclosure. In some embodiments, the term "file" anywhere in this disclosure may additionally or alternatively be referred to as or include other types of documents, including any documents described or not described in this disclosure.

The system determines a first computing indicator 912 associated with the first computing prompt from the set of computing prompts 904. In some embodiments, determining the first computing indicator 912 is based on the first computing prompt from the set of computing prompts 904, and the first citation associated with the first computing prompt from the set of computing prompts 904. In one embodiment, the first computing indicator comprises a first confidence score.

In some embodiments, determining the first computing indicator 912 may be based on a fourth similarity (e.g., semantic similarity) of the first vector embedding and a fifth vector embedding, wherein the fifth vector embedding is associated with the first citation. In one embodiment, the fifth vector embedding comprises or is comprised in the at least one third vector embedding. In another embodiment, the fifth vector embedding comprises or is comprised in the at least one fourth vector embedding. Furthermore, the fourth similarity of the first vector embedding and the fifth vector embedding may be calculated based on one or more of: cosine similarity, Euclidean distance, Manhattan distance, Minkowski distance, Chebychev distance, and dot product similarity.

The system determines a second computing indicator 912 associated with the second computing prompt, different from the first computing prompt, from the set of computing prompts 904. In some embodiments, determining the second computing indicator 912 is based on the second computing prompt, different from first computing prompt, from the set of computing prompts 904, and the second citation associated with the second computing prompt, different from the first computing prompt, from the set of computing prompts 904. In one embodiment, the second computing indicator comprises a second confidence score.

In other embodiments, determining the second computing indicator 912 may be based on a fifth similarity (e.g., semantic similarity) of the second vector embedding and a sixth vector embedding, wherein the sixth vector embedding is associated with the second citation. In one embodiment, the sixth vector embedding comprises or is comprised in the at least one third vector embedding. In another embodiment, the sixth vector embedding comprises or is comprised in the at least one fourth vector embedding. Furthermore, the fifth similarity of the second vector embedding and the sixth vector embedding may be calculated based on one or more of: cosine similarity, Euclidean distance, Manhattan distance, Minkowski distance, Chebychev distance, and dot product similarity.

The system generates second structured data. In some embodiments, the second structured data comprises or is based on the first structured data, the first computing indicator and the second computing indicator. In other embodiments, the second structured data may comprise or be based on the first structured data and a set of computing indicators associated with the set of computing prompts 904. According to some embodiments, the system may access a second database 914. Furthermore, according to some embodiments, the system may transmit the second structured data to the second database 914. In one embodiment, the second database may generate and/or transmit metrics to the first user 902 and/or the first system. In some cases, the metrics comprise a process trend report. Furthermore, in some embodiments, the process trend report may comprise at least one of: a trend in responses to computing prompts, a trend in file quality indicators of files used to respond to computing prompts, or a trend in computing indicators associated with the computing prompts. In other embodiments, the system may transmit at least some of the structured data to the first user 902 and/or the first system. In one embodiment, the second structured data is associated with a third computing format. Furthermore, the third computing format, in some embodiments, comprises JSON format.

The system generates, based on the second structured data, at least one recommendation 916. In some embodiments, the at least one recommendation 916 is associated with the first database. In other embodiments, the at least one recommendation 916 is associated with at least one of the at least one first file that at least partially corresponds with the first computing prompt from the set of computing prompts 904, or the at least one second file that at least partially corresponds with the second computing prompt, different from the first computing prompt, from the set of computing prompts 904. In yet another embodiment, the at least one recommendation 916 is associated with at least one third file associated with (e.g., stored in, managed by, etc.) the first database. According to some embodiments, the at least one recommendation may comprise suggestions and/or requests to improve at least one file quality indicator associated with the at least one third file associated with the first database (i.e., improve quality of files in the first database). In some embodiments, generating the at least one recommendation 916 may comprise using a third LLM.

The system transmits the at least one recommendation 916 to a first database system 918 and/or a second user associated with the first database 908. In one embodiment, the first database system 918 comprises a second system managing the first database 908. In some embodiments, the first database system 918 and/or the second user associated with the first database 908, may, based on the at least one recommendation 916, update or modify the first database 920. For example, in one embodiment, updating or modifying the first database 920 may comprise or be based on a file quality assessment. In another embodiment, the updating or modifying the first database 920 may comprise or be based on at least one request for an additional file to be inserted into the first database. Furthermore, in some embodiments, the additional file comprises or is associated with an improved file quality indicator (i.e., insert higher quality files into the first database). In other embodiments, the additional file comprises or is associated with data not comprised in the first database 908. In yet another embodiment, the updating or modifying the first database 920 may comprise or be based on at least one request for an existing file in the first database 908 to be updated (e.g., audited) or replaced. In some cases, the updating or modifying the database 920 may be done automatically.

Exemplary Flowcharts

FIGS. 5A-5B and 6A-6D show exemplary flowcharts for methods, systems/apparatuses, and computer program products that implement generating an indexed computing file based on inserting vector embeddings and metadata, received from a large language model (LLM), into a configured vector database, and extracting structured data from a source comprising unstructured data, respectively, in an exemplary computing network such as the network of FIG. 1.

FIGS. 8A-8B and 10A-10E show exemplary flowcharts for methods, systems/apparatuses, and computer program products that implement generating a computing structure based on both unstructured data and structured data using a large language model (LLM), and generating structured data from files comprising unstructured data, and transmitting recommendations, based on the structured data, to a system storing the files, using a large language model (LLM), respectively, in an exemplary computing network such as the network of FIG. 1.

Figure 5A:
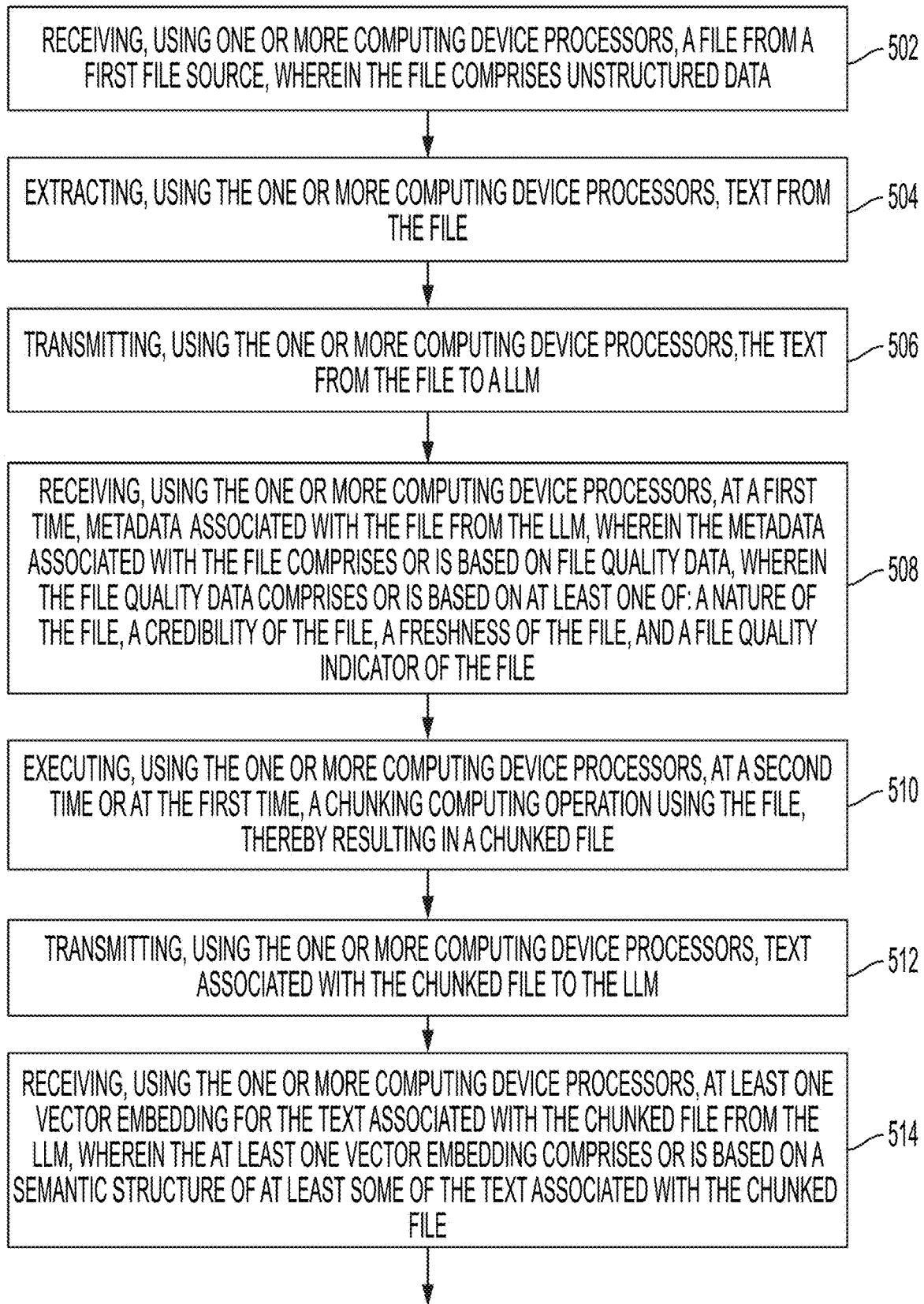
FIGS. 5A-5B show exemplary flowcharts for methods, systems/apparatuses, and computer program products that generate an indexed computing file based on inserting vector embeddings and metadata, received from an LLM, into a configured vector database in a complex computing network such as the network of FIG. 1, in accordance with some embodiments of this disclosure.
Figure 5B:
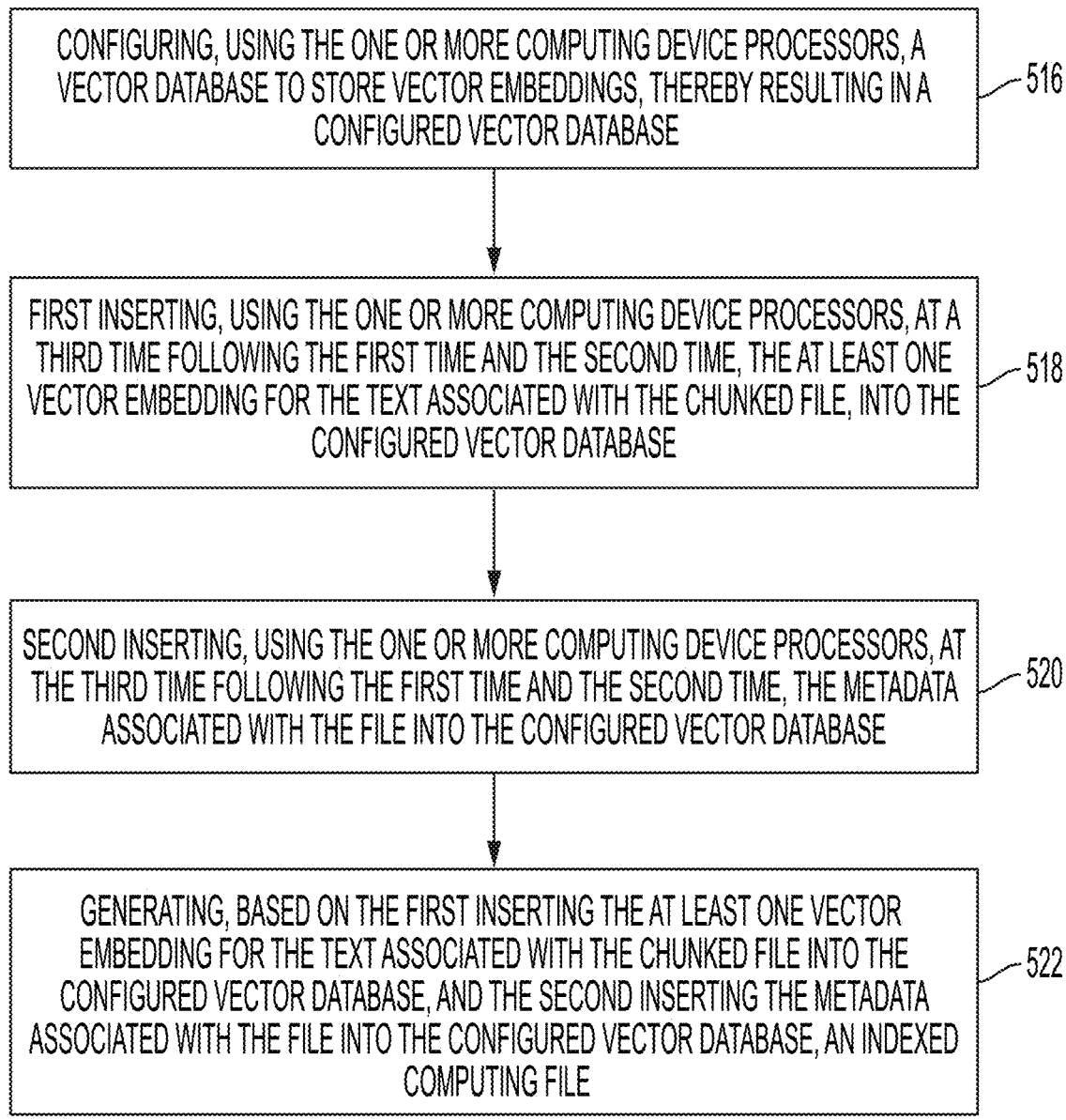

FIGS. 5A and 5B are block diagrams of a method for generating an indexed computing file in a complex computing network. The various blocks of FIGS. 5A and 5B may be executed in a different order from that shown in FIGS. 5A and 5B. Some blocks may be optional.

At block 502 of FIG. 5A, the method comprises receiving, using one or more computing device processors, a file from a first file source, wherein the file comprises unstructured data. In some embodiments, the file may be an audit document, a Service Organization Control (SOC) 2 report, a policy document, a 10K financial report, a technical description document, a SOC 1 report, a data security document, a corporate charter, an information technology procedure document, a financial report, a questionnaire, a 10 Q report, a human resources document, a screenshot of an internal system, etc. At block 504, the method comprises extracting, using the one or more computing device processors, text from the file. At block 506, the method comprises transmitting, using the one or more computing device processors, the text from the file to a large language model (LLM).

At block 508, the method comprises receiving, using the one or more computing device processors, at a first time, metadata associated with the file from the LLM, wherein the metadata associated with the file comprises or is based on file quality data, wherein the file quality data comprises or is based on at least one of: a nature of the file, a credibility of the file, a freshness of the file, and a file quality indicator of the file. In some embodiments the metadata associated with the file further comprises a citation. The citation may further comprise at least some text from the file, a file name corresponding with the file, and a page number associated with the at least some text from the file. In some embodiments, the metadata associated with the file further comprises third-party source data.

In some embodiments, the file quality data comprising or being based on the at least one of: the nature of the file, the credibility of the file, the freshness of the file, and the file quality indicator of the file, further comprises or is based on at least two of: the nature of the file, the credibility of the file, the freshness of the file, and the file quality indicator of the file. In other embodiments, the file quality data comprising or being based on the at least one of: the nature of the file, the credibility of the file, the freshness of the file, and the file quality indicator of the file, further comprises or is based on at least three of: the nature of the file, the credibility of the file, the freshness of the file, and the file quality indicator of the file. In yet other embodiments, the file quality data comprising or being based on the at least one of: the nature of the file, the credibility of the file, the freshness of the file, and the file quality indicator of the file, further comprises or is based on: the nature of the file, the credibility of the file, the freshness of the file, and the file quality indicator of the file.

In some embodiments, the nature of the file comprises an indicator associated with a classification of the file. The classification of the file may be at least one of: audit from a reliable source, audit from an unreliable source, policy or procedure document, and unofficial document. In some embodiments, the indicator associated with the classification of the file is numerical. In other embodiments, the credibility of the file comprises an indicator associated with a source of the file. In some embodiments, the indicator associated with the source of the file is numerical. In yet other embodiments, the freshness of the file comprises an indicator associated with a creation time of the file. In some embodiments, the file quality indicator comprises or is based on the nature of the file, the credibility of the file, and the freshness of the file. In some embodiments, the file quality indicator of the file comprises or is based on the nature of the file, the credibility of the file, and the freshness of the file (e.g. an average of the nature of the file, the credibility of the file, and the freshness of the file, a median of the nature of the file, the credibility of the file, and the freshness of the file, etc.)

At block 510, the method comprises executing, using the one or more computing device processors, at a second time or at the first time, a chunking computing operation using the file, thereby resulting in a chunked file. At block 512, the method comprises transmitting, using the one or more computing device processors, text associated with the chunked file to the LLM. In some embodiments, the text associated with the chunked file comprises a word from the chunked file. In other embodiments, the text associated with the chunked file comprises a phrase from the chunked file. In yet other embodiments, the text associated with the chunked file comprises a sentence from the chunked file. In some embodiments, the text associated with the chunked file comprises a paragraph from the chunked file. In other embodiments, the text associated with the chunked file comprises the chunked file.

At block 514, the method comprises receiving, using the one or more computing device processors, at least one vector embedding for the text associated with the chunked file from the LLM, wherein the at least one vector embedding comprises or is based on a semantic structure of at least some of the text associated with the chunked file. In some embodiments, the semantic structure of the at least some of the text associated with the chunked file comprises or is based on a conceptual meaning of the at least some of the text associated with the chunked file.

Turning to FIG. 5B, at block 516, the method comprises configuring, using the one or more computing device processors, a vector database to store vector embeddings and metadata, thereby resulting in a configured vector database. At block 518, the method comprises first inserting, using the one or more computing device processors, at a third time following the first time and the second time, the at least one vector embedding for the text associated with the chunked file, into the configured vector database. At block 520, the method comprises second inserting, using the one or more computing device processors, at the third time following the first time and the second time, the metadata associated with the file into the configured vector database. In some embodiments, the second inserting the metadata associated with the file in the configured vector database occurs at a fourth time. In some embodiments, the fourth time is before the third time. In other embodiments, the fourth time is after the third time.

At block 522, the method comprises generating, based on the first inserting the at least one vector embedding for the text associated with the chunked file into the configured vector database, and the second inserting the metadata associated with the file into the configured vector database, an indexed computing file.

FIGS. 6A-6D are block diagrams of a method for extracting structured data from relevant unstructured data in a complex computing network. The various blocks of FIGS. 6A-6D may be executed in a different order from that shown in FIGS. 6A-6D. Some blocks may be optional.

Figure 6A:
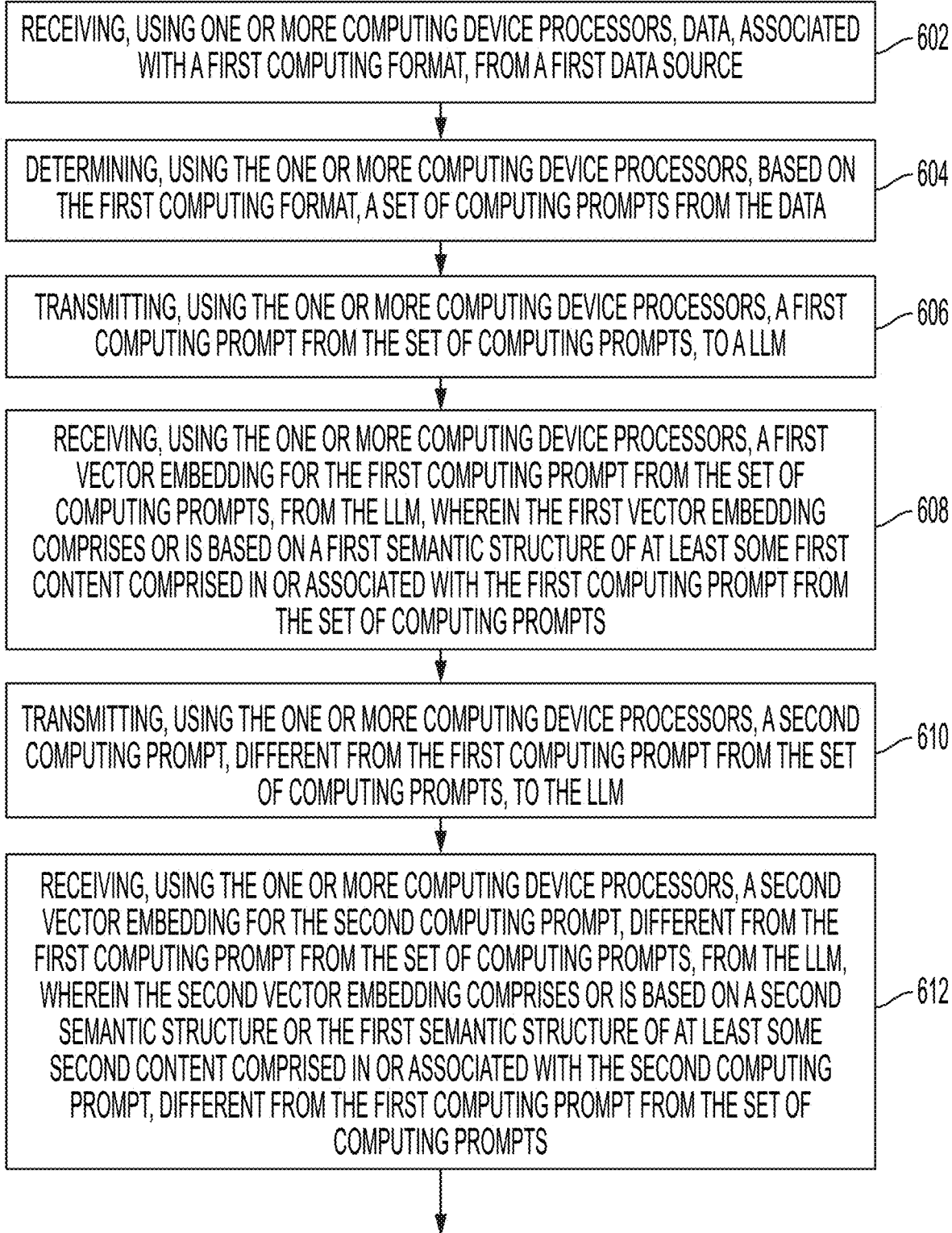

At block 602 of FIG. 6A, the method comprises receiving, using one or more computing device processors, data, associated with a first computing format, from a first data source. In some embodiments, the first computing format is JavaScript Object Notation (JSON). In some embodiments, the data comprises a questionnaire (e.g., a due diligence questionnaire, a risk questionnaire, a compliance questionnaire, a performance questionnaire, etc.). At block 604, the method comprises determining, using the one or more computing device processors, based on the first computing format, a set of computing prompts from the data. At block 606, the method comprises transmitting, using the one or more computing device processors, a first computing prompt from the set of computing prompts to a large language model (LLM). In some embodiments, the LLM comprises at least one of: GPT-4, LLaMA-3, BLOOM, PaLM, GPT-3.5, BERT, Gemini, LaMDA, and Falcon. In some embodiments, the transmitting the first computing prompt from the set of computing prompts to the LLM occurs at a first time.

At block 608, the method comprises receiving, using the one or more computing device processors, a first vector embedding for the first computing prompt from the set of computing prompts, from the LLM, wherein the first vector embedding comprises or is based on a first semantic structure of at least some first content comprised in or associated with the first computing prompt from the set of computing prompts. In some embodiments, the first semantic structure of the at least some first content comprises a conceptual meaning of the at least some first content.

At block 610, the method comprises transmitting, using the one or more computing device processors, a second computing prompt, different from the first computing prompt, from the set of computing prompts, to the LLM. In some embodiments, the transmitting the second computing prompt, different from the first computing prompt, from the set of computing prompts, to the LLM, occurs at the first time. In other embodiments, the transmitting the second computing prompt, different from the first computing prompt, from the set of computing prompts, to the LLM, occurs at a second time. In some embodiments, the LLM may be a different LLM than the one used in the transmitting the first computing prompt from the set of computing prompts to the LLM. In other embodiments, the LLM may be the same LLM used in the transmitting the first computing prompt from the set of computing prompts to the LLM.

At block 612, the method comprises receiving, using the one or more computing device processors, a second vector embedding for the second computing prompt, different from the first computing prompt, from the set of computing prompts, from the LLM, wherein the second vector embedding comprises or is based on a second semantic structure or the first semantic structure of at least some second content comprised in or associated with the second computing prompt, different from the first computing prompt, from the set of computing prompts.

Turning to FIG. 6B, at block 614, the method comprises generating, using the one or more computing device processors, a first computing prompt group comprising: the first computing prompt from the set of computing prompts, and the second computing prompt, different from the first computing prompt, from the set of computing prompts, wherein the generating the first computing prompt group comprises clustering the first computing prompt from the set of computing prompts, with the second computing prompt, different from the first computing prompt, from the set of computing prompts, based on a similarity of the first vector embedding and the second vector embedding. In some embodiments, the similarity of the first vector embedding and the second vector embedding comprises a semantic similarity. In some embodiments, the semantic similarity comprises or is based on at least one of: cosine similarity, Euclidean distance, Manhattan distance, Minkowski distance, Chebychev distance, and dot product similarity.

At block, 616, the method comprises first accessing, using the one or more computing device processors, a vector database. In some embodiments, an entry in the vector database comprises a vector embedding and metadata associated with an indexed computing file. In other embodiments, the entry in the vector database comprises a vector embedding and metadata associated with a file comprising unstructured data. In some embodiments, the vector database may be filtered based on filter data. In some embodiments, the filter data may be received from the first data source. In other embodiments, the filter data may be received from a second data source.

At block 618, the method comprises determining, using the one or more computing device processors, for the first computing prompt from the set of computing prompts, using the first vector embedding, based on the first accessing the vector database, at least one first file that at least partially corresponds with the first computing prompt from the set of computing prompts, wherein the at least one first file that at least partially corresponds with the first computing prompt from the set of computing prompts, comprises first unstructured data, wherein the determining the at least one first file that partially corresponds with the first computing prompt from the set of computing prompts, is based on a similarity of the first vector embedding and at least one third vector embedding, wherein the at least one third vector embedding is associated with the at least one first file that at least partially corresponds with the first computing prompt from the set of computing prompts. In some embodiments, the similarity of the first vector embedding and the at least one third vector embedding comprises a semantic similarity. In some embodiments, the semantic similarity comprises or is computed using at least one of: cosine similarity, Euclidean distance, Manhattan distance, Minkowski distance, Chebychev distance, and dot product similarity.

At block 620, the method comprises second accessing, using the one or more computing device processors, the vector database. In some embodiments, the second accessing the vector database may happen concurrently with the first accessing the vector database. In other embodiments, the second accessing the vector database may occur prior to the first accessing the vector database. In yet other embodiments, the second accessing the vector database may occur after the first accessing the vector database.

Turning to FIG. 6C, at block 622, the method comprises determining, using the one or more computing device processors, for the second computing prompt, different from the first computing prompt, from the set of computing prompts, using the second vector embedding, based on the second accessing the vector database, at least one second file that at least partially corresponds with the second computing prompt, different from the first computing prompt, from the set of computing prompts, wherein the at least one second file that at least partially corresponds with the second computing prompt, different from the first computing prompt, from the set of computing prompts, comprises second unstructured data, wherein the determining the at least one second file that partially corresponds with the second computing prompt, different from the first computing prompt, from the set of computing prompts, is based on a similarity of the second vector embedding and at least one fourth vector embedding, wherein the at least one fourth vector embedding is associated with the at least one second file that at least partially corresponds with the second computing prompt, different from the first computing prompt, from the set of computing prompts.

In some embodiments, the at least one second file that at least partially corresponds with the second computing prompt, different from the first computing prompt, from the set of computing prompts, comprises at least one of the at least one first file that at least partially corresponds with the first computing prompt from the set of computing prompts. In other embodiments, the at least one second file that at least partially corresponds with the second computing prompt, different from the first computing prompt, from the set of computing prompts, comprises none of the at least one first file that at least partially corresponds with the first computing prompt from the set of computing prompts. In some embodiments, the similarity of the second vector embedding and the at least one fourth vector embedding comprises a semantic similarity. In some embodiments, the semantic similarity comprises or is calculated using at least one of: cosine similarity, Euclidean distance, Manhattan distance, Minkowski distance, Chebychev distance, and dot product similarity.

At block 624, the method comprises transmitting, using the one or more computing device processors, the first computing prompt group to the LLM. At block 626, the method comprises transmitting, using the one or more computing device processors, the at least one first file that at least partially corresponds with the first computing prompt from the set of computing prompts, to the LLM. At block 628, the method comprises transmitting, using the one or more computing device processors, the at least one second file that at least partially corresponds with the second computing prompt, different from the first computing prompt, from the set of computing prompts, to the LLM. In some embodiments, the transmitting the first computing group to the LLM may happen concurrently with the transmitting at least one first file that at least partially corresponds with the first computing prompt from the set of computing prompts, to the LLM, and/or the transmitting the at least one second file that at least partially corresponds with the second computing prompt, different from the first computing prompt, from the set of computing prompts, to the LLM.

Turning to FIG. 6D, at block 630, the method comprises receiving, using the one or more computing device processors, processed data from the LLM, wherein the processed data comprises or is based on the first computing prompt from the set of computing prompts, a first response associated with the first computing prompt from the set of computing prompts, a first citation associated with the first computing prompt from the set of computing prompts, a first file quality indicator associated with the first computing prompt from the set of computing prompts, the second computing prompt, different from the first computing prompt, from the set of computing prompts, a second response associated with the second computing prompt, different from the first computing prompt, from the set of computing prompts, a second citation associated with the second computing prompt, different from the first computing prompt, from the set of computing prompts, and a second file quality indicator associated with the second computing prompt, different from the first computing prompt, from the set of computing prompts. In some embodiments, the processed data comprises the set of computing prompts, a set of responses associated with the set of computing prompts, a set of citations associated with the set of computing prompts, and a set of file quality indicators associated with the set of computing prompts.

At block 632, the method comprises determining, using the one or more computing device processors, a first computing indicator based on the first computing prompt from the set of computing prompts, and the first citation associated with the first computing prompt from the set of computing prompts. At block 634, the method comprises determining, using the one or more computing device processors, a second computing indicator based on the second computing prompt, different from the first computing prompt, from the set of computing prompts, and the second citation associated with the second computing prompt, different from the first computing prompt, from the set of computing prompts. In some embodiments, the determining the first computing indicator happens concurrently with the determining the second computing indicator. In other embodiments, the determining the first computing indicator occurs prior to the determining the second computing indicator. In yet other embodiments, the determining the first computing indicator happens following the determining the second computing indicator.

At block 636 the method comprises generating, using the one or more computing device processors, structured data comprising or based on the processed data, the first computing indicator, and the second computing indicator. At block 638, the method comprises transmitting, using the one or more computing device processors, the structured data to a first system.

Figure 8A:
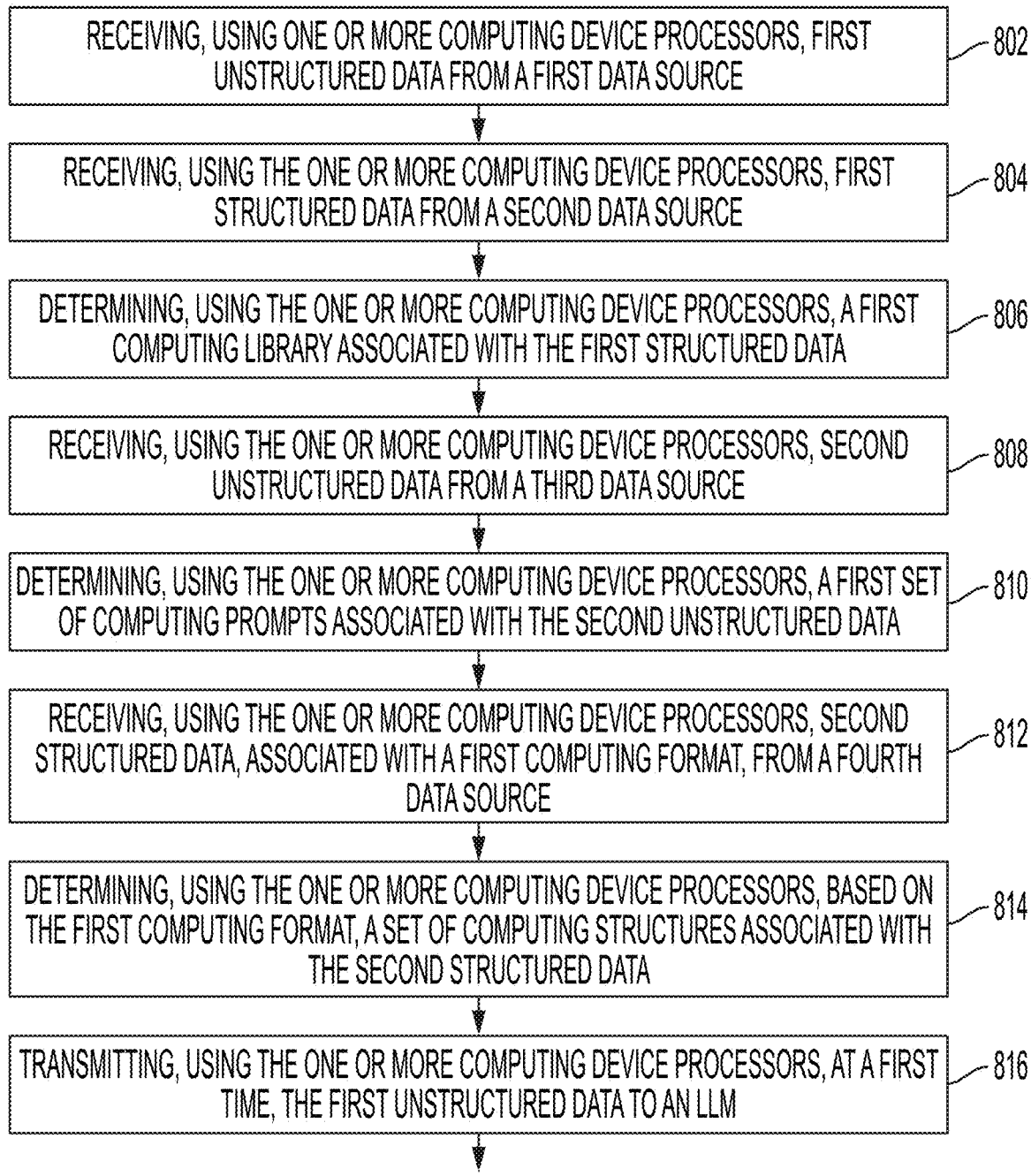
FIGS. 8A-8B show exemplary flowcharts for methods, systems/apparatuses, and computer program products that generate a computing structure based on both unstructured data and structured data using a large language model (LLM), in a complex computing network such as the network of FIG. 1, according to some embodiments of this disclosure.
Figure 8B:
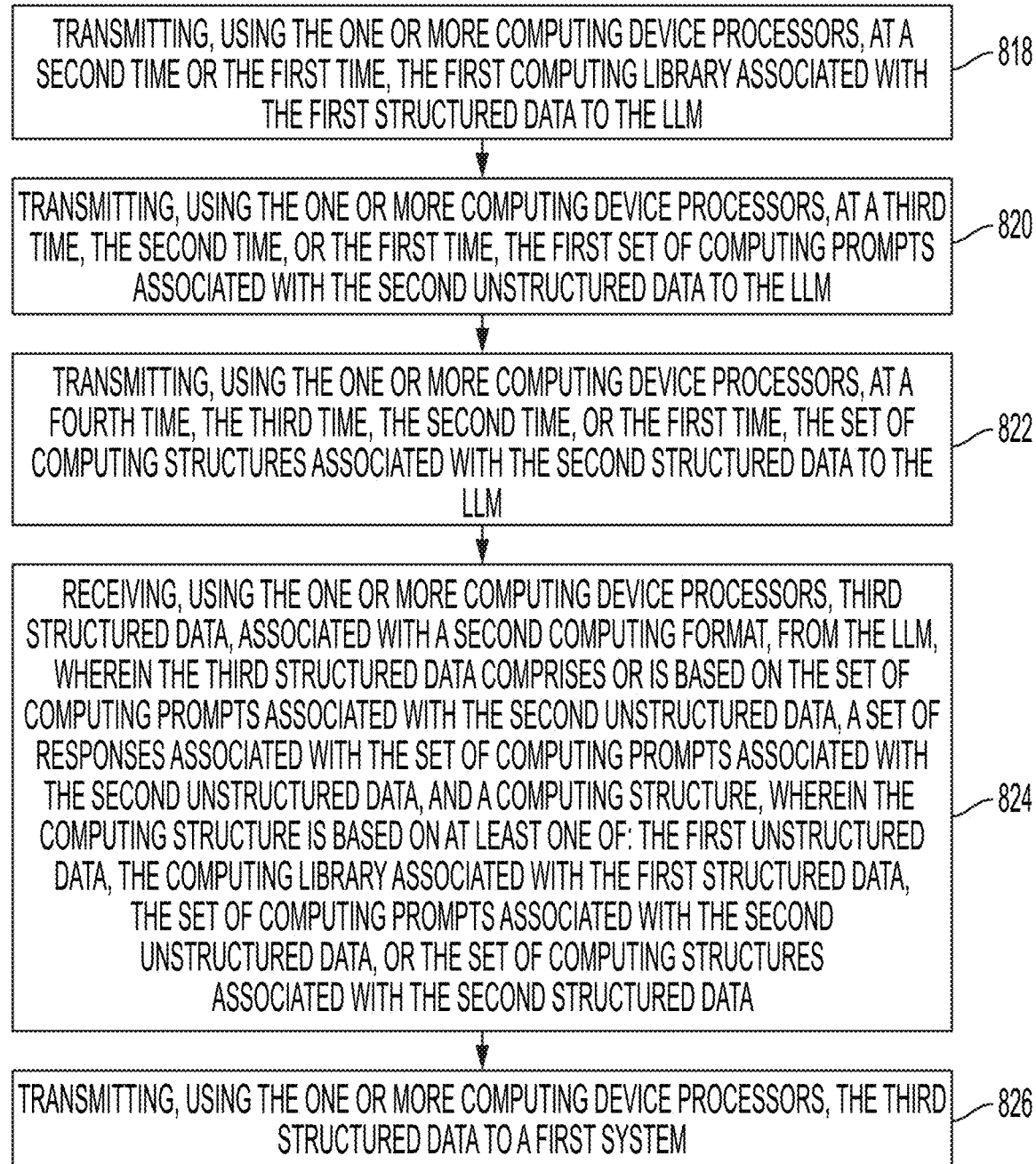

FIGS. 8A and 8B are block diagrams of a method for generating a computing structure based on both unstructured data and structured data using a large language model (LLM) in a complex computing network. The various blocks of FIGS. 8A and 8B may be executed in a different order from that shown in FIGS. 8A and 8B. Some blocks may be optional.

At block 802 of FIG. 8A, the method comprises receiving, using one or more computing device processors, first unstructured data from a first data source. In some embodiments, the first unstructured data comprises raw information or information without a predetermined structure or format. In other embodiments, the first unstructured data comprises at least one of: text, an image, a figure, a table, audio, video, a graph, a diagram, etc. In yet other embodiments, the first unstructured data comprises at least one of: documentation of at least one system, documentation of at least one process, documentation of at least one application, documentation of at least one apparatus, documentation of at least one procedure, etc. At block 804 of FIG. 8A, the method comprises receiving, using the one or more computing device processors, first structured data from a second data source. In some embodiments, the second data source comprises or is comprised in the first data source.

At block 806 of FIG. 8A, the method comprises determining, using the one or more computing device processors, a first computing library associated with the first structured data. According to some embodiments, the first computing library associated with the first structured data may comprise at least one of: a second set of computing prompts, a set of attributes, a set of entities, a set of workflow task types, a set of configured objects, a set of resources, a set of functions, a set of scripts (e.g., code), etc. At block 808 of FIG. 8A, the method comprises receiving, using the one or more computing device processors, second unstructured data from a third data source. In some embodiments, the second unstructured data comprises raw information or information without a predetermined structure or format. In other embodiments, the second unstructured data comprises at least one of: text, images, figures, tables, audio, videos, graphs, diagrams, etc. In one embodiment, the third data source comprises or is comprised in the first data source. In another embodiment, the third data source comprises or is comprised in the second data source.

At block 810 of FIG. 8A, the method comprises determining, using the one or more computing device processors, a first set of computing prompts associated with the second unstructured data. In some embodiments, the first set of computing prompts associated with the second unstructured data may comprise at least one of: at least one requirement associated with a system configuration, at least one capability associated with the system configuration, at least one setting associated with the system configuration, at least one client associated with the system configuration, etc.

At block 812 of FIG. 8A, the method comprises receiving, using the one or more computing device processors, second structured data, associated with a first computing format, from a fourth data source. In one embodiment, the first computing format comprises JavaScript Object Notation (JSON) format. According to one embodiment, the fourth data source comprises or is comprised in the first data source. In another embodiment, the fourth data source comprises or is comprised in the second data source. According to yet another embodiment, the fourth data source comprises or is comprised in the third data source.

At block 814 of FIG. 8A, the method comprises determining, using the one or more computing device processors, based on the first computing format, a set of computing structures associated with the second structured data. In some embodiments, the set of computing structures comprises at least one example system configuration. At block 816 of FIG. 8A, the method comprises transmitting, using the one or more computing device processors, at a first time, the first unstructured data to an LLM. In one embodiment, the LLM comprises at least one of: GPT-4, LLaMA-3, BLOOM, PaLM, GPT-3.5, BERT, Gemini, LaMDA, Falcon, etc. In some embodiments the LLM is hosted on a third-party server. In other embodiments, the LLM is hosted on a local server.

Turning to FIG. 8B, at block 818, the method comprises transmitting, using the one or more computing device processors, at a second time or the first time, the first computing library associated with the first structured data to the LLM. According to one embodiment, the second time is before the first time. According to another embodiment, the second time is after the first time. At block 820 of FIG. 8B, the method comprises transmitting, using the one or more computing device processors, at a third time, the second time, or the first time, the first set of computing prompts associated with the second unstructured data to the LLM. According to some embodiments, the third time is prior to the second time. According to other embodiments, the third time is after the second time. At block 822 of FIG. 8B, the method comprises transmitting, using the one or more computing device processors, at a fourth time, the third time, the second time, or the first time, the set of computing structures associated with the second structured data to the LLM. In one embodiment, the fourth time is before the third time. In another embodiment, the fourth time is after the third time.

At block 824 of FIG. 8B, the method comprises receiving, using the one or more computing device processors, third structured data, associated with a second computing format, from the LLM, wherein the third structured data comprises or is based on the first set of computing prompts associated with the second unstructured data, a set of responses associated with the first set of computing prompts associated with the second unstructured data, and a computing structure, wherein the computing structure is not comprised in the set of computing structures associated with the second structured data, and wherein the computing structure comprises or is based on the first unstructured data, the first computing library associated with the first structured data, the first set of computing prompts associated with the second unstructured data, and the set of computing structures associated with the second structured data.

In one embodiment, the second computing format comprises JavaScript Object Notation (JSON) format. In some embodiments, the computing structure comprises or is based on at least one of: the first unstructured data, the first computing library associated with the first structured data, and the set of computing structures associated with the second structured data. In one embodiment, the computing structure comprises a system configuration. According to some embodiments, the method further comprises initiating generating, using the one or more computing device processors, a second computing library using the LLM. Furthermore, in one embodiment, the computing structure comprises or is based on at least one of: the first unstructured data, the second computing library, and the set of computing structures associated with the second structured data.

At block 826 of FIG. 8B, the method comprises transmitting, using the one or more computing device processors, the third structured data to a first system. In one embodiment, the first system may comprise or be comprised in one of the network systems 150-150n. In another embodiment, the first system may comprise or be comprised in a system associated with the endpoint device 125. In some embodiments, the system may execute one or more of these blocks in a first stage and a second stage, such that fifth structured data associated with the second stage comprises or is based on fourth structured data associated with the first stage.

FIGS. 10A-10E are block diagrams of a method for generating structured data from files comprising unstructured data, and transmitting recommendations, based on the structured data, to a system storing the files, using a large language model (LLM). The various blocks of FIGS. 10A-10E may be executed in a different order from that shown in FIGS. 10A-10E. Some blocks may be optional.

Figure 10A:
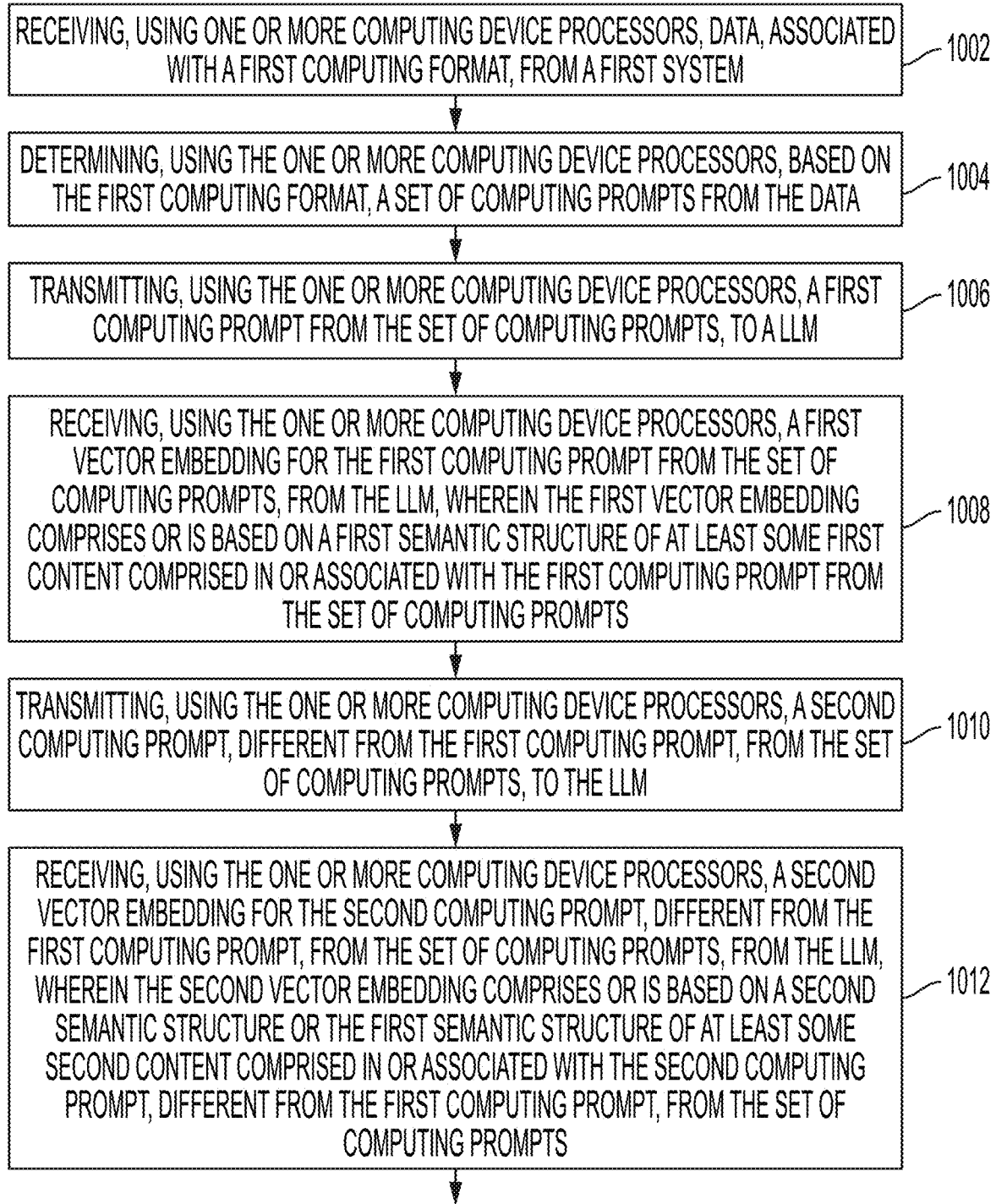

At block 1002 of FIG. 10A, the method comprises receiving, using one or more computing device processors, data, associated with a first computing format, from a first system. In some embodiments, the first computing format is JavaScript Object Notation (JSON). In some embodiments, the data comprises a questionnaire (e.g., a due diligence questionnaire, a risk questionnaire, a compliance questionnaire, a performance questionnaire, etc.). At block 1004, the method comprises determining, using the one or more computing device processors, based on the first computing format, a set of computing prompts from the data. At block 1006, the method comprises transmitting, using the one or more computing device processors, a first computing prompt from the set of computing prompts to an LLM. In some embodiments, the LLM comprises at least one of: GPT-4, LLaMA-3, BLOOM, PaLM, GPT-3.5, BERT, Gemini, LaMDA, and Falcon. In some embodiments, the transmitting the first computing prompt from the set of computing prompts to the LLM occurs at a first time.

At block 1008, the method comprises receiving, using the one or more computing device processors, a first vector embedding for the first computing prompt from the set of computing prompts, from the LLM, wherein the first vector embedding comprises or is based on a first semantic structure of at least some first content comprised in or associated with the first computing prompt from the set of computing prompts. In some embodiments, the first semantic structure of the at least some first content comprises a conceptual meaning of the at least some first content.

At block 1010, the method comprises transmitting, using the one or more computing device processors, a second computing prompt, different from the first computing prompt, from the set of computing prompts, to the LLM. In some embodiments, the transmitting the second computing prompt, different from the first computing prompt, from the set of computing prompts, to the LLM, occurs at the first time. In other embodiments, the transmitting the second computing prompt, different from the first computing prompt, from the set of computing prompts, to the LLM, occurs at a second time. In some embodiments, the LLM may be a different LLM than the one used in the transmitting the first computing prompt from the set of computing prompts to the LLM. In other embodiments, the LLM may be the same LLM used in the transmitting the first computing prompt from the set of computing prompts to the LLM.

At block 1012, the method comprises receiving, using the one or more computing device processors, a second vector embedding for the second computing prompt, different from the first computing prompt, from the set of computing prompts, from the LLM, wherein the second vector embedding comprises or is based on a second semantic structure or the first semantic structure of at least some second content comprised in or associated with the second computing prompt, different from the first computing prompt, from the set of computing prompts.

Turning to FIG. 10B, at block 1014, the method comprises generating, using the one or more computing device processors, a first computing prompt group comprising: the first computing prompt from the set of computing prompts, and the second computing prompt, different from the first computing prompt, from the set of computing prompts, wherein the generating the first computing prompt group comprises clustering the first computing prompt from the set of computing prompts, with the second computing prompt, different from the first computing prompt, from the set of computing prompts, based on a first similarity of the first vector embedding and the second vector embedding. In some embodiments, the first similarity of the first vector embedding and the second vector embedding comprises a first semantic similarity. In some embodiments, the first semantic similarity comprises or is based on at least one of: cosine similarity, Euclidean distance, Manhattan distance, Minkowski distance, Chebychev distance, and dot product similarity.

At block, 1016, the method comprises first accessing, using the one or more computing device processors, a first database. In some embodiments, an entry in the first database comprises a vector embedding and metadata associated with an indexed computing file. In other embodiments, the entry in the first database comprises a vector embedding and metadata associated with a file comprising unstructured data. In some embodiments, the first database may be filtered based on filter data. In some embodiments, the filter data may be received from the first system. In other embodiments, the filter data may be received from a data source.

At block 1018, the method comprises determining, using the one or more computing device processors, for the first computing prompt from the set of computing prompts, using the first vector embedding, based on the first accessing the first database, at least one first file that at least partially corresponds with the first computing prompt from the set of computing prompts, wherein the at least one first file that at least partially corresponds with the first computing prompt from the set of computing prompts, comprises first unstructured data, wherein the determining the at least one first file that partially corresponds with the first computing prompt from the set of computing prompts, is based on a second similarity of the first vector embedding and at least one third vector embedding, wherein the at least one third vector embedding is associated with the at least one first file that at least partially corresponds with the first computing prompt from the set of computing prompts. In some embodiments, the second similarity of the first vector embedding and the at least one third vector embedding comprises a second semantic similarity. In some embodiments, the second semantic similarity comprises or is computed using at least one of: cosine similarity, Euclidean distance, Manhattan distance, Minkowski distance, Chebychev distance, and dot product similarity.

At block 1020, the method comprises second accessing, using the one or more computing device processors, the first database. In some embodiments, the second accessing the first database may happen concurrently with the first accessing the first database. In other embodiments, the second accessing the first database may occur prior to the first accessing the first database. In yet other embodiments, the second accessing the first database may occur after the first accessing the first database.

Turning to FIG. 10C, at block 1022, the method comprises determining, using the one or more computing device processors, for the second computing prompt, different from the first computing prompt, from the set of computing prompts, using the second vector embedding, based on the second accessing the first database, at least one second file that at least partially corresponds with the second computing prompt, different from the first computing prompt, from the set of computing prompts, wherein the at least one second file that at least partially corresponds with the second computing prompt, different from the first computing prompt, from the set of computing prompts, comprises second unstructured data, wherein the determining the at least one second file that partially corresponds with the second computing prompt, different from the first computing prompt, from the set of computing prompts, is based on a third similarity of the second vector embedding and at least one fourth vector embedding, wherein the at least one fourth vector embedding is associated with the at least one second file that at least partially corresponds with the second computing prompt, different from the first computing prompt, from the set of computing prompts.

In some embodiments, the at least one second file that at least partially corresponds with the second computing prompt, different from the first computing prompt, from the set of computing prompts, comprises at least one of the at least one first file that at least partially corresponds with the first computing prompt from the set of computing prompts. In other embodiments, the at least one second file that at least partially corresponds with the second computing prompt, different from the first computing prompt, from the set of computing prompts, comprises none of the at least one first file that at least partially corresponds with the first computing prompt from the set of computing prompts. In some embodiments, the third similarity of the second vector embedding and the at least one fourth vector embedding comprises a third semantic similarity. In some embodiments, the third semantic similarity comprises or is calculated using at least one of: cosine similarity, Euclidean distance, Manhattan distance, Minkowski distance, Chebychev distance, and dot product similarity.

At block 1024, the method comprises transmitting, using the one or more computing device processors, the first computing prompt group to the LLM. At block 1026, the method comprises transmitting, using the one or more computing device processors, the at least one first file that at least partially corresponds with the first computing prompt from the set of computing prompts, to the LLM. At block 1028, the method comprises transmitting, using the one or more computing device processors, the at least one second file that at least partially corresponds with the second computing prompt, different from the first computing prompt, from the set of computing prompts, to the LLM. In some embodiments, the transmitting the first computing group to the LLM may happen concurrently with the transmitting at least one first file that at least partially corresponds with the first computing prompt from the set of computing prompts, to the LLM, and/or the transmitting the at least one second file that at least partially corresponds with the second computing prompt, different from the first computing prompt, from the set of computing prompts, to the LLM.

Turning to FIG. 10D, at block 1030, the method comprises receiving, using the one or more computing device processors, first structured data from the LLM, wherein the first structured data comprises or is based on the first computing prompt from the set of computing prompts, a first response associated with the first computing prompt from the set of computing prompts, a first citation associated with the first computing prompt from the set of computing prompts, a first file quality indicator associated with the first computing prompt from the set of computing prompts, the second computing prompt, different from the first computing prompt, from the set of computing prompts, a second response associated with the second computing prompt, different from the first computing prompt, from the set of computing prompts, a second citation associated with the second computing prompt, different from the first computing prompt, from the set of computing prompts, and a second file quality indicator associated with the second computing prompt, different from the first computing prompt, from the set of computing prompts. In some embodiments, the first structured data comprises the set of computing prompts, a set of responses associated with the set of computing prompts, a set of citations associated with the set of computing prompts, and a set of file quality indicators associated with the set of computing prompts.

At block 1032, the method comprises determining, using the one or more computing device processors, a first computing indicator based on the first computing prompt from the set of computing prompts, and the first citation associated with the first computing prompt from the set of computing prompts. In one embodiment, the first computing indicator comprises a first confidence score associated with the first response associated with the first computing prompt from the set of computing prompts. At block 1034, the method comprises determining, using the one or more computing device processors, a second computing indicator based on the second computing prompt, different from the first computing prompt, from the set of computing prompts, and the second citation associated with the second computing prompt, different from the first computing prompt, from the set of computing prompts. In some embodiments, the determining the first computing indicator happens concurrently with the determining the second computing indicator. In other embodiments, the determining the first computing indicator occurs prior to the determining the second computing indicator. In yet other embodiments, the determining the first computing indicator happens following the determining the second computing indicator.

At block 1036 the method comprises generating, using the one or more computing device processors, second structured data comprising or based on the first structured data, the first computing indicator, and the second computing indicator. In some embodiments, the second structured data comprises or is based on the first structured data and a set of computing indicators associated with the set of responses associated with the set of computing prompts.

Turning to FIG. 10E, at block 1038, the method comprises generating, using the one or more computing device processors, based on the second structured data, at least one recommendation associated with the first database, the at least one first file that at least partially corresponds with the first computing prompt from the set of computing prompts, or the at least one second file that at least partially corresponds with the second computing prompt, different from the first computing prompt, from the set of computing prompts. In one embodiment, the at least one recommendation is associated with at least one third file associated with (e.g., stored in, managed by, etc.) the first database. According to some embodiments, the at least one recommendation may comprise suggestions to improve at least one file quality indicator associated with the at least one third file associated with the first database (i.e., improve quality of files in the first database). In some embodiments, generating the at least one recommendation may comprise using the LLM.

At block 1040, the method comprises transmitting, using the one or more computing device processors, the at least one recommendation to a second system, wherein the second system manages the first database. In some embodiments, the second system may, based on the at least one recommendation, update or modify the first database. For example, in one embodiment, updating or modifying the first database may comprise or be based on a file quality assessment. In another embodiment, the updating or modifying the first database may comprise or be based on at least one request for at least one additional file to be inserted into the first database, wherein the at least one additional file comprises at least one improved file quality indicator (i.e., inserting files with improved quality that are relevant to the set of computing prompts (i.e., a questionnaire) into the first database).

Any of the embodiments, methods, systems, etc., described in this disclosure may be combined with any other embodiments, methods, systems, etc., thereby resulting in new embodiments.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to explain the principles of the disclosed subject matter and its practical applications, to thereby enable others skilled in the art to use the technology disclosed and various embodiments with various modifications as are suited to the particular use contemplated.

It is appreciated that the term optimize/optimal and its variants (e.g., efficient or optimally) may simply indicate improving, rather than the ultimate form of 'perfection' or the like.

Furthermore, the functions or operations described above can be implemented in digital electronic circuitry, in computer software, firmware or hardware. In particular, the disclosed techniques can be implemented using one or more computer program products. The computer program products, in some embodiments, comprises non-transitory computer-readable media comprising code configured to execute the disclosed approach, embodiments, methods, process flows, etc. Programmable processors and computers can be included in or packaged as mobile devices according to some embodiments. The processes and logic flows can be performed by one or more programmable processors and by one or more programmable logic circuitry. General and special purpose computing devices and storage devices can be interconnected through communication networks.

It will also be understood that, although the terms first, second, etc., may be used herein to describe various elements, these elements should not be limited by these terms. These terms are used to distinguish one element from another. For example, a first object or step could be termed a second object or step, and, similarly, a second object or step could be termed a first object or step, without departing from the scope of the disclosure. The first object or step, and the second object or step, are both objects or steps, respectively, but they are not to be considered the same object or step.

The terminology used in the description herein is for the purpose of describing particular embodiments and is not intended to be limiting. As used in the description of the disclosure and the appended claims, the singular forms "a," "an" and "the" are intended to include the plural forms as well, unless the context clearly indicates otherwise. It will also be understood that the term "and/or" as used herein refers to and encompasses any possible combination of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context.

Those with skill in the art will appreciate that while some terms in this disclosure may refer to absolutes, e.g., all source receiver traces, each of a plurality of objects, etc., the methods and techniques disclosed herein may also be performed on fewer than all of a given thing, e.g., performed on one or more components and/or performed on one or more source receiver traces. Accordingly, in instances in the disclosure where an absolute is used, the disclosure may also be interpreted to be referring to a subset.

What is claimed is:

1. A method for generating structured data from a file comprising unstructured data, based on accessing a large language model (LLM), the method comprising:
   receiving, using one or more computing device processors, data, associated with a first computing format, from a first data source;
   determining, using the one or more computing device processors, based on the first computing format, a set of computing prompts from the data;
   transmitting, using the one or more computing device processors, a first computing prompt from the set of computing prompts, to an LLM;
   receiving, using the one or more computing device processors, a first vector embedding for the first computing prompt from the set of computing prompts, from the LLM, wherein the first vector embedding comprises or is based on a first semantic structure of at least some first content comprised in or associated with the first computing prompt from the set of computing prompts;
   transmitting, using the one or more computing device processors, a second computing prompt, different from the first computing prompt, from the set of computing prompts, to the LLM;
   receiving, using the one or more computing device processors, a second vector embedding for the second computing prompt, different from the first computing prompt, from the set of computing prompts, from the LLM, wherein the second vector embedding comprises or is based on a second semantic structure or the first semantic structure of at least some second content comprised in or associated with the second computing prompt, different from the first computing prompt, from the set of computing prompts;
   generating, using the one or more computing device processors, a first computing prompt group comprising:
      the first computing prompt from the set of computing prompts, and the second computing prompt, different from the first computing prompt, from the set of computing prompts, wherein the generating the first computing prompt group comprises clustering the first computing prompt from the set of computing prompts, with the second computing prompt, different from the first computing prompt, from the set of computing prompts, based on a first similarity of the first vector embedding and the second vector embedding;
   first accessing, using the one or more computing device processors, a vector database;
   determining, using the one or more computing device processors, for the first computing prompt from the set of computing prompts, using the first vector embedding, based on the first accessing the vector database, at least one first file that at least partially corresponds with the first computing prompt from the set of computing prompts, wherein the at least one first file that at least partially corresponds with the first computing prompt from the set of computing prompts, comprises first unstructured data, wherein the determining the at least one first file that partially corresponds with the first computing prompt from the set of computing prompts, is based on a second similarity of the first vector embedding and at least one third vector embedding, wherein the at least one third vector embedding is associated with the at least one first file that at least partially corresponds with the first computing prompt from the set of computing prompts;
   second accessing, using the one or more computing device processors, the vector database;
   determining, using the one or more computing device processors, for the second computing prompt, different from the first computing prompt, from the set of computing prompts, using the second vector embedding, based on the second accessing the vector database, at least one second file that at least partially corresponds with the second computing prompt, different from the first computing prompt, from the set of computing prompts, wherein the at least one second file that at least partially corresponds with the second computing prompt, different from the first computing prompt, from the set of computing prompts, comprises second unstructured data, wherein the determining the at least one second file that partially corresponds with the second computing prompt, different from the first computing prompt, from the set of computing prompts, is based on a third similarity of the second vector embedding and at least one fourth vector embedding, wherein the at least one fourth vector embedding is associated with the at least one second file that at least partially corresponds with the second computing prompt, different from the first computing prompt, from the set of computing prompts;
   transmitting, using the one or more computing device processors, the first computing prompt group to the LLM;
   transmitting, using the one or more computing device processors, the at least one first file that at least partially corresponds with the first computing prompt from the set of computing prompts, to the LLM;
   transmitting, using the one or more computing device processors, the at least one second file that at least partially corresponds with the second computing prompt, different from the first computing prompt, from the set of computing prompts, to the LLM;

receiving, using the one or more computing device processors, processed data from the LLM, wherein the processed data comprises or is based on the first computing prompt from the set of computing prompts, a first response associated with the first computing prompt from the set of computing prompts, a first citation associated with the first computing prompt from the set of computing prompts, a first file quality indicator associated with the first computing prompt from the set of computing prompts, the second computing prompt, different from the first computing prompt, from the set of computing prompts, a second response associated with the second computing prompt, different from the first computing prompt, from the set of computing prompts, a second citation associated with the second computing prompt, different from the first computing prompt, from the set of computing prompts, and a second file quality indicator associated with the second computing prompt, different from the first computing prompt, from the set of computing prompts;

determining, using the one or more computing device processors, a first computing indicator based on the first computing prompt from the set of computing prompts, and the first citation associated with the first computing prompt from the set of computing prompts;

determining, using the one or more computing device processors, a second computing indicator based on the second computing prompt, different from the first computing prompt, from the set of computing prompts, and the second citation associated with the second computing prompt, different from the first computing prompt, from the set of computing prompts;

generating, using the one or more computing device processors, structured data comprising or based on the processed data, the first computing indicator, and the second computing indicator; and transmitting, using the one or more computing device processors, the structured data to a first system.

2. The method of claim 1, further comprising:
receiving, using the one or more computing device processors, filter data from the first data source or a second data source, and
executing, using the one or more computing device processors, based on the filter data, a filtering operation on the vector database, thereby limiting entries associated with the vector database.

3. The method of claim 2, wherein the filter data comprises one or more of: a nature of the file, a credibility of the file, a freshness of the file, a file quality indicator of the file, a name of the file, and a source of the file.

4. The method of claim 1, wherein the first computing format comprises JavaScript Object Notation (JSON) format.

5. The method of claim 1, wherein the first similarity of the first vector embedding and the second vector embedding, is based on a semantic similarity of the first vector embedding and the second vector embedding.

6. The method of claim 5, wherein the semantic similarity is calculated based on one or more of: cosine similarity, Euclidean distance, Manhattan distance, Minkowski distance, Chebychev distance, and dot product similarity.

7. The method of claim 1, wherein the second similarity of the first vector embedding and the at least one third vector embedding further comprises a semantic similarity of the first vector embedding and the at least one third vector embedding.

8. A system for generating structured data from a file comprising unstructured data, based on accessing a large language model (LLM), the system comprising:
one or more computing system processors; and
memory storing instructions that, when executed by the one or more computing system processors, cause the system to:
receive data, associated with a first computing format, from a first data source;
determine, based on the first computing format, a set of computing prompts from the data;
transmit a first computing prompt from the set of computing prompts, to an LLM;
receive a first vector embedding for the first computing prompt from the set of computing prompts, from the LLM, wherein the first vector embedding comprises or is based on a first semantic structure of at least some first content comprised in or associated with the first computing prompt from the set of computing prompts;
transmit a second computing prompt, different from the first computing prompt, from the set of computing prompts, to the LLM;
receive a second vector embedding for the second computing prompt, different from the first computing prompt, from the set of computing prompts, from the LLM, wherein the second vector embedding comprises or is based on a second semantic structure or the first semantic structure of at least some second content comprised in or associated with the second computing prompt, different from the first computing prompt, from the set of computing prompts;
generate a first computing prompt group comprising: the first computing prompt from the set of computing prompts, and the second computing prompt, different from the first computing prompt, from the set of computing prompts, wherein the generating the first computing prompt group comprises clustering the first computing prompt from the set of computing prompts, with the second computing prompt, different from the first computing prompt, from the set of computing prompts, based on a first similarity of the first vector embedding and the second vector embedding;
first access a vector database;
determine, for the first computing prompt from the set of computing prompts, using the first vector embedding, based on the first accessing the vector database, at least one first file that at least partially corresponds with the first computing prompt from the set of computing prompts, wherein the at least one first file that at least partially corresponds with the first computing prompt from the set of computing prompts, comprises first unstructured data, wherein the determine the at least one first file that partially corresponds with the first computing prompt from the set of computing prompts, is based on a second similarity of the first vector embedding and at least one third vector embedding, wherein the at least one third vector embedding is associated with the at least one first file that at least partially corresponds with the first computing prompt from the set of computing prompts;
second access the vector database;
determine, for the second computing prompt, different from the first computing prompt, from the set of computing prompts, using the second vector embedding, based on the second accessing the vector database, at least one second file that at least partially corresponds with the second computing prompt, different from the first computing prompt, from the set of computing prompts, wherein the at least one second file that at least partially corresponds with the second computing prompt, different from the first computing prompt, from the set of computing prompts, comprises second unstructured data, wherein the determine the at least one second file that partially corresponds with the second computing prompt, different from the first computing prompt, from the set of computing prompts, is based on a similarity of the second vector embedding and at least one fourth vector embedding, wherein the at least one fourth vector embedding is associated with the at least one second file that at least partially corresponds with the second computing prompt, different from the first computing prompt, from the set of computing prompts;

transmit the first computing prompt group to the LLM;

transmit the at least one first file that at least partially corresponds with the first computing prompt from the set of computing prompts, to the LLM;

transmit the at least one second file that at least partially corresponds with the second computing prompt, different from the first computing prompt, from the set of computing prompts, to the LLM;

receive processed data from the LLM, wherein the processed data comprises the first computing prompt from the set of computing prompts, a first response associated with the first computing prompt from the set of computing prompts, a first citation associated with the first computing prompt from the set of computing prompts, a first file quality indicator associated with the first computing prompt from the set of computing prompts, the second computing prompt, different from the first computing prompt, from the set of computing prompts, a second response associated with the second computing prompt, different from the first computing prompt, from the set of computing prompts, a second citation associated with the second computing prompt, different from the first computing prompt, from the set of computing prompts, and a second file quality indicator associated with the second computing prompt, different from the first computing prompt, from the set of computing prompts;

determine a first computing indicator based on the first computing prompt from the set of computing prompts, and the first citation associated with the first computing prompt from the set of computing prompts;

determine a second computing indicator based on the second computing prompt, different from the first computing prompt, from the set of computing prompts, and the second citation associated with the second computing prompt, different from the first computing prompt, from the set of computing prompts;

generate structured data comprising or based on the processed data, the first computing indicator and the second computing indicator; and transmit the structured data to a first system.

9. The system of claim 8, wherein the first computing prompt group further comprises at least three computing prompts from the set of computing prompts.

10. The system of claim 8, wherein the processed data comprises the set of computing prompts, a set of responses associated with the set of computing prompts, a set of citations associated with the set of computing prompts, and a set of file quality indicators associated with the set of computing prompts.

11. The system of claim 8, wherein an entry in the vector database comprises at least one of: a fifth vector embedding and first metadata associated with an indexed file, or a sixth vector embedding and second metadata associated with a file comprising unstructured data.

12. The system of claim 11, wherein the unstructured data comprises raw information or information without a predetermined structure or format.

13. The system of claim 8, wherein the system comprises or is comprised in one or more computing systems associated with one or more locations.

14. A method for generating structured data from a file comprising unstructured data, based on accessing a large language model (LLM), the method comprising:

receiving, using one or more computing device processors, data, associated with a first computing format, from a first data source;

determining, using the one or more computing device processors, based on the first computing format, a set of computing prompts from the data;

transmitting, using the one or more computing device processors, a first computing prompt from the set of computing prompts, to an LLM;

receiving, using the one or more computing device processors, a first vector embedding for the first computing prompt from the set of computing prompts, from the LLM, wherein the first vector embedding comprises or is based on a first semantic structure of at least some first content comprised in or associated with the first computing prompt from the set of computing prompts;

transmitting, using the one or more computing device processors, a second computing prompt, different from the first computing prompt, from the set of computing prompts, to the LLM;

receiving, using the one or more computing device processors, a second vector embedding for the second computing prompt, different from the first computing prompt, from the set of computing prompts, from the LLM, wherein the second vector embedding comprises or is based on a second semantic structure or the first semantic structure of at least some second content comprised in or associated with the second computing prompt, different from the first computing prompt, from the set of computing prompts;

generating, using the one or more computing device processors, a first computing prompt group comprising: the first computing prompt from the set of computing prompts, and the second computing prompt, different from the first computing prompt, from the set of computing prompts, wherein the generating the first computing prompt group comprises clustering the first computing prompt from the set of computing prompts, with the second computing prompt, different from the first computing prompt, from the set of computing prompts, based on a first similarity of the first vector embedding and the second vector embedding;

first accessing, using the one or more computing device processors, a vector database;

determining, using the one or more computing device processors, for the first computing prompt from the set of computing prompts, using the first vector embedding, based on the first accessing the vector database, first file data, associated with at least one first file that at least partially corresponds with the first computing prompt from the set of computing prompts, wherein the at least one first file that at least partially corresponds with the first computing prompt from the set of computing prompts, comprises first unstructured data, wherein the determining the first file data, associated with the at least one first file that partially corresponds with the first computing prompt from the set of computing prompts, is based on a second similarity of the first vector embedding and at least one third vector embedding, wherein the at least one third vector embedding is associated with or comprised in the first file data;

second accessing, using the one or more computing device processors, the vector database;

determining, using the one or more computing device processors, for the second computing prompt, different from the first computing prompt, from the set of computing prompts, using the second vector embedding, based on the second accessing the vector database, second file data, associated with at least one second file that at least partially corresponds with the second computing prompt, different from the first computing prompt, from the set of computing prompts, wherein the at least one second file that at least partially corresponds with the second computing prompt, different from the first computing prompt, from the set of computing prompts, comprises second unstructured data, wherein the determining the second file data, associated with the at least one second file that partially corresponds with the second computing prompt, different from the first computing prompt, from the set of computing prompts, is based on a third similarity of the second vector embedding and at least one fourth vector embedding, wherein the at least one fourth vector embedding is associated with or comprised in the second file data;

transmitting, using the one or more computing device processors, the first computing prompt group to the LLM;

transmitting, using the one or more computing device processors, the first file data, associated with the at least one first file that at least partially corresponds with the first computing prompt from the set of computing prompts, to the LLM;

transmitting, using the one or more computing device processors, the second file data, associated with the at least one second file that at least partially corresponds with the second computing prompt, different from the first computing prompt, from the set of computing prompts, to the LLM;

receiving, using the one or more computing device processors, processed data from the LLM, wherein the processed data comprises the first computing prompt from the set of computing prompts, a first response associated with the first computing prompt from the set of computing prompts, a first citation associated with the first computing prompt from the set of computing prompts, a first file quality indicator associated with the first computing prompt from the set of computing prompts, the second computing prompt, different from the first computing prompt, from the set of computing prompts, a second response associated with the second computing prompt, different from the first computing prompt, from the set of computing prompts, a second citation associated with the second computing prompt, different from the first computing prompt, from the set of computing prompts, and a second file quality indicator associated with the second computing prompt, different from the first computing prompt, from the set of computing prompts;

determining, using the one or more computing device processors, a first computing indicator based on the first computing prompt from the set of computing prompts, and the first citation associated with the first computing prompt from the set of computing prompts;

determining, using the one or more computing device processors, a second computing indicator based on the second computing prompt, different from the first computing prompt, from the set of computing prompts, and the second citation associated with the second computing prompt, different from the first computing prompt, from the set of computing prompts;

generating, using the one or more computing device processors, structured data comprising or based on the processed data, the first computing indicator and the second computing indicator; and transmitting, using the one or more computing device processors, the structured data to a first system.

15. The method of claim 14, wherein the structured data is associated with a second computing format, wherein the second computing format comprises JSON format.

16. The method of claim 14, wherein the first citation, associated with the first computing prompt from the set of computing prompts, comprises at least one of: at least some first text from the first file data associated with the at least one first file that at least partially corresponds with the first computing prompt from the set of computing prompts, at least some second text from the second file data associated with the at least one second file that at least partially corresponds with the second computing prompt, different from the first computing prompt, from the set of computing prompts, a file name corresponding with the at least one first file that at least partially corresponds with the first computing prompt from the set of computing prompts or the at least one second file that at least partially corresponds with the second computing prompt, different from the first computing prompt, from the set of computing prompts, and a page number corresponding with the at least some first text from the first file data associated with the at least one first file that at least partially corresponds with the first computing prompt from the set of computing prompts, or the at least some second text from the second file data associated with the at least one second file that at least partially corresponds with the second computing prompt, different from the first computing prompt, from the set of computing prompts.

17. The method of claim 14, wherein the first file quality indicator is based on metadata associated with the first citation.

18. The method of claim 14, wherein the determining, using the one or more computing device processors, the first computing indicator based on the first computing prompt from the set of computing prompts, and the first citation, associated with the first computing prompt from the set of computing prompts, is based on a semantic similarity of the first vector embedding and a fifth vector embedding, wherein the fifth vector embedding is associated with the first citation.

19. The method of claim 18, wherein the fifth vector embedding comprises or is comprised in the at least one third vector embedding or the at least one fourth vector embedding.

20. The method of claim 14, wherein the one or more computing device processors are comprised in one or more computing systems, wherein the one or more computing systems are located in one or more locations.

\* \* \* \* \*